(12) United States Patent
Guntur

(10) Patent No.: US 12,293,307 B2
(45) Date of Patent: *May 6, 2025

(54) DETERMINING DEPENDENT CAUSES OF A COMPUTER SYSTEM EVENT

(71) Applicant: Juniper Networks, Inc., Sunnyvale, CA (US)

(72) Inventor: Ravindra Guntur, Maharashtra (IN)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/439,144

(22) Filed: Feb. 12, 2024

(65) Prior Publication Data

US 2024/0185102 A1 Jun. 6, 2024

Related U.S. Application Data

(63) Continuation of application No. 16/944,935, filed on Jul. 31, 2020, now Pat. No. 11,900,273.

(Continued)

(51) Int. Cl.
*G06N 5/04* (2023.01)
*G06N 5/01* (2023.01)
(Continued)

(52) U.S. Cl.
CPC .................. *G06N 5/04* (2013.01); *G06N 5/01* (2023.01); *G06N 20/20* (2019.01); *H04L 41/12* (2013.01);
(Continued)

(58) Field of Classification Search
CPC ............ G06N 5/04; G06N 5/01; G06N 20/20; G06N 5/045; H04L 41/12; H04L 41/142;
(Continued)

(56) References Cited

U.S. PATENT DOCUMENTS 8,509,985 B2 8/2013 Subramania et al.
9,195,939 B1 * 11/2015 Goyal .................... G06N 5/045
(Continued)

FOREIGN PATENT DOCUMENTS

CN 102781013 A 11/2012
CN 102799171 A 11/2012
(Continued)

OTHER PUBLICATIONS

Response to Extended Search Report dated Sep. 11, 2023, from counterpart European Application No. 23176170.1 filed Apr. 10, 2024, 28 pp.
(Continued)

*Primary Examiner* — Ayaz R Sheikh
*Assistant Examiner* — Louis Samara
(74) *Attorney, Agent, or Firm* — Shumaker & Sieffert, P.A.

(57) ABSTRACT

Disclosed are methods and systems for determining combinations of system parameters that indicate a root cause of a system level experience deterioration (SLED). Some of the disclosed embodiments generate a decision tree from a first class of operational parameter datasets. Rules are derived from the decision tree. Filtered rule sets for feature parameters included in the system parameters are then determined. Pairs of features within a particular dataset that each satisfy their respective filtered rule sets are indicative of a root cause of the degradation, at least in some embodiments.

19 Claims, 25 Drawing Sheets

Related U.S. Application Data

(60) Provisional application No. 62/907,896, filed on Sep. 30, 2019.

(51) Int. Cl.

| | | |
|---|---|---|
| *G06N 20/20* | (2019.01) | |
| *H04L 41/12* | (2022.01) | |
| *H04L 41/142* | (2022.01) | |
| *H04L 41/149* | (2022.01) | |
| *H04L 43/08* | (2022.01) | |
| *H04W 24/08* | (2009.01) | |
| *H04W 84/12* | (2009.01) | |

(52) U.S. Cl.
CPC .......... *H04L 41/142* (2013.01); *H04L 41/149* (2022.05); *H04L 43/08* (2013.01); *H04W 24/08* (2013.01); *H04W 84/12* (2013.01)

(58) Field of Classification Search
CPC ... H04L 41/149; H04L 43/08; H04L 41/0813; H04W 24/08; H04W 84/12; G06Q 30/0205; G06F 3/04842
See application file for complete search history.

(56) References Cited

U.S. PATENT DOCUMENTS

| | | | |
|---|---|---|---|
| 9,684,870 | B2 | 6/2017 | Fawaz et al. |
| 9,692,671 | B2 | 6/2017 | Groenendijk et al. |
| 10,546,241 | B2 | 1/2020 | Yang et al. |
| 10,809,683 | B2 | 10/2020 | Baoe et al. |
| 2005/0108254 | A1* | 5/2005 | Zhang .................... G06F 18/23 |
| 2007/0226160 | A1* | 9/2007 | Acharya .................. G06N 7/01 |
| | | | 706/47 |
| 2014/0089039 | A1* | 3/2014 | McClellan ......... G06Q 10/0635 |
| | | | 705/7.28 |
| 2014/0188781 | A1 | 7/2014 | Fawaz et al. |
| 2016/0307133 | A1* | 10/2016 | Kour ................ G06Q 10/06313 |
| 2016/0335731 | A1* | 11/2016 | Hall ........................ G06Q 10/10 |
| 2018/0191770 | A1* | 7/2018 | Nachenberg ........ H04L 63/1441 |
| 2019/0238396 | A1* | 8/2019 | Tedaldi ............... H04L 41/0636 |
| 2019/0251469 | A1* | 8/2019 | Wagstaff ................ G06N 20/00 |
| 2021/0034454 | A1* | 2/2021 | Spiro .................. G06F 3/04842 |
| 2021/0097411 | A1 | 4/2021 | Guntur |
| 2022/0173965 | A1* | 6/2022 | Martin ................ H04L 41/0813 |
| 2022/0325392 | A1* | 10/2022 | Poole ........................ C21C 7/06 |
| 2023/0153845 | A1* | 5/2023 | Harper ............... G06Q 30/0205 |
| | | | 705/7.31 |

FOREIGN PATENT DOCUMENTS

| | | | |
|---|---|---|---|
| CN | 104584483 | A | 4/2015 |
| CN | 104885099 | A | 9/2015 |
| CN | 108432184 | A | 8/2018 |
| CN | 109710018 | A | 5/2019 |
| CN | 109996269 | A | 7/2019 |
| JP | 2020532241 | A * | 11/2020 |

OTHER PUBLICATIONS

Second Office Action and Search Report, and translation thereof, from counterpart Chinese Application No. 202011052168.9 dated Mar. 22, 2024, 7 pp.

"Decision tree learning", https://en.wikipedia.org/wiki/Decision_tree_learning, (accessed on Jan. 28, 2021), 12 pgs.

Extended Search Report from counterpart European Application No. 20198796.3, dated Feb. 15, 2021, 11 pp.

Extended Search Report from counterpart European Application No. 23176170.1 dated Sep. 11, 2023, 11 pp.

First Office Action and Search Report from counterpart Chinese Application No. 202011052168.9 dated Aug. 10, 2023, 8 pp.

Notice of Intent to Grant and Text Intended to Grant from counterpart European Application No. 20198796.3 dated Jan. 9, 2023, 90 pp.

Prosecution History from U.S. Appl. No. 16/944,935, dated Sep. 26, 2023 through Nov. 24, 2023, 19 pp.

Response to Extended Search Report dated Feb. 15, 2021, from counterpart European Application No. 20198796.3, filed Sep. 29, 2021, 126 pp.

* cited by examiner

| Index | A | B | C | D | E | F | G | H | Classification |
|---|---|---|---|---|---|---|---|---|---|
| 1 | 18 | 74 | 15 | 77 | 76 | 63 | 82 | 10 | 0 |
| 2 | 35 | 16 | 78 | 60 | 46 | 53 | 25 | 10 | 0 |
| 3 | 0 | 29 | 62 | 91 | 35 | 16 | 19 | 9 | 0 |
| 4 | 56 | 72 | 81 | 43 | 55 | 26 | 68 | 5 | 1 |
| 5 | 17 | 69 | 98 | 92 | 7 | 62 | 76 | 5 | 1 |
| 6 | 52 | 88 | 81 | 45 | 79 | 33 | 100 | 5 | 1 |
| 7 | 10 | 53 | 18 | 78 | 89 | 88 | 27 | 7 | 1 |
| 8 | 81 | 53 | 70 | 22 | 25 | 92 | 67 | 8 | 1 |
| 9 | 29 | 2 | 36 | 40 | 17 | 24 | 32 | 6 | 1 |
| 10 | 28 | 32 | 37 | 98 | 93 | 28 | 47 | 8 | 1 |
| 11 | 47 | 83 | 55 | 46 | 91 | 76 | 80 | 9 | 0 |
| 12 | 50 | 35 | 66 | 44 | 48 | 98 | 31 | 9 | 0 |

FIG. 5B

DETERMINING DEPENDENT CAUSES OF A COMPUTER SYSTEM EVENT

CROSS REFERENCE TO RELATED APPLICATIONS

This application is a continuation of U.S. patent application Ser. No. 16/944,935, filed 31 Jul. 2020, which claims the benefit of U.S. Provisional Patent Application No. 62/907,896, filed 30 Sep. 2019, the entire content of each application is incorporated herein by reference.

FIELD

The present application relates to monitoring wireless communications systems and, more particularly, methods and/or apparatus for determining a cause of a network event when the cause is a result of multiple operational parameters.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5B shows an example plurality of datasets.

DETAILED DESCRIPTION

Figure 1A:
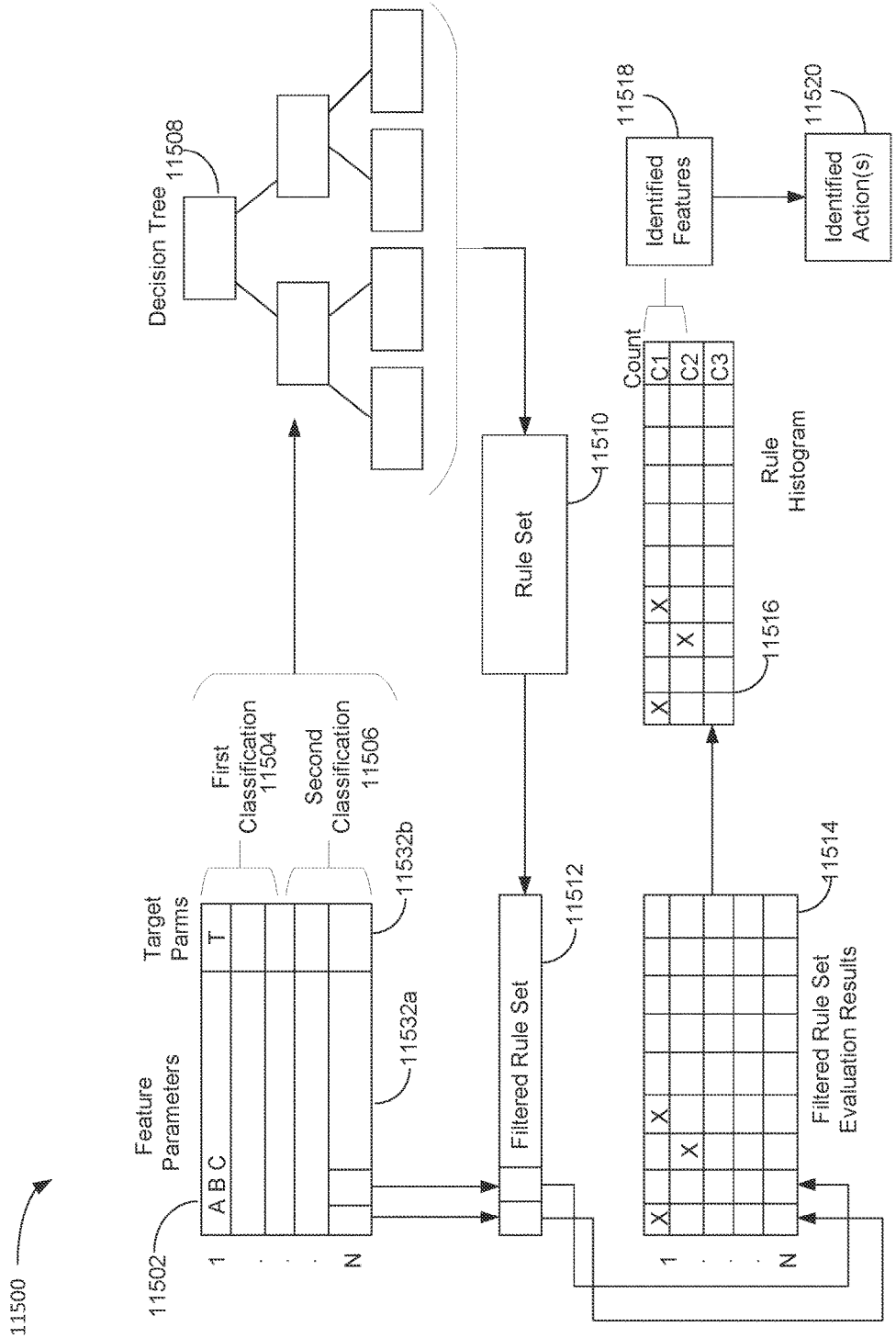
FIG. 1A is a diagram of data flow implemented in one or more of the disclosed embodiments.

Users of wireless networks, such as a Wi-Fi network, may encounter degradation of a system level experience (SLE) of the network. This degradation can result from a variety of issues. When a degradation is identified, it is important to promptly identify the root cause. Automated or manual corrective measures can then be initiated to restore system performance. Some degradations are the result of a combination of issues manifesting themselves. In some cases, the combination of issues spans multiple system components. For example, a particular degradation does not occur, in some embodiments, unless at least two system components enter two particular states. Identifying a root cause of such an issue is more complex, as it requires determining the combination of root causes resulting in the degradation, which is inherently more complex that determining a single root cause.

Some actions taken to resolve system degradations can have an adverse impact on the user community. Therefore, these actions should not be invoked unless a confidence in the determination of the root cause is relatively high. Obtaining this level of confidence can be more difficult in the particular cases, discussed above, where a source of the system degradation relates to two different system components or at least two different issues within system components.

At least some of the disclosed example embodiments monitor operational parameters of a computer or network system. The operational parameters include both independent parameters and dependent parameters. The independent or feature parameters include parameters that are configurable or selectable by an operator of the system. These independent parameters include, for example, an amount of time since a system has been restarted, an amount of configured memory, configuration parameter values, software and/or firmware versions, and other parameters. The dependent parameters reflect results of system operation and at least in part, values of the independent parameters. Dependent parameters include parameters such as CPU utilization, latency, throughput, memory utilization, or other parameters. The performance of the computer or network system being monitored can be assessed, in some embodiments, using a tool such as SpeedTest by Ookla. These tools inject packets into the network and measure dependent or target parameters such as download speed (we will refer to this parameter as Download), upload speed (we will refer to this parameter as Upload), round-trip time (we will refer to this parameter as Ping), and jitter (we will refer to this parameter as Jitter). We will refer to these dependent parameters as target parameters. Other example target parameters include time to connect, throughput, roaming, successful connect, coverage, capacity, jitter, round trip time, upload/download speed, or AP uptime. When a particular target parameter value is determined to represent a service level experience degradation (SLED), the disclosed embodiments determine probabilities that a particular one or more feature parameter values are causing the SLED.

Some embodiments monitor independent and/or dependent parameters related to access points (APs), Wi-Fi devices (e.g., mobile clients, user equipment (UE), wireless terminal (WT), etc.), and/or WAN indicators. We will refer to independent parameters as features.

Examples for access point features include but are not limited to:
  a) an average number of distinct clients attached to an AP. A frequency of collection of this number of clients can vary by embodiment, but for example is collected every two seconds in some embodiments, and averaged over a period of one minute.
  b) average utilization (e.g. CPU, Memory, I/O bandwidth, etc.). These operational parameters may be monitored at varying frequencies depending on the embodiment, but in some embodiments these operational parameters are monitored at two second intervals and moving average values generated for a period of one minute.
  c) average non Wi-Fi utilization of devices like TV remote monitors, where the utilization is measured every e.g., 2 seconds and averaged over e.g., 1 minute.

The measurement of the feature and target parameters can be performed by any device attached to a Wi-Fi network. The measured parameters are forwarded to a network attached server for storage and further analysis as described below. Table 1 below includes an example description of these stored parameters.

Some of the disclosed embodiments periodically collect j feature parameters and k target parameters. In various aspects, a frequency of collection of each of these parameters may be set independently, or may be synchronized.

Table 1 below represents a plurality of time synchronized measurements of feature parameters and target parameters (also referred to herein individually as a dataset). Each row stores data representing a dataset. A row of Table 1 stores measurements collected contemporaneously with each other. A window of time including each measurement of a row of table 1 can vary in length by embodiment, from a very short and precise window (e.g. 10 seconds, to a less precise window (e.g. one minute). In the embodiment illustrated by table 1 below, two access point feature parameters, three device feature parameters, and (j-5) WAN feature parameters are collected. Table 1 also illustrates k target parameters.

Table 1 indicates that, at a time associated with index i and feature parameter j, an embodiments measures and stores a feature parameter $F_{i,j}$. Similarly, at time associated with index i and target parameter k, an embodiments measures and stores a target parameter $T_{i,k}$.

TABLE 1

| | Features | | | | | | | Targets | | |
|---|---|---|---|---|---|---|---|---|---|---|
| | AP Features | | Device Features | | | WAN Features | | Ping | | Uplink |
| Index | F1 | F2 | F3 | F4 | F5 | F6 | ... Fj | T1 | ... | Tk |
| 1 | f1, 1 | f1, 2 | f1, 3 | F1, 4 | F1, 5 | F1, 6 | ... ... | T1, 1 | ... | ... |
| 2 | f2, 1 | f2, 2 | f2, 3 | F2, 4 | F2, 5 | F2, 6 | ... ... | T2, 1 | ... | ... |
| 3 | f3, 1 | f3, 2 | f3, 3 | F3, 4 | F3, 5 | F3, 6 | ... ... | T3, 1 | ... | ... |
| ... | ... | ... | ... | ... | ... | ... | ... ... | ... | ... | ... |
| i − 1 | ... | ... | ... | ... | ... | ... | ... ... | ... | ... | ... |
| i | fi, 1 | fi, 2 | fi, 3 | Fi, 4 | Fi, 5 | Fi, 6 | ... Fi, j | $T_{i,1}$ | ... | Ti, k |
| i + 1 | ... | ... | ... | ... | ... | ... | ... ... | ... | ... | ... |
| ... | ... | ... | ... | ... | ... | ... | ... ... | ... | ... | ... | d) average utilization in a particular SSID where the utilization is measured every e.g., 2 seconds and averaged over e.g., 1 minute.

Examples for Wi-Fi device features include but are not limited to:
  e) a received noise as measured by hardware,
  f) a received signal strength indications (RSSIs),
  g) a calculated signal to noise ratio (SNR),
  h) a specific radio channel or band (e.g., 2.4G/5G)
  i) a transmission bandwidth,
  j) a calculated number of packet retransmissions divided by a number of packets requested for transmission (e.g. a retransmission rate),
  k) a number of multiple input/multiple output (MIMO) streams Examples for WAN features include but are not limited to:
  l) a network delay time e.g., for transmitting AP stats to a network management server,
  m) a ratio of current network jitter to a long-term average jitter as a factor of maximum WAN capacity where the WAN capacity is defined as the maximum measured Ethernet port rate within a given time window (e.g., 72-hour window).

Some embodiments apply a predetermined criterion to one or more target parameter values. The application of the criterion is used to classify a time correlated set of monitored parameters (e.g. a dataset or row in the table) including the parameter values into a first category or a second category. In some embodiments, the predetermined criterion is defined to delineate datasets including nominal values for the target parameter and other datasets including abnormal or problematic values of the target parameter. In some embodiments, the criterion applies a threshold to the target parameter value. In some embodiments, if the criterion is met, such as if the target parameter value is one of less than, less than or equal to, greater than, or greater to or equal to the predetermined threshold, then the dataset including the target parameter value is classified as a first class, and if the criterion is not met, the dataset is classified under a second class.

For example, in some embodiments, a system is configured with an upload throughput threshold of 2 Mb/sec. In this example, a dataset including an upload speed target parameter lower than 2 Mb per sec is considered by some embodiments to be a dataset indicating a SLED condition while a dataset including an upload speed target parameter indicating an upload speed higher than 2 Mb per second is considered to be indicative of a good SLE. Similarly, if a predetermined threshold for a target Ping response time parameter is five (5) milliseconds, a dataset including a round-trip ping response time longer than five (5) milliseconds is considered to be indicative of a SLED condition while a dataset including a round trip ping response time shorter than five milliseconds is considered to be indicative of nominal or good SLE.

Thus, by applying a criterion to a target parameter value, the disclosed embodiments partition a plurality of time correlated datasets of monitored operational parameters (e.g. datasets) into two different groups (based on each dataset's target parameter value and the values relationship to the criterion). These two different groups of datasets are sometimes referred to as class one (1) datasets or class zero datasets.

In some embodiments, a dataset representing poor SLE is marked as dataset class zero (0), and a dataset representing nominal SLE is marked as dataset class one (1). An Equation that demonstrates this concept is shown below as Equation 1:

$$\text{Dataset Classification} = \text{Threshold}(\text{DataSet}) \quad \text{Eqn. (1)}$$

where:
- DataSet Classification is a classification of a dataset,
- Threshold() a threshold function or criterion that relates a threshold to a target parameter of the DataSet, and
- DataSet a set of time correlated system parameters, generally including feature parameters and target parameters.

These class identifications (e.g. zero or one) can of course be reversed in various embodiments. Table 2 below illustrates this labeling, where the class is determined based on whether a specific target parameter meets a criterion (e.g. which relates the target parameter to a threshold in some embodiments).

TABLE 2

| | Features | | | | | | Targets | | |
| | AP Features | | Device Features | | WAN Features | | Ping | Uplink | |
| Index | F1 | F2 | F3 | F4 | F5 | F6 ... Fj | T1 ... | Tk | Class |
| --- | --- | --- | --- | --- | --- | --- | --- | --- | --- |
| 1 | f1, 1 | f1, 2 | f1, 3 | F1, 4 | F1, 5 | F1, 6 ... ... | T1, 1 ... | ... | 1 |
| 2 | f2, 1 | f2, 2 | f2, 3 | F2, 4 | F2, 5 | F2, 6 ... ... | T2, 1 ... | ... | 1 |
| 3 | f3, 1 | f3, 2 | f3, 3 | F3, 4 | F3, 5 | F3, 6 ... ... | T3, 1 ... | ... | 0 |
| ... | ... | ... | ... | ... | ... | ... ... | ... ... | ... | 0 |
| i − 1 | ... | ... | ... | ... | ... | ... ... | ... ... | ... | 1 |
| i | fi, 1 | fi, 2 | fi, 3 | Fi, 4 | Fi, 5 | Fi, 6 ... Fi, j | Ti, 1 ... | Ti, k | 0 |
| i + 1 | ... | ... | ... | ... | ... | ... ... | ... ... | ... | 1 |
| ... | ... | ... | ... | ... | ... | ... ... | ... ... | ... | 0 |

In some embodiments, multiple classifications of datasets can be performed by applying multiple criterion to values of a target parameter across the plurality of datasets. For example, a first criterion may relate a target parameter value to a first predetermined threshold, resulting in a first classification of a dataset including the target parameter value. A second criterion relating the target parameter value to a second predetermined threshold is also evaluated in these embodiments, resulting in a second classification of the dataset.

Additional classifications are performed, in some embodiments, by applying additional criterion to one or more other target parameter values. Thus, each dataset is classified one or more times for a single target parameter value (e.g. column in table 1), and zero or more times for each of a second, third, fourth, fifth, etc. target parameter value.

For each classification, datasets are then grouped based on their classification. A grouping of the parameter values of Table 2 is illustrated visually by Table 3 below.

TABLE 3

| | Features | | | | | | Targets | | |
| | AP Features | | Device Features | | WAN Features | | Ping | Uplink | |
| Index | F1 | F2 | F3 | F4 | F5 | F6 ... Fj | T1 ... | Tk | Class |
| --- | --- | --- | --- | --- | --- | --- | --- | --- | --- |
| 1 | f1, 1 | f1, 2 | f1, 3 | F1, 4 | F1, 5 | F1, 6 ... ... | T1, 1 ... | ... | 1 |
| 2 | f2, 1 | f2, 2 | f2, 3 | F2, 4 | F2, 5 | F2, 6 ... ... | T2, 1 ... | ... | 1 |
| i − 1 | ... | ... | ... | ... | ... | ... ... | ... ... | ... | 1 |
| i + 1 | ... | ... | ... | ... | ... | ... ... | ... ... | ... | 1 |
| 3 | f3, 1 | f3, 2 | f3, 3 | F3, 4 | F3, 5 | F3, 6 ... ... | T3, 1 ... | ... | 0 |
| ... | ... | ... | ... | ... | ... | ... ... | ... ... | ... | 0 |
| i | fi, 1 | fi, 2 | fi, 3 | Fi, 4 | Fi, 5 | Fi, 6 ... Fi, j | Ti, 1 ... | Ti, k | 0 |
| ... | ... | ... | ... | ... | ... | ... ... | ... ... | ... | 0 |

Datasets are grouped for each criterion applied to them (one or more criterion for one or more corresponding target parameters). For example, in some embodiments, if four (4) target parameters are evaluated, with each evaluated according to five different criterion (each specific to the respective target parameter) twenty distinct groupings of datasets are generated, similar in structure to table 3, as discussed above. Note that while this disclosure communicates certain features via the enclosed tables, there is no requirement for any of the disclosed embodiments to generate table data structures per se. One of skill in the art would understand that data may be organized to communicate the discussed relationships and groupings using a variety of data structure types.

In some embodiments, the classified datasets are used to generate a binary decision tree. Some embodiments utilize a Gini Decision Tree (GDT). Other embodiments utilize a tree-based classifier that uses an optimization metric other than a Gini score. Some embodiments of a decision tree or a classification tree include non-leaf decision nodes that are labeled with an input feature. Edges from each non-leaf node are labeled with each of the possible values of the input feature. The edges lead to a subordinate decision node of a different input feature. Each leaf node of the tree is labeled with a class or a probability distribution over the classes. Thus, a dataset applied to the tree is classified by traversing the tree from a root of the tree to a leaf node of the tree. The dataset is classified consistent with the leaf node of the resulting from the application of the dataset to the tree.

Some embodiments construct a decision tree for each dataset grouping. Thus, in the example described above, twenty (2) decision trees are constructed from the twenty different groupings (five groupings for each of four target parameters). When generating a decision tree based on grouped datasets, a node of the decision tree indicates a criterion for a particular feature parameter that segments data at the node. The node also indicates, in some embodiments, a Gini score (or a weight) for that determination, a number of affected datasets (e.g. number of rows of e.g., table 1) by this node, and an indication of how datasets represented by the node are divided between a first classification (e.g. class zero) and a second classification (e.g. class one). Each node is also assigned, in some embodiments, a single class based on whether a majority of evaluations of the plurality of data-sets traverse that node when the plurality of datasets are evaluated against the decision tree.

The Gini score is computed, in some embodiments, by aggregating the probability Pi of an item with label i being chosen times the probability $\Sigma_{k!=i} Pk = 1-Pi$ of a mistake in categorizing that item. The Gini score reaches its minimum or best value (zero) when all parameter datasets represented below the node in the tree are classified into a single category. In the case of a decision tree of unlimited depth, leaf nodes of the tree represent datasets having a single type of classification (e.g. either zero or one). Some embodiments place limits on the depth of the decision tree to conserve resources (e.g. memory and CPU). In these embodiments, one or more leaf nodes of the decision tree can represent parameter datasets classified into more than a single class.

$$GS = Pi * \log\left(\frac{1}{Pi}\right) \quad \text{Equ. 2}$$

GS—Gini score
Pi—probability of item with label i being chosen

Some of the disclosed embodiments traverse the decision tree and obtain a list of all the nodes corresponding to one of the two classes (e.g. class zero in some embodiments, representing anomalous parameter values). The assignment of either the first classification or a second classification is based, in some embodiments, based on whether a majority of the datasets represented by the node (e.g. the number of datasets that traverse the node when evaluated against the decision tree) are classified as class zero (0) or to class one (1). In some embodiments, nodes of the decision tree are assigned a node class vector (NCV) such as $$NCV = [n0, n1] \quad \text{Equ 3}$$

where:
NCV—node class vector,
n0—number of datasets (e.g. rows in table 3) represented by the node that are classified as class zero (0),
n1—number of datasets (e.g. rows of table 3) represented by the node that are classified as class one (1).

Some of the commercially available decision tree tools refer to the NCV as "value." Each node may also be labeled with a total number of datasets represented by that specific node (e.g. below the node in the tree). This number is referred as the "sample".

$$\text{Sample} = n0 + n1 \quad \text{Equ 4}$$

where:
sample total number of data rows represented by (or evaluated by) a specific decision tree node,
n0 number of datasets represented by a decision tree node that are classified under the first classification (e.g. class zero (0)),
n1 number of datasets represented by a decision tree node that are classified under the second classification (e.g. class one (1)).

The NCV or "value" vector can then be used to calculate a class probability.

$$\text{Class 0 probability} = \frac{\text{number of data rows belonging to class 0}}{\text{total number of data rows in node}} = \frac{n0}{n0+n1} \quad \text{Equ 5}$$

and similarily.

$$\text{Class 1 probability} = \frac{\text{number of data rows belonging to class 1}}{\text{total number of data rows in node}} = \frac{n1}{n0+n1} \quad \text{Equ 6}$$

When a number of datasets having the first classification (e.g. class zero (0)) represented by a node is greater than a number of datasets having the second classification (e.g. class one (1), the node is assigned the first classification (e.g. class zero (0)). Similarly, when a number of datasets having the first classification (e.g. class zero (0)) represented by a node is less than a number of datasets having the second classification (e.g. class one (1), the node is assigned the first classification (e.g. class zero (0)). When there is an equal division of datasets between the first and second classifications, various embodiments may classify the node as either the first classification or the second classification.

In embodiments that do not limit a depth of the decision tree, leaf nodes include members of only a single class (first or second classification). The Gini score for these leaf nodes is zero. As mentioned above, when a restriction is imposed on the tree depth, leaf nodes can represent a mixture of dataset classifications resulting in in a Gini score greater than zero for those leaf nodes.

Extending the discussion of Equation 1, since a selection of a specific value of a threshold for a specific target parameter determines whether a dataset (a row in table 1) is classified as belonging to dataset class zero (0) or dataset class one (1), and since a datasets membership in the first classification or second classification determines the values of the nodes in the decision tree, we get threshold→dataset partitioning into two classes→Decision Tree     Equ. 7 where:
threshold a threshold value for a specific target parameter,
→a selection operator.

Some embodiments use criterion that evaluate target parameter values against randomly determined thresholds. Each one of these thresholds is chosen to fall within a range between a smallest possible value for the target parameter and a largest possible value for the target parameter.

Smallest target param (k)<Threshold (k, n)<Largest target param (k)     Equ. 8 where:
smallest target param (k) is a smallest value of the k target parameter,
largest target param (k) is a largest value of the k target parameter,
threshold (k, n) a $n^{th}$ threshold for the $k^{th}$ target parameter.
and 0<n<N     Equ. 9 where:
N a number of random thresholds for each target parameter

By selecting and applying the random thresholds to each target parameter value, these embodiments generate one or more separate classifications of the datasets, such as the example of Table 3. These embodiments then generate a decision tree based on each of the separate classifications.

Identifying Feature Outliers

Some embodiments select datasets that include target parameter values of a single class (e.g. class one). An example of this selection is illustrated in Table 4 below.

TABLE 4

| | Features | | | | | | Targets | | |
| --- | --- | --- | --- | --- | --- | --- | --- | --- | --- |
| | AP Features | | Device Features | | WAN Features | | Ping | Uplink | |
| Index | F1 | F2 | F3 | F4 | F5 | F6 | Fj | T1 | Tk | Class |
| 1 | f(1, 1) | f(1, 2) | f(1, 3) | F(1, 4) | F(1, 5) | F(1, 6) | F(1, j) | T(1, 1) | T(1, k) | 1 |
| 2 | f(2, 1) | f(2, 2) | f(2, 3) | F(2, 4) | F(2, 5) | F(2, 6) | F(2, j) | T(2, 1) | T(2, k) | 1 |
| i − 1 | ... | ... | ... | ... | ... | ... | F(i − 1, j) | ... | T(i − 1, k) | 1 |
| i + 1 | ... | ... | ... | ... | ... | ... | F(i + 1, j) | ... | T(i + 1, k) | 1 |
| 3 | f(3, 1) | f(3, 2) | f(3, 3) | F(3, 4) | F(3, 5) | F(3, 6) | ... | T(3, 1) | ... | 0 |
| ... | ... | ... | ... | ... | ... | ... | ... | ... | ... | 0 |
| i | f(i, 1) | f(i, 2) | f(i, 3) | F(i, 4) | F(i, 5) | F(i, 6) | F(i, j) | T(i, 1) | T(i, k) | 0 |
| ... | ... | ... | ... | ... | ... | ... | ... | ... | ... | 0 |

In the specific example illustrated by Table 4, the measurements of the specific Fj Feature parameter that falls in class one (1) are F(1,j), F(2,j), F(i−1,j), and F(i+1,j).

If the Fj feature parameter is a measured RSSI value, and there are five RSSI values that fall within the class one (1) measured feature set, then example values for the Fj parameter of the class 1 values above could be:

RSSI Class 1={−41, −48, −50, −60, −62}     Equ. 10

Some embodiments then compute a feature parameter's median value and a low quartile value for the feature parameter. The low quartile value Q1, in some embodiments, is a first boundary value delineating between a 1st quartile and a 2nd quartile of values of the feature parameter in a plurality of datasets. A high quartile value Q3, in some embodiments, is a second boundary value delineating between a 3rd quartile and a 4th quartile. These low and high quartile values are determined, in some embodiments, for each feature parameter, based on values of the respective feature parameter within datasets of the single class.

In the example of Equation 10 above, a median value is −50. In some embodiments, a first quartile (Q1) boundary is defined as a number mid-way between a minimum value and the median value. In the example of Equation 10, the Q1 boundary value is −48. Similarly, an upper boundary of a third quartile (Q3) is defined as a number mid-way between a maximum value and the median value. In the example of Equation 10, the Q3 boundary between a 3rd quartile and a 4th quartile value is −60.

In some embodiments, feature parameter values below the Q1 boundary or above the Q3 boundary are classified as outliers. Other embodiments may determine outliers in other manners.

Some embodiments utilize relaxation factors R e.g., R=0.2, to reduce the percentage of values that fall within the first and the fourth quartiles (reduce the number of outliers). Using the relaxation factor, the relaxed value for the first quartile boundary is set, in some embodiments, using Equation 11 below:

RQ1=(1−R)*median [smallest number, median number]     Equ 11 where:
RQ1 is a relaxed first quartile boundary,
R is a relaxation factor,
median a median operator,
smallest number a smallest number in the single class dataset, and
median number a median number in the single class dataset.

The example dataset of Equation 10 is RQ1=−48*0.8=−.38.4 Similarly, using the relaxation factor, the relaxed value for the third quartile boundary is set, in some embodiments, to:

RQ3=(1+R)*median [largest number, median number]     Equ. 12 where:
RQ3 is a relaxed third quartile boundary,
R is a relaxation factor,
median is a median operator, largest number is a largest number in the original class one (1) dataset, and median number is a median number in the original class one (1) dataset.

Equation 11 and 12 describe the relaxation operation for feature parameters that have positive values such as delay time etc. For feature parameters that have negative values, such as RSSI, equation 11 determines Q3 and equation 12 determines Q1. For example, using the dataset of Equation 10 and the expression of Equation 12 yields $RQ3=-60*1.2=-.72$. In accordance to this embodiment features with values smaller than RQ1 or larger than RQ3 are considered to be outliers.

Determining a List of Rules Based on a Decision Tree

Returning to processing of the decision tree described above, some embodiments identify nodes of a decision tree that have been classified as a single class (e.g. each of identified nodes represents more datasets of the single class than other datasets of a different class). For each one of these identified nodes, a traversal of the decision tree from the identified node to the root node of the tree is performed. All nodes traversed that are also of the single class are identified including the classification rule used by the node.

Some other embodiments identify nodes during the traversal that have a probability of being labeled as the single class, per Equation 5 above, that is greater than a predetermined first threshold. Thus, nodes not labeled as the single class are excluded from this identification of nodes.

Some other embodiments identify nodes of the single class during the traversal for which the Gini score meets a predetermined criterion. Thus, nodes that do not meet the predetermined criterion are excluded from consideration. For example, in some embodiments, consistent with Equation 2 above, some embodiments identify nodes during the traversal that have a Gini score smaller than a predetermined second threshold. Those skilled in the art should recognize that various embodiments may utilize any combination of the conditions of the above three options can be implemented (single class, probability of a class, Gini score criterion, etc.).

For each one of the embodiments, a resulting list of nodes is identified; each node having a decision rule associated with it. This list of nodes is described as an ancestors list below. A rule is then derived from the ancestors list. The derived rule includes a sub-rule from each of the identified nodes included in the ancestor's list. Equation 13 below provides two examples of how rules are derived from the identified nodes of a decision tree:

$$\text{Rule\_\#} = \{(`n1`, f1, `R1`, CV1), \quad \text{Equ. 13}$$
$$(`n2`, f2, `R2`, CV2), \ldots (`nk`, fk, `Rk`, CVk)\}.$$

where:
Rule_# arbitrary index number of the specific ancestors list,
ni the node number from which the rule was derived,
fi the specific feature used for splitting the data,
Ri the inequality used: one of less than or equal to (LE'), less than (LT), greater than or equal to (GE), or greater than (GT),
CVi the conditional value used in the inequality.

For example, the first row of Equation 13 may take the form of $$\text{Rule\_79} = \{(`46`, \text{RSSI}, `GT`, -62)\} \quad \text{Equ. 14a}$$

The above illustrates that rule 79 is based on node 46, and indicates that the RSSI parameter is greater than −62. As indicated by Equation 13, rule 79 may include numerous other conditions not shown here.

In some embodiments, the node number in Equation 13 is not particularly relevant. For illustration purpose, rule 84 may take the form of $$\text{Rule\_84} = \quad \text{Equ. 14b}$$
$$\{(\text{Ave\_RSSI}, `LE`, -52), (\text{Ave\_Num\_Clients}, `LE`, 10.4), \ldots \}.$$

Each line of Equation 14b is considered a sub-rule.

As discussed above, in some embodiments, each target parameter is classified via multiple (e.g., five) thresholds. Each one of the e.g., five thresholds results in a specific decision tree and a corresponding list of rules or ancestor's list. For each target parameter the system combines the lists of rules (e.g., five lists) into a single list of rules for a specific target parameter.

In some embodiments, this process is performed only for a specific target parameter that demonstrates a SLE degradation. In accordance with another example embodiment the process is repeated for multiple target parameters. Rules derived from each of the traversals of the decision trees are combined into a combined rule list. Thus, for each target parameter some embodiments create a combined rule list.

Rule Filtering

Next, for each one of combined list of rules (corresponding to a specific target parameter), some of the disclosed embodiments perform rule filtering. For each one of the feature parameters, the disclosed embodiments scan the ancestor lists of Equation 13 and collect the inequalities and condition values associated with that feature parameter.

This filtered rule information is in the form of $$IR\text{-}fi = [(`R_1`, CV_1, `\text{Rule\_\#}`), \ldots (`R_i`, CV_i, `\text{Rule\_\#}`)] \quad \text{Equ. 15}$$

where:
IR-fi—filtered rule for feature parameter I,
Ri—the inequality used: one of 'LE', 'LT', 'GE', or 'GT',
CVi—the conditional value used in the inequality,
Rule_#—the arbitrary index number of the specific ancestors list.

An example of a filtered rule for the average RSSI is provided below.

IR_Average RSSI={"Average RSSI": [('GT', −56.5, 'Rule_7'), ('LE', −56.5, 'Rule_11') ('LE', −82.5, 'Rule_15') ('LE', −56.5, 'Rule_18') ('GT', −82.5, 'Rule_19') ('LE', −56.5, 'Rule_21') ('LE', −60.5, 'Rule_22') ('LE', −56.5, 'Rule_24') ('GT', −56.5, 'Rule_25') ( . . . ) ( . . . ) ( . . . )]}    Equ. 16 where:
IR_Average RSSI filtered rule for the average RSSI parameter,
'LE' less equal inequality,
'LT' less than inequality,
'GE' greater equal inequality, 'GT' greater than inequality, Rule # index number that is assigned to each ancestor list.

After the filtered rules are determined for each feature, at least some of the disclosed embodiments eliminate redundant rules. In some embodiments, a rule is redundant if another rule, for the same feature parameter, is included in the same ancestor list that already includes that constraint. For example, assume the following filtered rule for a number of streams.

$$\begin{aligned}\text{IR\_Num\_Streams}=\{&\text{``Num\_Streams''}: [(\text{`LE'}, 1.5,\\&\text{`Rule\_12'}), (\text{`LE'}, 2.5, \text{`Rule\_31'}), (\text{`GT'}, 1.5,\\&\text{`Rule\_31'}), (\text{`LE'}, 1.5, \text{`Rule\_43'}), (\text{`GT'}, 1.5,\\&\text{`Rule 44'}), (\text{`GT'}, 1.5, \text{`Rule\_52'}), (\text{`GT'}, 2.5,\\&\text{`Rule\_63'}), (\text{`GT'}, 1.5, \text{`Rule\_63'},) (\text{`GT'}, 1.5,\\&\text{`Rule 74'}), (\ldots), (\ldots), (\ldots)]\end{aligned}$$ Equ. 17

Two rules of Equation 17 originated from the ancestor rule 63, namely:

('GT', 2.5, 'Rule_63')      Rule. 18a, and ('GT', 1.5, 'Rule_63')      Rule. 18b.

When the number of streams is greater than 2.5, the number of streams is also greater than 1.5. Therefore, rule 18b above is deemed to be redundant and can be removed. Eliminating this rule provides a new filtered rule for the number of streams:

$$\begin{aligned}\text{IR\_Nun\_Streams}=\{&\text{``Num\_Streams''}: [(\text{`LE'}, 1.5,\\&\text{`Rule\_12'}), (\text{`LE'}, 2.5, \text{`Rule\_31'}), (\text{`GT'}, 1.5,\\&\text{`Rule\_31'}), (\text{`LE'}, 1.5, \text{`Rule\_43'}), (\text{`GT'}, 1.5,\\&\text{`Rule 44'}), (\text{`GT'}, 1.5, \text{`Rule\_52'}), (\text{`GT'}, 2.5,\\&\text{`Rule\_63'}), (\text{`GT'}, 1.5, \text{`Rule 74'}), (\ldots)]\end{aligned}$$ Equ. 19

As one example, if the filtered rules include a first sub-rule testing whether a parameter is greater than 2.5, and a second filtered sub-rule testing whether the parameter is greater than 1.5, the first rule is redundant, as any parameter value satisfying the second rule also satisfies the first rule. Thus, the first rule can be deleted from the filtered rule set. Similarly, if a third rule tests whether a second feature parameter is less than 1.5, and a fourth rule tests whether a second feature parameter is less than 2.5, the fourth rule is also redundant for similar reasons and can be dropped.

In an example embodiment having four target parameters and five criterion (e.g. evaluating parameter values against five different thresholds), five decision trees for each target parameter are generated. Each one of the five decision trees yields a rule list. In one example implementation these five rule lists are combined into a single combined rule list which is filtered, resulting in a single filtered rule list per feature parameter (for each target parameter).

In some embodiments, a separate rule list is generated from each of the multiple decision trees. These separate rule lists are then processed independently as described above. This results in five separate rules histograms being generated. From these separate histograms, feature parameters are identified, as discussed further below.

Once the list of filtered rules for each feature is obtained, the disclosed embodiments use the filtered rules list to examine the parameter datasets such as those shown in table 3, and more specifically the datasets classified as a particular classification (e.g. class (0)).

Determination of Features That Correspond to Outliers

Some embodiments evaluate each dataset classified as a first classification (e.g. class zero (0)) against a filtered sub-rule set for a feature. This evaluation identifies values of each feature parameter that qualify as outlier values. If a feature parameter value of the dataset satisfies a filtered sub-rule within the set, a determination of whether the feature parameter value is an outlier is made. If the filtered rule is satisfied by a parameter value included in the dataset that qualifies as an outlier, an indication that the sub-rule has been satisfied by an outlier value is stored. Some embodiments store these indications in a rule occurrences list. Also stored in the rule occurrences list, in some embodiments, is an identification of the particular feature parameter and an identification of the particular dataset satisfying the filtered sub-rule (e.g. a row identifier in table 3).

In some embodiments, this process is repeated for each filtered rule list for each feature parameter. Each dataset is evaluated against each filtered rule list. Any dataset satisfying a filtered rule is evaluated to determine if the particular feature parameter value satisfying the filtered rule is an outlier. If it is, an indication of this is stored. Thus, when this process completes, some subset of inverted rules for each feature are marked as being satisfied by an outlier. Also recorded is particular dataset identifiers satisfying the rules (e.g. a row index) and the particular feature parameter satisfying the rule.

Some of the disclosed embodiments then determine which datasets include at least one or more feature parameter values satisfying inverted rules via outlier values. Various embodiments determine datasets for which feature parameter values satisfying one or more inverted rules (in some embodiments, via outlier values). When such a condition is found, some embodiments determine that the feature parameters satisfying the sub-rules are responsible for the dataset having the first classification (e.g. representing anomalous behavior in some embodiments).

Some embodiments modify sub-rules extracted from a decision tree so as to only evaluate to a true value when evaluating a feature parameter value that is an outlier.

The following is an example of a list of sub-rule satisfactions after evaluating datasets of table 3 that are classified as the first classification (e.g. class zero (0)) against a filtered rule list:

list of rule satisfactions ={R17, R8, R89, R178 & R782, ... }      Equ. 20 where:

R# is the index number of an ancestors list.

Some embodiments generate an additional composite rule when a dataset satisfies two or more sub-rules (or two or more sub-rules as well having corresponding outlier values). The composite rule includes conditions satisfying all of the satisfied sub-rules. For example, Equation 20 above illustrates a list of sub-rules including a composite rule which includes two sub-rules (sub-rule 178 and sub-rule 782), both of which satisfying a specific dataset (row) of class 0 in table 3 above.

Rule Selection

Some of the disclosed embodiment sorts the list of rule satisfactions by a frequency of sub-rule and/or composite rule satisfactions. An example of sub-rules and composite rules sorted by frequency of satisfaction is provided in table 5 below.

TABLE 5

| Rule # | Freq. |
|---|---|
| 184 | 83,456 |
| 56 | 78,340 |
| 2,078 | 38,765 |
| 1,367 | 12,976 |

TABLE 5-continued

| Rule # | Freq. |
|---|---|
| 745 | 7,098 |
| 922 | 5,028 |
| 27 | 3,097 |
| 374 | 1,237 |

Some of the disclosed embodiments select a top "n" number of sub-rules and/or composite rules having the highest number of satisfactions. Using the example table 5 above, these embodiments would select sub-rules 184, 56, 2078, 1367 and 745 when selecting a top five (5) rules based on number of satisfactions.

Identifying Features and Feature Combinations Contributing to Poor Performance

Some embodiments identify rule(s) that have a highest number of sub-rule and or composite rule matches. If a feature parameter satisfies a sub-rule condition and, in some embodiments, if the feature value is an outlier, then these embodiments increment a match count for that sub-rule.

Some embodiments determine a correlation between a feature parameter and a target parameter. If a matching sub-rule includes a greater than (GT) inequality, and the feature parameter is classified as a positive correlation feature, and a value of the feature parameter is greater than a factor of the 3rd quartile, some embodiments classify the feature value as a high value. If the feature value is less than a factor of the 1st quartile the feature value is classified as a low value Similarly, if a matching sub-rule includes a LE inequality, the feature parameter is considered a positive correlation feature, and the feature parameter value is greater than a factor of the 3rd quartile, the feature value is classified as high. If a feature value is less than a factor of the 1st quartile, the feature value is classified as low. If there are multiple features classified as either high or low, these commonly classified features joined, in some embodiments, with an AND clause.

The process is repeated for all datasets in the plurality of datasets (e.g. rows of table 3). This results in an identification of frequently satisfied inverted sub-rules that reference particular features and/or feature combinations. The higher the number of satisfactions of sub-rules referencing a specific feature or combination of features, the higher the probability that this feature or combination of features is the reason for the performance deterioration.

The system estimates the probability that a specific feature (or combination of features) is the root cause of performance deterioration by dividing the number of times a feature (or combination of rules) appears in the sub-rules by the total number of sub-rules.

Some embodiments determine a probability that a specific feature parameter $f_i$ is responsible when we observe a failure of a specific client, $C_F$, is estimated by $$P(f_i) = \frac{n(f_i)}{n(C)} \quad \text{Equ. 22}$$

where:
P($f_i$) an estimated probability that a specific feature $f_i$ (or combination of features) is the root cause of performance degradation, n($f_i$) number of times a feature (or combination of features) appears in the sub-rules, n(C) total number of sub-rules.

In some cases, multiple features (or combinations of features) could be identified as the root cause of a SLED. For example, probabilities according to Equation 22 above determined for multiple features (or combinations of features) could be within a threshold distance from each other, and thus, whether a first feature (or combinations of features) of the multiple features or a second feature (or combinations of features) of the multiple features cannot be definitively determined to be a root cause of the SLED. In this case, some embodiments determine a difference between each features value and its respective quartile boundary. Some embodiments select a feature with a greatest outlier value, or in other words, having a greatest normalized difference between its feature value and a respective quartile boundary for the feature. The system then selects f2 over f1 if the normalized absolute difference satisfies the condition:

$$\text{Nabs(value of f2-(Q1 or Q3) of f2)>Nabs(value of f1-(Q3 or Q1) of f1)} \quad \text{Equ. 23}$$

where:
Nabs—the normalized absolute function wherein the are normalized to be off the same scale, e.g., between 1-100.

Thus, some embodiments identify a feature that has deviated the most from the quartile boundaries as the most probable reason for SLED. Some embodiments identify a plurality of contributing features.

Remedial Action

Some embodiments generate one or more indications of monitored system performance. These indications may be collectively referred to as Service Level Metrics (SLM), which indicate a Service Level Experience (SLE). The SLMs indicate how well the monitored system's target parameters conform to values indicating nominal performance. For example, the SLM may provide an indicator of the download speed as a percentage of the nominal download speed e.g., 2 Mb/s. In addition, for each target feature SLM, some embodiments present a list of the probabilities that any of the feature parameters (or combination of feature parameters) contributed to the degradation in the performance as measured by the specific target parameter SLM.

Each one of the features is mapped to a high-level networking concept that can be acted upon. This mapping is performed by a technical person with domain knowledge and stored in the system in a lookup-table. For example, "low RSSI" is mapped to "signal_strength" which in turn is mapped to a concept called "coverage." When some embodiments detect low coverage, they issue an automated command to a radio resource manager to increase the transmission power of an associated radio transmitter. Similarly, in some embodiments, "Chanutil_inf" is mapped to "Wi-Fi interference" which is in turn mapped to a concept called "Capacity". When these embodiments detect Wi-Fi interference, the radio resource manager, in some embodiments, , issues a command to the neighboring interfering radio transmitters to reduce the power they transmit.

Some embodiments display this information (e.g. to an IT technician). The displayed information includes data for one or more of: an identifier of each device, each AP, and each site. This displayed information facilitates an understanding of a state of the Wi-Fi network.

Following are examples of remedial actions that are implemented in one or more of the disclosed embodiments.

In a first example, an RSSI/Signal Strength value is determined to be a reason for SLED. In response to a determination that the RSSI is causing a SLED, some embodiments obtain a current value of RSSI for the device, and determine a path loss (e.g. Equation 24 below) to calculate an estimate distance of the device from a nearest AP.

$$D = \exp((RSSI - TP)/Alpha) \qquad \text{Equ. 24}$$

where:
  D a distance between a device and an AP,
  exp an exponent function,
  RSSI a measured signal strength at a client,
  TP transmitted power,
  Alpha an attenuation factor.

Some embodiments may repeat this calculation using the same RSSI value of first quartile (Q1) for the RSSI ranges. Let this distance be D2. If D1>D2, some embodiments display an instruction (e.g. to a user of the effected device) to move closer to the nearest AP by D2–D1 meters in order to improve upon the "coverage metric" or to "improve RSSI" or "improve signal strength." This remedial action can guide an end-user to improve their own SLE by moving in a specific direction.

In a second example, an embodiment determines that client density of an access point is causing a SLED for wireless terminals (or other devices) associated with the access point. In response to this determination, the embodiment takes one or more of the following actions:
  determine an average number of clients associated with an access point associated with the wireless terminal.
  determine a location of the AP.
  select other APs within a proximity of the AP.
  identify from the identified APs those that are not associated with clients that are experiencing SLED.
  select a subset of the identified APs having an average number of associated clients that is lower than a quartile 4 (Q3) value for the average number of associated clients.
  Calculate a distance between the wireless terminal suffering from the SLED and each one of the identified APs and identify a second AP closest to the wireless terminal based on the distances.
  Instruct the user of the client to move closer to the second AP.

This second example remedial action can result in guiding a mobile terminal end-user to improve their own SLE by instructing them to move in a specific direction. This movement will cause the mobile terminal to disassociate from the overloaded AP and form a new association with a more lightly loaded AP.

In a third example, an embodiment determines that Wi-Fi interference is causing a SLED for a particular wireless terminal or other device. In response to the determination, the embodiment performs one or more of the following operations:
  Compute the difference between a channel interference measurement for the wireless device and a quartile3 (Q3) threshold value for the channel interference measurement.
  if this difference is larger than a predetermined threshold, cause a reduction in a transmission power of the interfering radio.
  Alternatively, if this difference is larger than a predetermined threshold, cause the interfering radio to switch to another channel. Clients associated with an AP including the interfering radio would automatically follow and switch their channel accordingly.

An embodiment determines that a SLED is caused by a combination of two feature parameter values. To resolve the issue, some embodiments compare a number of users that would be affected if a remedial action is taken to improve the first feature parameter value vs. a number of users that would be affected if a remedial action is taken to improve the second feature parameter value. These embodiments then select a remedial action that affects a lower number of users. Another example embodiment considers other factors such as the priority of the various users or data streams, or the severity of the impact of the corrective actions to users. Some embodiments maintain a mapping between root causes of a SLED and remedial actions to be performed when those root causes are detected.

Some embodiments maintain separate sets of SLMs for a plurality of devices participating in a network. For example, a set of service level metrics is maintained for each wireless terminal communicating with an access point managed by the disclosed embodiments, at least in some of these embodiments. Some embodiments maintain SLMs for one or more servers attached to a network, such as an AA server, DHCP server, DNS server, or other server. By maintaining separate SLMs for a variety of devices communicating on a network, the disclosed embodiments are provided with data that can be used to identify a SLED relating to performance of any one of those devices.

Additional remedial actions that are performed in one or more of the disclosed embodiments include restarting a device experiencing a SLED, restarting a DHCP server, restarting an AAA server, restarting a specific router, adding an SSID to an AP, restarting a specific radio on a specific AP, restarting an AP, or downloading a new version of software or firmware to a network component.

FIG. 1 is a diagram of data flow implemented in one or more of the disclosed embodiments. FIG. 1 illustrates datasets 11502. The datasets include a plurality of time-correlated sets or groups of parameter values. The parameter values include values of feature parameters 11532a and target parameters 11532b. The datasets 11502 are organized into rows in some embodiments, with each row representing a single set of time-correlated parameter values, and the datasets 11502 representing a plurality of time correlated parameter values, each set or group or row of parameter values measured or captured during different time periods.

FIG. 1 shows that the datasets 11502 have each been classified into either a first classification 11504 or a second classification 11506. The data flow 11500 illustrates that a decision tree 11508 is generated based on the datasets 11502. The data flow 11500 also illustrates that a rule set 11510 is generated from the decision tree 11508. The rule set 11510 is then inverted to generate a filtered rule set 11512.

The filtered rule set 11512 is then evaluated against each of the datasets 11502, with results of the evaluation stored in an evaluation data structure 11514. Composite rules are generated when two or more sub-rules are satisfied by a particular dataset (e.g. a row) in the datasets 11502. A row for the generated composite rule is then included in the evaluation data structure 11514. The evaluation data structure 11514 indicates which filtered sub-rules (represented by cells of the evaluation data structure 11514) are satisfied by which of the datasets 11502. For example, a first row of the evaluation data structure 11514 corresponds to results of an evaluation of a dataset in a first row of the datasets 11502. Each column of the evaluation data structure 11514 corresponds to a particular feature parameter or the corresponding filtered sub-rule of the filtered rule set 11512. Based on the results of the evaluation data structure 11514, a count of satisfied filtered sub-rules and composite rules is obtained, with the results stored in a rule histogram 11516. Some embodiments select one or more of the highest ranked filtered sub-rules (or composite sub-rules) from the rule histogram 11516 to identify features 11518. The identified features (or combination of features) are those features referenced by the highest ranked filtered sub-rules. Based on the identified features, one or more remedial actions 11520 are identified. These one or more remedial actions 11520 are then performed, at least in some embodiments. In some embodiments, the performance of one or more of the remedial actions 11520 is based on an assessment of the impact of the remedial actions. Some embodiments compare an impact of each of a plurality of remedial actions and select a remedial action to perform, at least in some embodiments, on the comparison. For example, actions having a least impact are selected for performance in some embodiments.

Figure 1B:
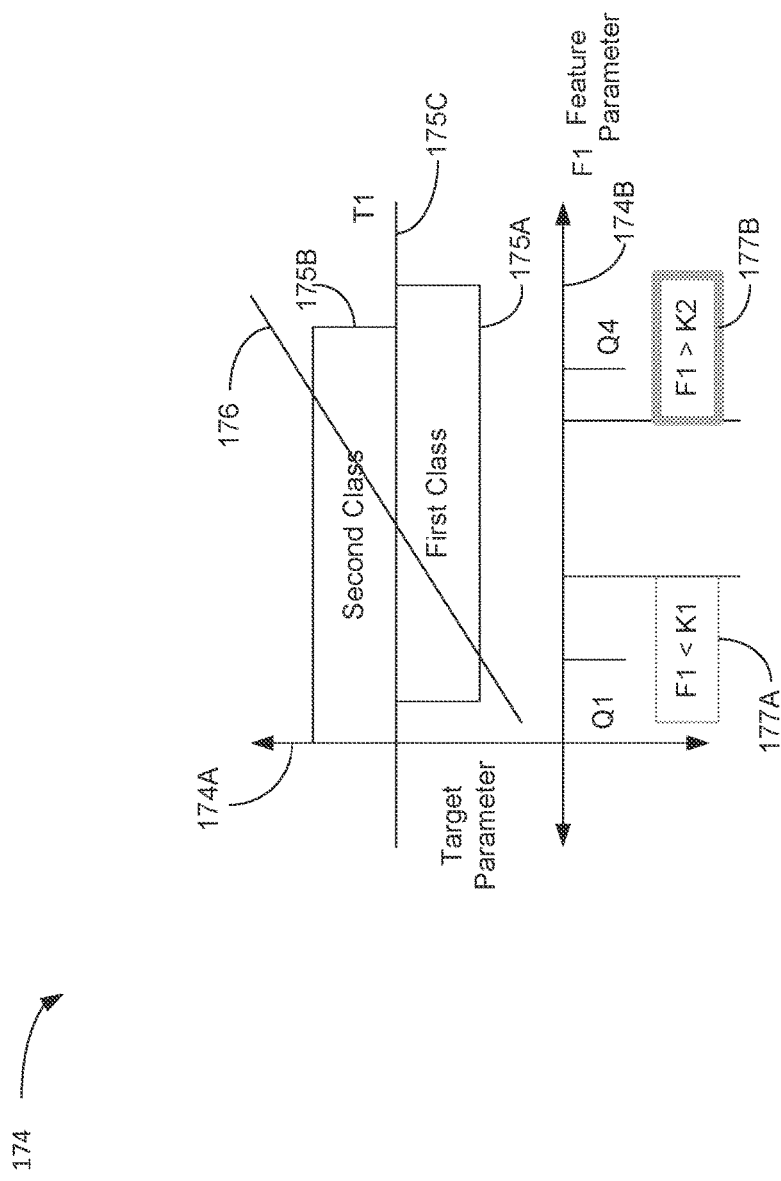
FIG. 1B shows a graph relating target parameter values and feature parameter values.

FIG. 1B shows a graph 174 relating target parameter values and feature parameter values. FIG. 1B shows a y axis 174A and an x axis 174B. The y axis 174A relates a value of a target parameter. The target parameter value is dependent on, in part, a feature parameter value shown by the X axis 174B. Values of the target parameter are classified into a first class 175A or second class 175B based on a threshold value 175C. In the illustrated embodiment of FIG. 1B, the target parameter values of the first class 175A are considered to represent poor SLE, while target parameter values of the second class 175B are considered to represent nominal or acceptable SLE. A correlation line 176 shows that the target parameter is positively correlated with the feature parameter. As shown, as the feature parameter value increases to the right of the graph 174, the target parameter tends to move toward the second class 175B, which, as stated earlier, represents nominal or good SLE.

Also shown in FIG. 1B are two filtered sub-rules, a first filtered sub-rule 177A and a second filtered sub-rule 177B. Filtered sub-rule 177A compares the feature parameter F1 to a first constant K1, and tests whether the feature parameter F1 is less than the constant K1. K1's value is shown on the x axis 174B. The second filtered sub-rule 177B tests whether the feature parameter value F1 is greater than a second constant K2. Some embodiments delete filtered sub-rules positioned in a similar manner as the second filtered sub-rule 177B. The second filtered sub-rule 177B is shown with a bolded border to indicate its deletion in some embodiments. The deletion occurs before evaluation of the filtered sub-rules against the datasets, as discussed above. This avoids including these sub-rules in a tabulation/summation of satisfied filtered sub-rules Consistent with FIG. 1B, the second filtered sub-rule 177B tests for conditions of the feature parameter F1 that tend to be associated with good SLE (e.g. second class 175B given positive correlation shown by the correlation line 176. As some embodiments seek not to consider such rules when determining a root cause of a poor SLE condition, such rules are deleted before evaluation of the filtered sub-rules against the datasets.

Figure 1C:
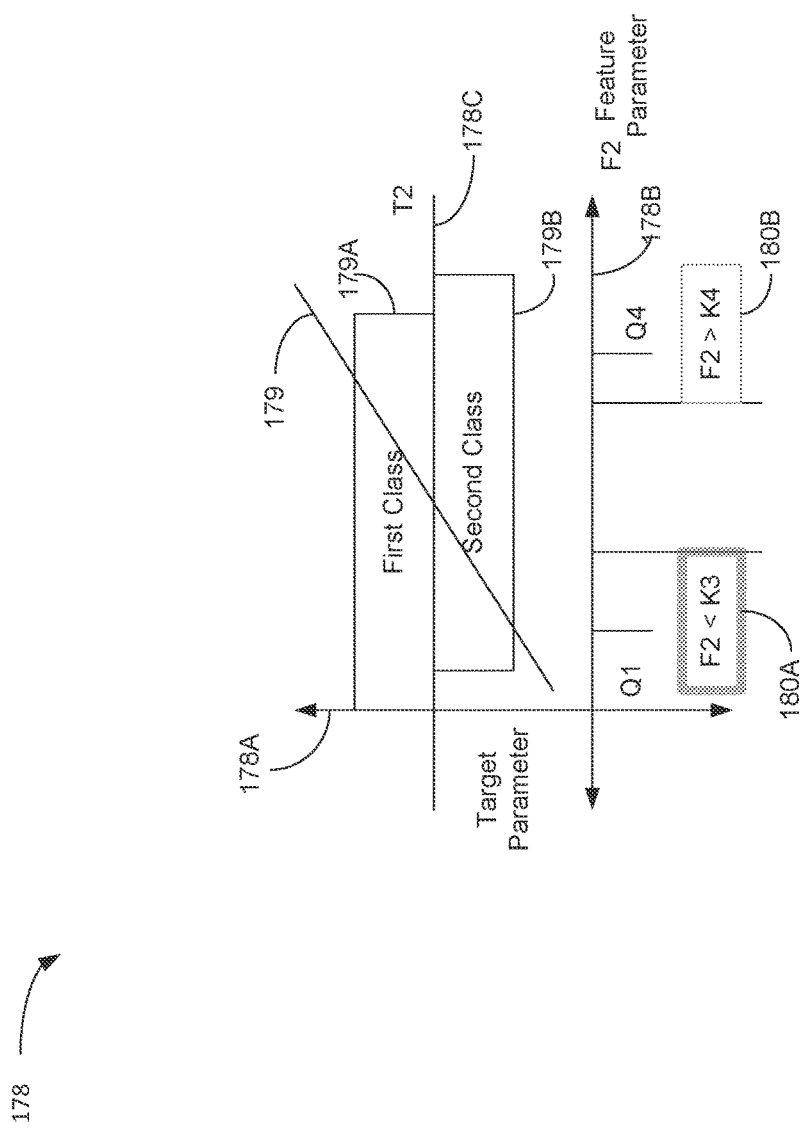
FIG. 1C shows a graph relating target parameter values and feature parameter values.

FIG. 1C shows a graph 178 relating target parameter values and feature parameter values. FIG. 1C differs from FIG. 1B in that target parameter values that are associated with relatively good SLE are lower numerically than target parameter values that are associated with poor or sub-nominal SLE (e.g. the second class values of the target parameter are lower than the first class values).

FIG. 1C shows a y axis 178A and an x axis 178B. The y axis 178A relates a value of a target parameter. The target parameter value is dependent on, in part, a feature parameter value shown by the X axis 178B. Values of the target parameter are classified into a first class 179A or second class 179B based on a threshold value 178C. In the illustrated embodiment of FIG. 1C, the target parameter values of the first class 179A are considered to represent poor SLE, while target parameter values of the second class 179B are considered to represent nominal or acceptable SLE. A correlation line 179 shows that the target parameter is positively correlated with the feature parameter. As shown, as the feature parameter F2 value increases to the right of the graph 178, the target parameter tends to move toward the first class 179A of target parameter values, which, as stated earlier, represent poor SLE. Also shown in FIG. 1C are two filtered sub-rules, a third filtered sub-rule 180A and a fourth filtered sub-rule 180B. The third filtered sub-rule 180A compares the feature parameter F2 to a third constant K3, and tests whether the feature parameter F2 is less than the constant K3. K3's value is shown on the x axis 178B. The fourth filtered sub-rule 180B tests whether the feature parameter value F2 is greater than a fourth constant K4. Some embodiments delete filtered sub-rules positioned in a similar manner as the third filtered sub-rule 180A. The third filtered sub-rule 180A is shown with a bolded border to indicate its deletion in some embodiments. The deletion occurs before evaluation of the filtered sub-rules against the datasets, as discussed above. This avoids including these sub-rules in a tabulation/summation of satisfied filtered sub-rules Consistent with FIG. 1C, the third filtered sub-rule 180A tests for conditions of the feature parameter F2 that are associated with good SLE (e.g. second class 179B given positive correlation shown by the correlation line 179. As some embodiments seek not to consider such rules when determining a root cause of a poor SLE condition, such rules are deleted before evaluation of the filtered sub-rules against the datasets.

Figure 1D:
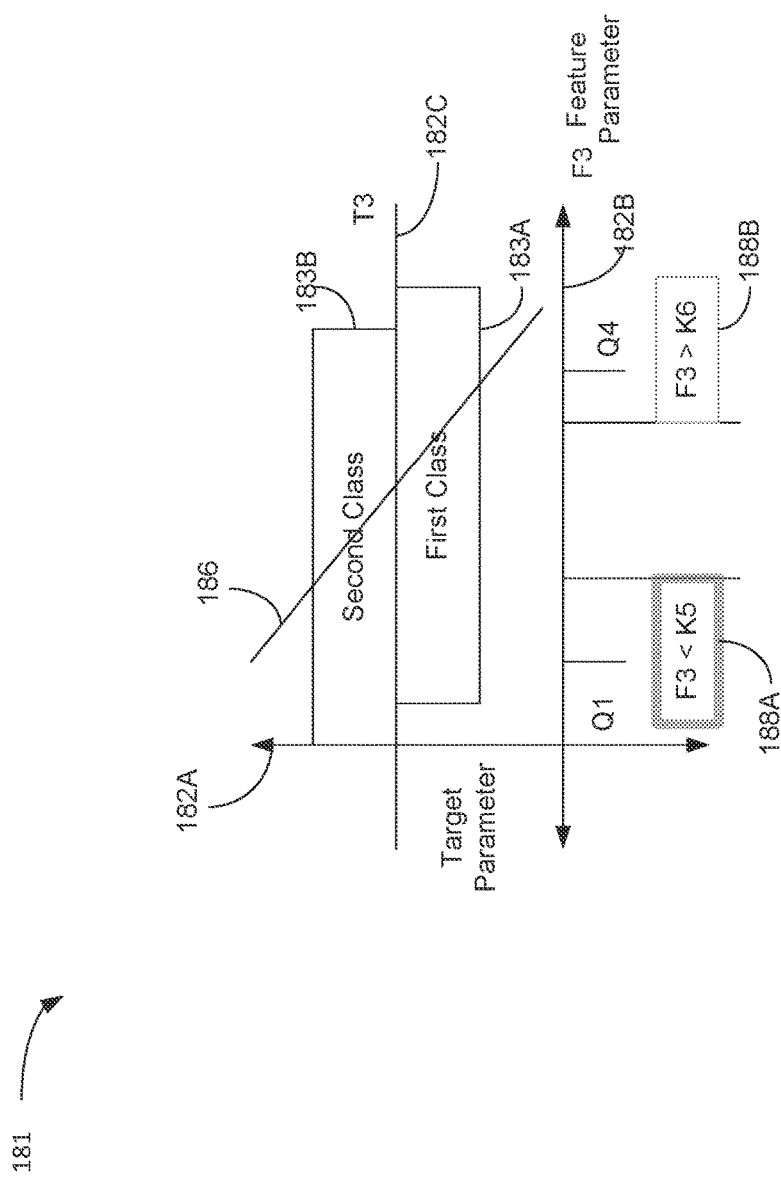
FIG. 1D shows a graph relating target parameter values and feature parameter values.

FIG. 1D shows a graph 181 relating target parameter values and feature parameter values. FIG. 1D shows a y axis 182A and an x axis 182B. The y axis 182A relates a value of a target parameter. The target parameter value is dependent on, in part, a feature parameter value shown by the X axis 182B. Values of the target parameter are classified into a first class 183A or second class 183B based on a threshold value 182C. In the illustrated embodiment of FIG. 1D, target parameter values of the first class 183A are considered to represent poor SLE, while target parameter values of the second class of 183B are considered to represent nominal or acceptable SLE. A correlation line 186 shows that the target parameter is negatively correlated with the feature parameter. As shown, as the feature parameter value increases to the right of the graph 180, the target parameter tends to decrease, and move into the first class 183A, which, as stated earlier, represents poor or sub-nominal SLE.

Also shown in FIG. 1D are two filtered sub-rules, a fifth filtered sub-rule 188A and sixth filtered sub-rule 188B. The fifth filtered sub-rule 188A compares the feature parameter F3 to a constant K5, and tests whether the feature parameter F3 is less than the constant K5. K5's value is shown on the x axis 182B. The sixth filtered sub-rule 188B tests whether the feature parameter value F3 is greater than a constant K6. Some embodiments delete filtered sub-rules positioned in a similar manner as the fifth filtered sub-rule 188A. The fifth filtered sub-rule 188A is shown with a bolded border to indicate its deletion in some embodiments. The deletion occurs before evaluation of the filtered sub-rules against the datasets, as discussed above. This avoids including these sub-rules in a tabulation/summation of satisfied filtered sub-rules Consistent with FIG. 1D, the fifth filtered sub-rule 188A tests for conditions of the feature parameter F3 that tend to be correlated with good SLE (e.g. second class 183B given the negative correlation shown by the correlation line 186. As some embodiments seek not to consider such rules when determining a root cause of a poor SLE condition, such rules are deleted before evaluation of the filtered sub-rules against the datasets.

Figure 1E:
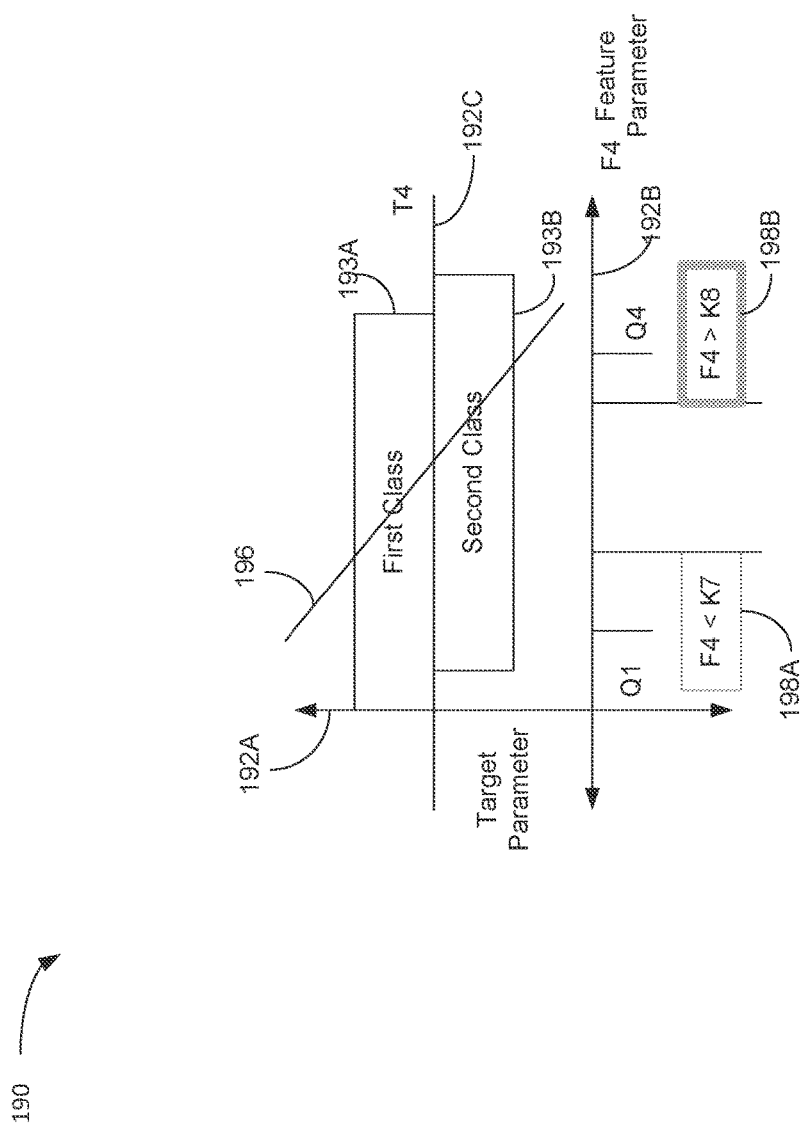
FIG. 1E shows a graph relating target parameter values and feature parameter values.

FIG. 1E shows a graph 190 relating target parameter values and feature parameter values. FIG. 1E differs from FIG. 1D in that target parameter values that are associated with relatively good SLE are lower than target parameter values that are associated with poor or sub-nominal SLE (e.g. the second class values of the target parameter is lower than the first class values).

FIG. 1E shows a y axis 192A and an x axis 192B. The y axis 192A relates a value of a target parameter. The target parameter value is dependent on, in part, a feature parameter value shown by the X axis 192B. Values of the target parameter are classified into a first class 193A or second class 193B based on a threshold value 192C. In the illustrated embodiment of FIG. 1E, target parameter values of the first class 193A are considered to represent poor SLE, while target parameter values of the second class 193B are considered to represent nominal or acceptable SLE. A correlation line 196 shows that the target parameter is negatively correlated with the feature parameter. As shown, as the feature parameter F4 value increases to the right of the graph 190, the target parameter tends to get smaller and move toward the second class 193B, which, as stated earlier, represents nominal or good SLE. Also shown in FIG. 1E are two filtered sub-rules, a seventh filtered sub-rule 198A and an eighth filtered sub-rule 198B. The seventh filtered sub-rule 198A compares the feature parameter F4 to a third constant K7, and tests whether the feature parameter F4 is less than the constant K7. K7's value is shown on the x axis 192B. The eighth filtered sub-rule 198B tests whether the feature parameter value F4 is greater than a fourth constant K8. Some embodiments delete filtered sub-rules positioned in a similar manner as the eighth filtered sub-rule 198B. The eighth filtered sub-rule 198B is shown with a bolded border to indicate its deletion in some embodiments. The deletion occurs before evaluation of the filtered sub-rules against the datasets, as discussed above. This deletion avoids including these sub-rules in a tabulation/summation of satisfied filtered sub-rules. Consistent with FIG. 1E, the eighth filtered sub-rule 198B tests for conditions of the feature parameter F4 that tend to be associated with good SLE (e.g. second class 193B) given the negative correlation shown by the correlation line 196. As some embodiments seek not to consider such rules when determining a root cause of a poor SLE condition, such rules are deleted before evaluation of the filtered sub-rules against the datasets. FIGS. 1B-E demonstrate that some embodiments store, with each target parameter, an indicator of whether the target parameter is positively (e.g. FIGS. 1B-C) or negatively correlated (e.g. FIGS. 1D-E) with good SLE.

Figure 2:
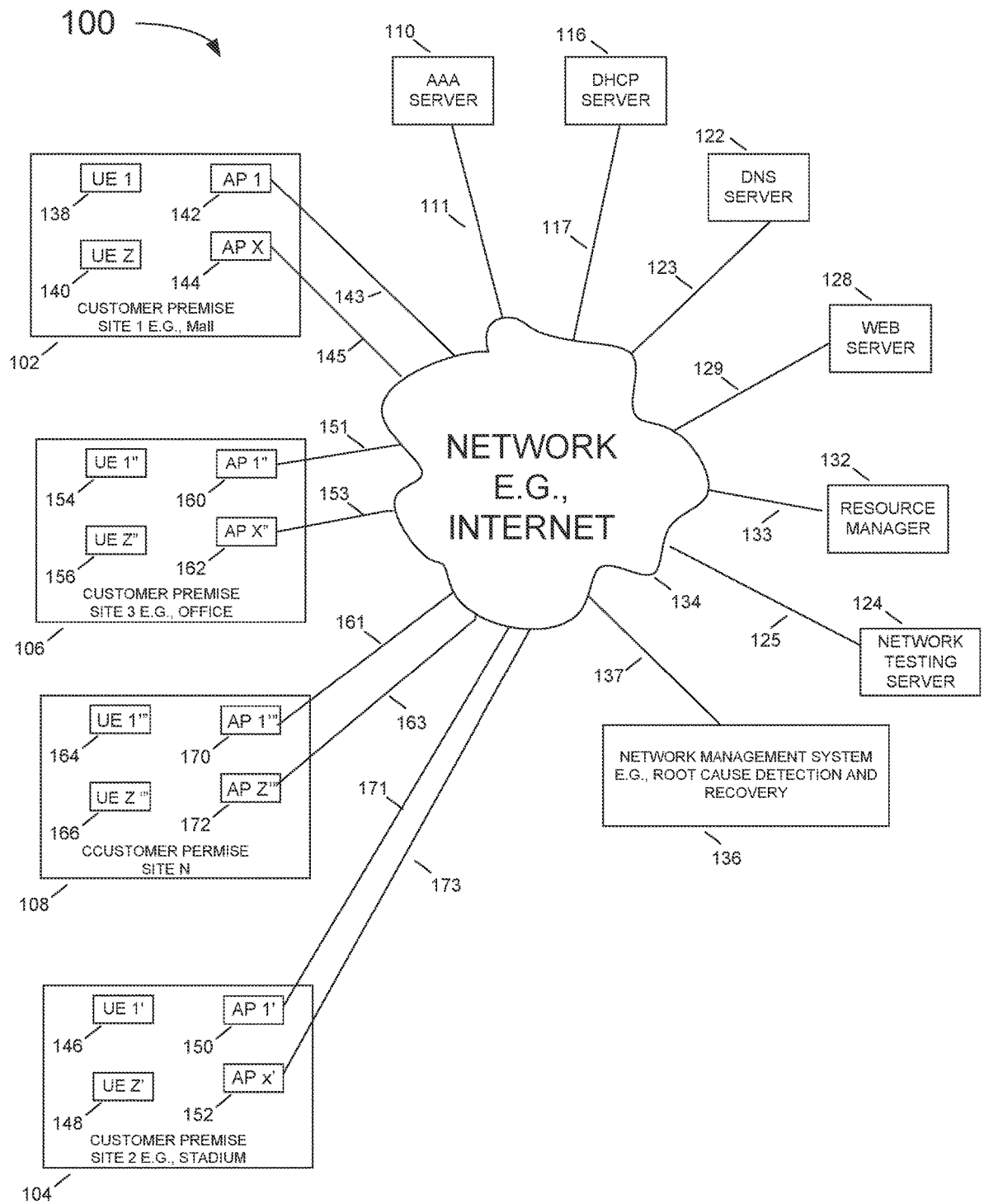
FIG. 2 is a block diagram illustrating an embodiment of a network environment.

FIG. 2 is a drawing of an example system 100 implemented in accordance with an example embodiment. Example system 100 includes a plurality of access points (AP1 142, . . . , AP X 144, AP 1' 150, . . . , AP X' 152, AP 1 " 160, . . . , AP X" 162, AP 1'" 170, . . . , AP X'" 172), , a plurality of Authentication, Authorization and Accounting (AAA) servers (only one AA server 110 is shown), a plurality of Dynamic Host Configuration Protocol (DHCP) servers (only one DHCP server 116 is shown), a plurality of Domain Name System (DNS) severs (only one DNS server 122 is shown), a plurality of Web servers (only one Web server 128 is shown), a plurality of resource managers (only one resource manager 132 is shown), a plurality of Network Testing servers (only one network testing server 124 is shown) and a network management system (NMS) 136, e.g., an access point management system, which are coupled together via network 134, e.g., the Internet and/or an enterprise intranet. Network communications links 143, 145, 151, 153, 161, 163, 171, and 173 couple the access points (AP1 142, AP X 144, AP 1' 150, AP X' 152, AP 1 " 160, AP X" 162, AP 1'" 170, AP X'" 172), respectively, to network 134. Network communications link 111 couple the AA servers (only AA server 110 is shown) to network 134. Network communications link 117 couple the DHCP servers (only one DHCP server 116 is shown) to network 134. Network communications link 123 couple the DNS servers (only one DNS server 122 is shown) to network 134. Network communications link 125 couple the Network Testing servers (only one Network Testing server 124 is shown) to network 134. Network communications link 129 couple the Web servers (only one Web server 128 is shown) to network 134. Network communications link 133 couple the resource managers (only a single resource manager, the resource manager 132 is shown) to network 134. Example system 100 further includes a plurality of clients or user equipment devices (UE 1 138, . . . , UE Z 140, UE 1' 146, . . . , UEZ' 148, UE 1" 154, . . . , UE Z" 156, UE 1'" 164, UE Z'" 166). At least some of the UEs (138, 140, 146, 148, 154, 156, 164, 166) are wireless devices which may move throughout the example system 100. Network communication link 137 couples the NMS 136 to the network 134.

In the example system 100, sets of access points are located at different customer premise site. Customer premise site 1 102, e.g., a mall, includes access points (AP 1 142, . . . , AP X 144). Customer premise site 2 104, e.g., a stadium, includes access points (AP 1' 150, . . . , AP X' 152). Customer premise site 3 106, e.g., an office, includes access points (AP 1" 160, . . . , AP X" 162). Customer premise site N 108 includes access points (AP 1'" 170, . . . , AP X'" 172). As shown in FIG. 1, UEs (UE 1 138, . . . , UE Z 140) are currently located at customer premise site 1 102; UEs (UE 1' 146, . . . , UE Z' 148) are currently located at customer premise site 2 104; UEs (UE 1" 154, . . . , UE Z" 156) are currently located at customer premise site 3 106; and UEs (UE 1'" 164, . . . , UE Z'" 166) are currently located at customer premise site N 108.

UEs such as UE 1 138, . . . , UE Z 140, UE 1' 146, . . . , UE Z' 148, UE 1" 154, . . . , UE Z" 156, UE 1'" 164, . . . , UE Z'" 166, incorporate a module that can interact with the network testing server. When triggered to collect network performance, the client module at least in some embodiments, sends test packets to the Network Testing server. In some embodiments, the Network Testing Server returns the packets directly to the sending client. Alternatively, in accordance with another embodiment, when triggered the Network Testing server sends test packets to the client. The client may then return the packets back to the originating network testing server. In either case, the receiving module as well as the associated AP measures parameters associated with the performance of the network such as target parameters, Wi-Fi devices features, AP features, and WAN features and sends them to the network management servers.

In various embodiments, testing of the network can be invoked by the end user of the client (from the client), by an IT technician (from the Network Testing server), or automatically either in response to system detecting SLED or as part of a reoccurring process e.g., once per hour.

The NMS 136 receives from the Network testing server SLE statistics, e.g., feature parameters and/or target parameters, related to the performance experienced by all of the clients or UEs described above and stores them in memory as illustrated in the example of Table 1. Additionally, the network management system in some embodiments receives AP and WAN feature and/or target parameters from the other network components of the example system 100. The NMS 136 then uses, in some embodiments, predefined thresholds to classify the data into at least two different classes, such as a class zero (0) and a class one (1), establish the associated decision tree, and identify the rules via Equation 13. Inverse sub-rules for each feature parameter are then determined (in some embodiments via Equation 15 and/or 16). These sub-rules are then used to determine an underlying root causes or combination of root causes responsible for/causing a SLED. Once a root cause (or combination of root causes) of a SLED is understood, corrective action is taken. In some embodiments, information indicating the root cause of the SLED is presented, via display, to a system administrator. Some of the disclosed embodiments accept input commanding a corrective action be taken to restore proper SLE.

Figure 3A:
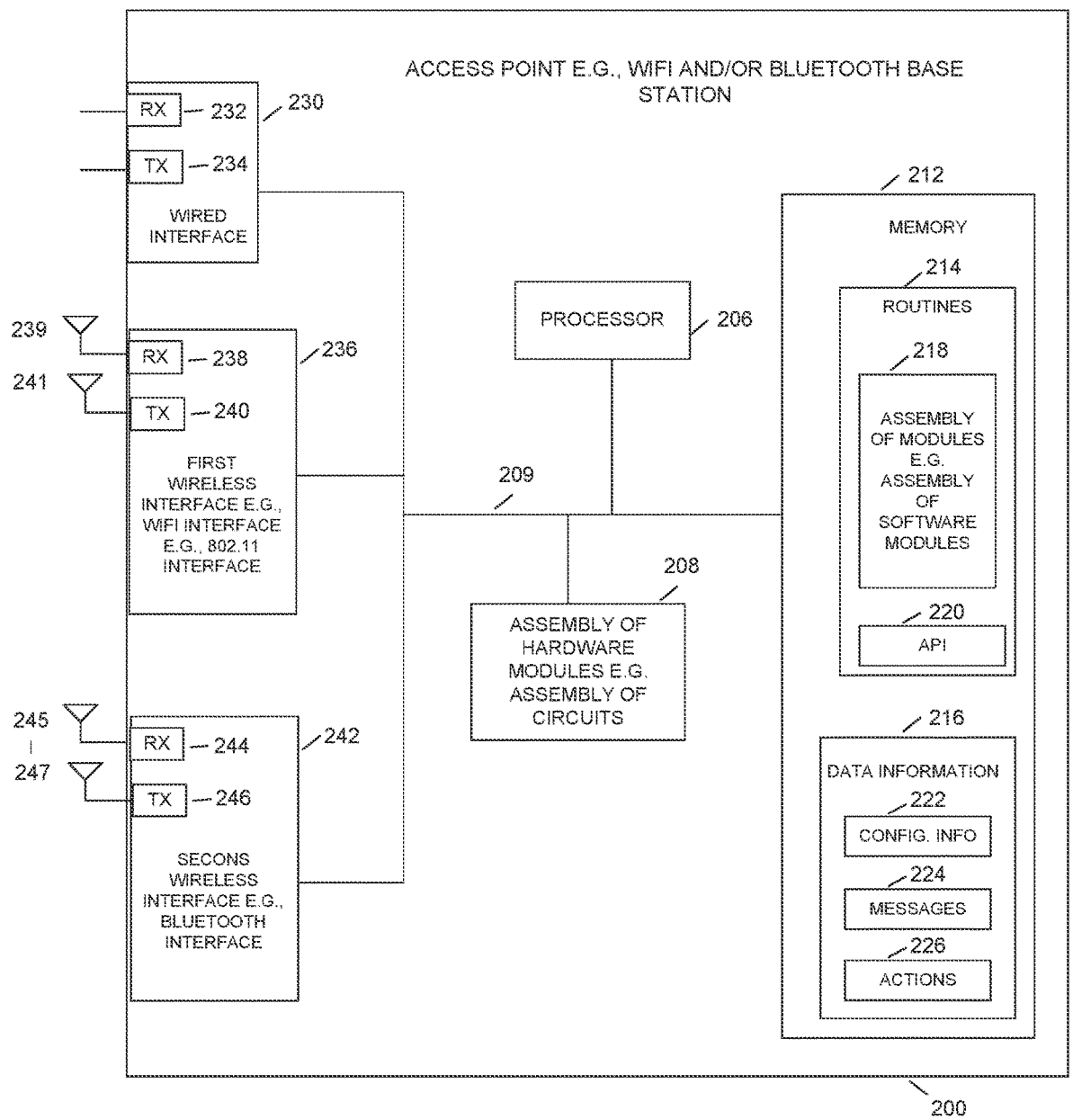
FIG. 3A is a block diagram illustrating an embodiment of wireless access point.

FIG. 3A is shows an example of an access point 200 (e.g., access points AP 1 142, . . . , APX 144, AP 1' 150, . . . , APX' 152, AP 1" 1 160, . . . , APX" 162, AP 1'" 170, . . . , APX'" 172) in accordance with one or more of the disclosed embodiments.

The access point 200 includes wired interfaces 230, wireless interface 236, wireless interface 242, a processor 206, e.g., a CPU, a memory 212, and an assembly of modules 208, e.g., assembly of hardware module, e.g., assembly of circuits, coupled together via a bus 209 over which the various elements may interchange data and information. Wired interface 230 includes a receiver 232 and a transmitter 234. The wired interface 230 couples the access point 200 to a network 134 (e.g. the Internet) of FIG. 1. Wireless interface 236 supports a Wi-Fi interface, e.g. 802.11 interface, includes receiver 238 coupled to receive antenna 239, via which the access point may receive wireless signals from communications devices, e.g., wireless terminals, and transmitter 240 coupled to transmit antenna 241 via which the access point may transmit wireless signals to communications devices, e.g., wireless terminals. Wireless interface 242 may support Bluetooth interface which includes receiver 244 coupled to receive antenna 245, via which the access point may receive wireless signals from communications devices, e.g., wireless terminals, and transmitter 246 coupled to transmit antenna 247 via which the access point may transmit wireless signals to communications devices, e.g., wireless terminals.

Memory 212 includes routines 214 and data/information 216. Routines 214 include assembly of modules 218, e.g., an assembly of software modules, and Application Programming Interface (API) 220. Data/information 216 includes configuration information 222, message event stream capture 224 and collection of remedial actions 226 to be taken in case of discovery of abnormal message flows. In some embodiments, the assembly of modules 218 includes software capable of collecting SLE related parameters and forwarding them the Network Testing server, or directly to the network management system.

Figure 3B:
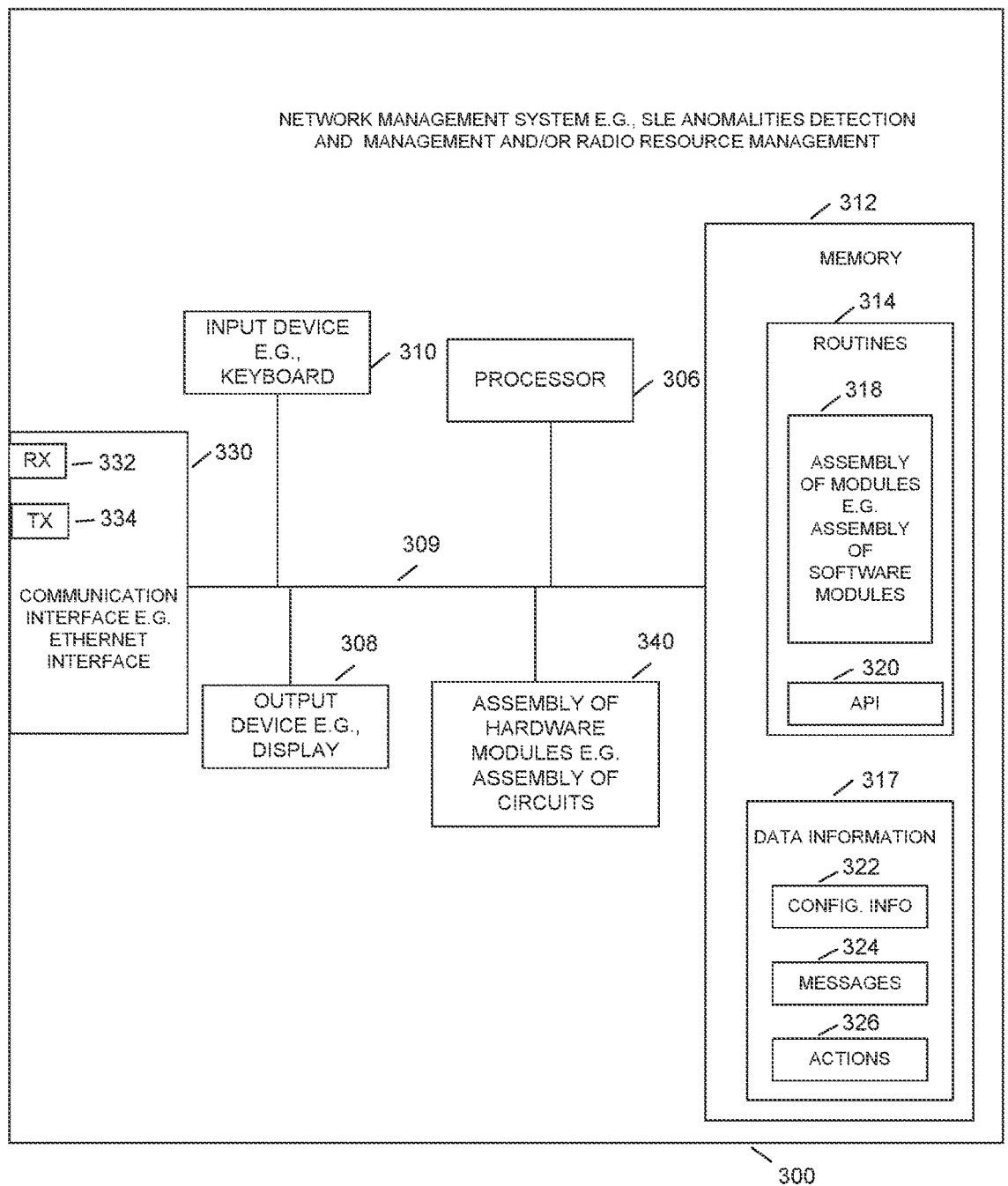
FIG. 3B is a block diagram illustrating an embodiment of network management system that determines which system level experience (SLE) deterioration would require manual intervention.

FIG. 3B shows an example network management system 300, e.g., a wireless system monitoring server, an access point management node, in accordance with one or more of the disclosed embodiments. In some embodiments, network management system 300 of FIG. 3 is equivalent to the NMS 136 of FIG. 2. Network management system 300 includes a communications interface 330, e.g., an Ethernet interface, a processor 306, an output device 308, e.g., display, printer, etc., an input device 310, e.g., keyboard, keypad, touch screen, mouse, etc., a memory 312 and an assembly of modules 340, e.g., assembly of hardware module, e.g., assembly of circuits, coupled together via a bus 309 over which the various elements may interchange data and information. Communications interface 330 couples the network management system 300 to a network and/or the Internet. Communications interface 330 includes a receiver 332 via which the network monitoring system can receive data and information, e.g., including service related information, e.g., message streams, connection time information, and success/failure related information from access points, e.g., for radio connection establishment, AA services, DHCP requests, Simple Notification Service (SNS) look-ups, and Web page requests, and a transmitter 334, via which the network management system 300 can send data and information, e.g., including configuration information and instructions, e.g., instructions to access points to restart, change transmission power, add SSID, etc.

Memory 312 includes routines 314 and data/information 317. Routines 314 include assembly of modules 318, e.g., an assembly of software modules.

Memory 312 includes routines 314 and data/information 317. Routines 314 include assembly of modules 318, e.g., an assembly of software modules, and Application Programming Interface (API) 320. Data/information 317 includes configuration information 322, captured message event stream 324 and collection of remedial actions to be taken in case of discovery of abnormal message flows 326.

The remedial actions may be configured by the system administrator based on past experience. In accordance with some example embodiment, the remedial actions may be downloaded to specific APs. In accordance with other embodiments, the remedial actions are automatically invoked as soon as an abnormal message flow is detected by the messaging model which may reside in memory 312 as well (not shown).

Figure 4:
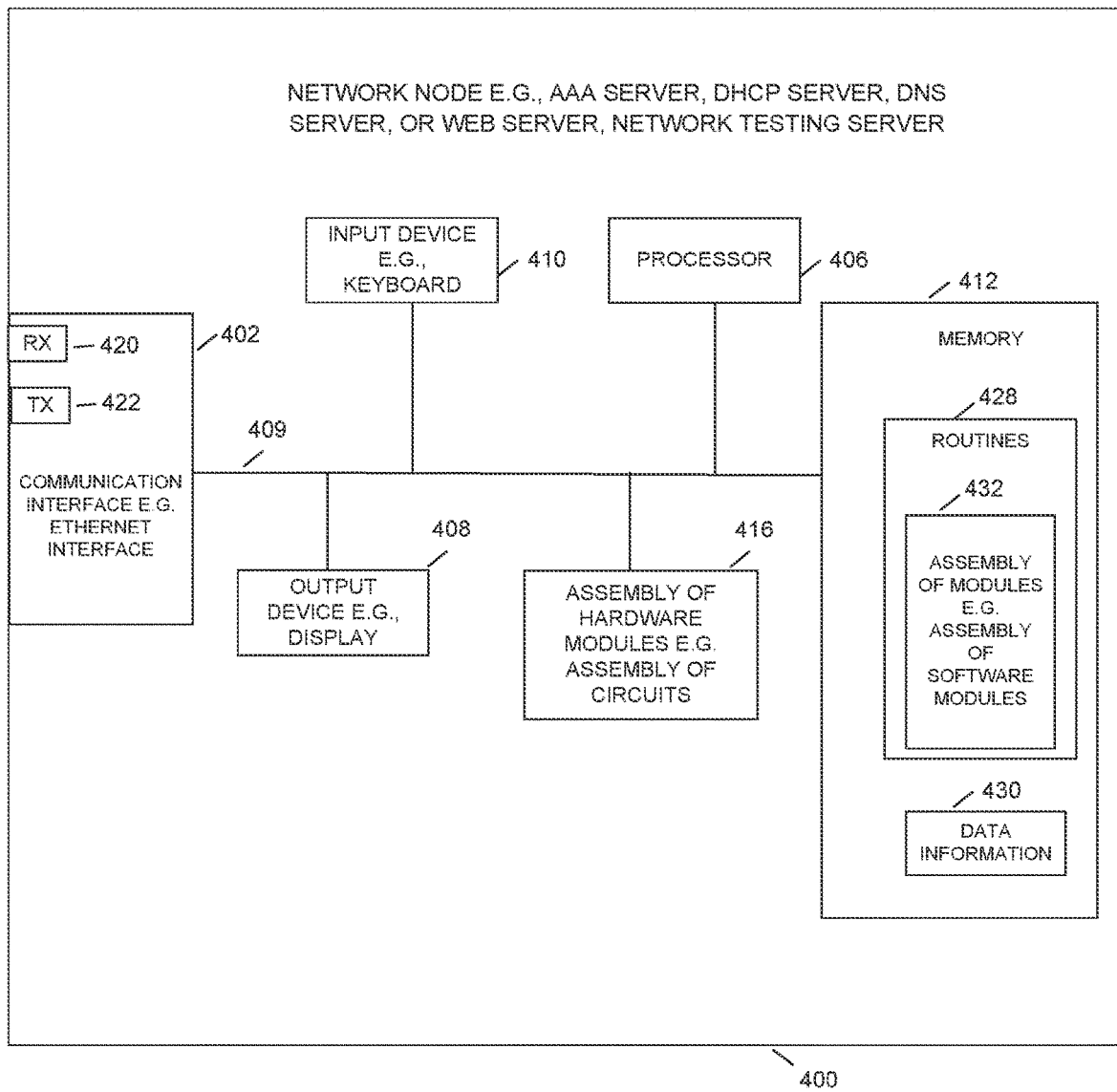
FIG. 4 is a block diagram illustrating an embodiment of network node server.

FIG. 4 shows an example node server 400, e.g., AA server, DHCP server, DNS server, Web server, Network Testing server, etc. In some embodiments, node server 400 of FIG. 4 is server 110, 116, 122, 128, of FIG. 2. Node server 400 includes a communications interface 402, e.g., an Ethernet interface, a processor 406, an output device 408, e.g., display, printer, etc., an input device 410, e.g., keyboard, keypad, touch screen, mouse, etc., a memory 412 and an assembly of modules 416, e.g., assembly of hardware module, e.g., assembly of circuits, coupled together via a bus 409 over which the various elements may interchange data and information.

Communications interface 402 couples the node server 400 to a network and/or the Internet. Communications interface 402 includes a receiver 420 via which the node server can receive data and information, e.g., including operation related information, e.g., registration request, AA services, DHCP requests, Simple Notification Service (SNS) look-ups, and Web page requests, and a transmitter 422, via which the node server 400 can send data and information, e.g., including configuration information, authentication information, web page data, etc.

Memory 412 includes routines 428 and data/information 430. Routines 428 include assembly of modules 432, e.g., an assembly of software modules and data/information 430. Assembly of modules 432 includes modules capable of interacting with the Network Testing server, interact with network devices, initiate sending test packets to the network testing server, send back test packets to the network testing server, measure associated SLE related parameters and forward them to either the network testing server or directly to the network management system.

Figure 5A:
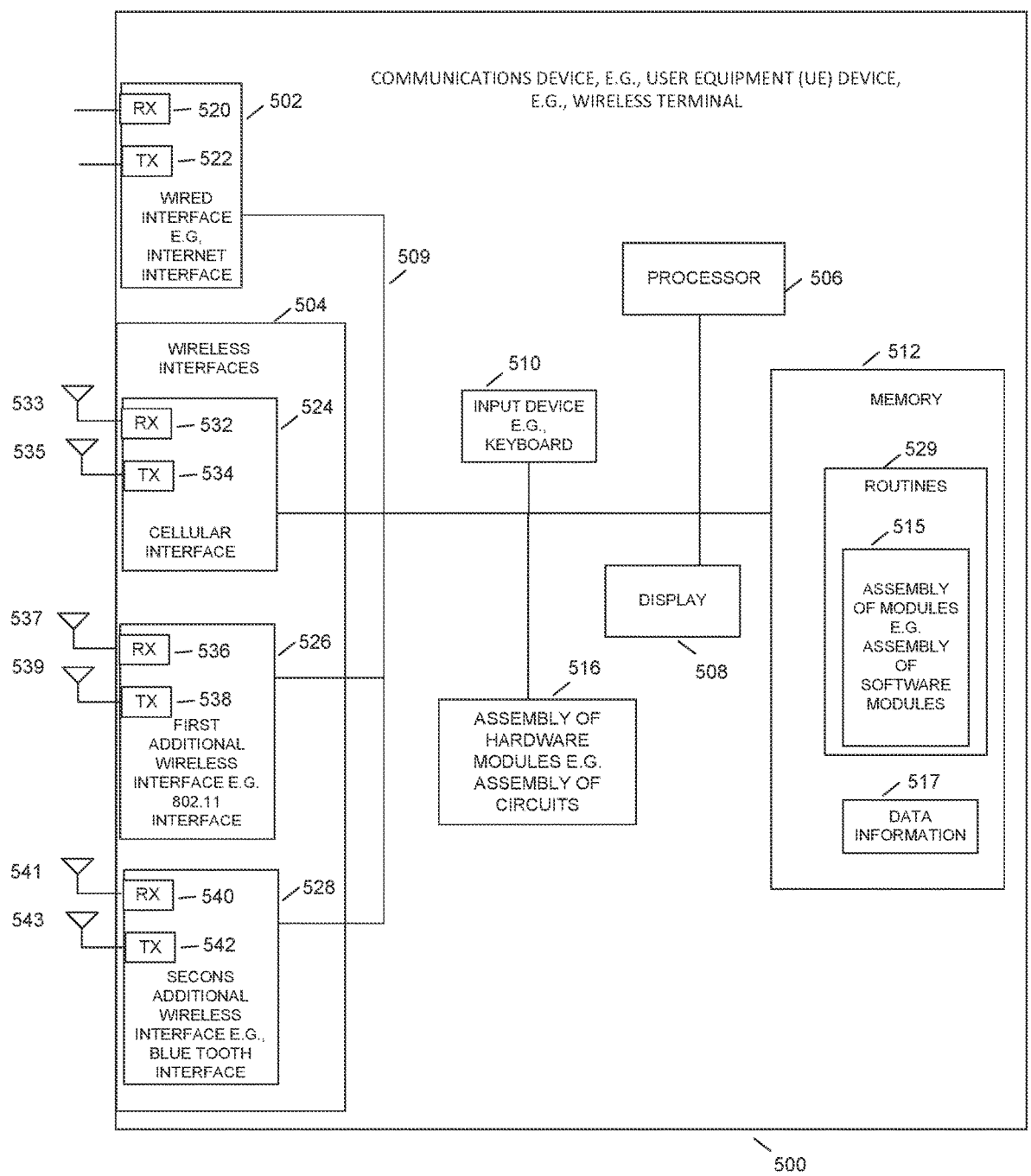
FIG. 5A is a block diagram illustrating an embodiment of communication device such as UE.

FIG. 5A shows an example client such as UE 500 (e.g., user equipment UE 1 138, . . . , UE Z 140, UE 1' 146, . . . , UE Z' 148, UE 1" 154, . . . , UE Z" 156, UE 1'" 164, . . . , UE Z'" 166) in accordance with one or more of the disclosed embodiments.

UE 500 includes wired interfaces 502, wireless interfaces 504, a processor 506, e.g., a CPU, a display 508, an input device 510, a memory 512, and an assembly of modules 516, e.g., assembly of hardware module, e.g., assembly of circuits, coupled together via a bus 509 over which the various elements may interchange data and information. Wired interface 502 includes a receiver 520 and a transmitter 522. The wired interface couples the UE 500 to a network 134 (e.g. the Internet) of FIG. 2.

The wireless interface 504 includes cellular interface 524, first wireless interface 526, e.g., 802.11 Wi-Fi interface, and a second wireless interface 528, e.g., Bluetooth interface. The cellular interface 524 includes a receiver 532 coupled to a receiver antenna 533 via which the access point may receive wireless signals from access points, e.g., AP 1 142, . . . , APX 144, AP 1' 150, . . . , APX' 152, AP 1" 1 160, . . . , APX" 162, AP 1'" 170, . . . , APX'" 172, and transmitter 534 coupled to a transmit antenna 535 via which the access point may transmit wireless signals to APs, e.g., AP 1 142, . . . , APX 144, AP 1' 150, . . . , APX' 152, AP 1" 1 160, . . . , APX" 162, AP 1'" 170, . . . , APX'" 172. First wireless interfaces 526 may support a Wi-Fi interface, e.g. 802.11 interface, includes receiver 536 coupled to receive antenna 537, via which the UE may receive wireless signals from communications devices, e.g., APs, and transmitter 538 coupled to a transmit antenna 539 via which the UE may transmit wireless signals to communications devices, e.g., APs. Second wireless interface 528 may support Bluetooth interface which includes receiver 540 coupled to receive antenna 541, via which the UE may receive wireless signals from communications devices, e.g., APs, and transmitter 542 coupled to a transmit antenna 543 via which the UE may transmit wireless signals to communications devices, e.g., APs.

Memory 512 includes routines 529 and data/information 517. Routines 529 include assembly of modules 515, e.g., an assembly of software modules. Data/information 517 may include configuration information as well as any additional information required for normal operations of UE 500.

FIG. 5B shows a plurality of datasets 550. The plurality of datasets show a plurality of feature parameters 552 and a target parameter 554. FIG. 5B also shows a classification 556 for each of the datasets. The classification 556 is based on a specific value of the target parameter 554.

Figure 5C:
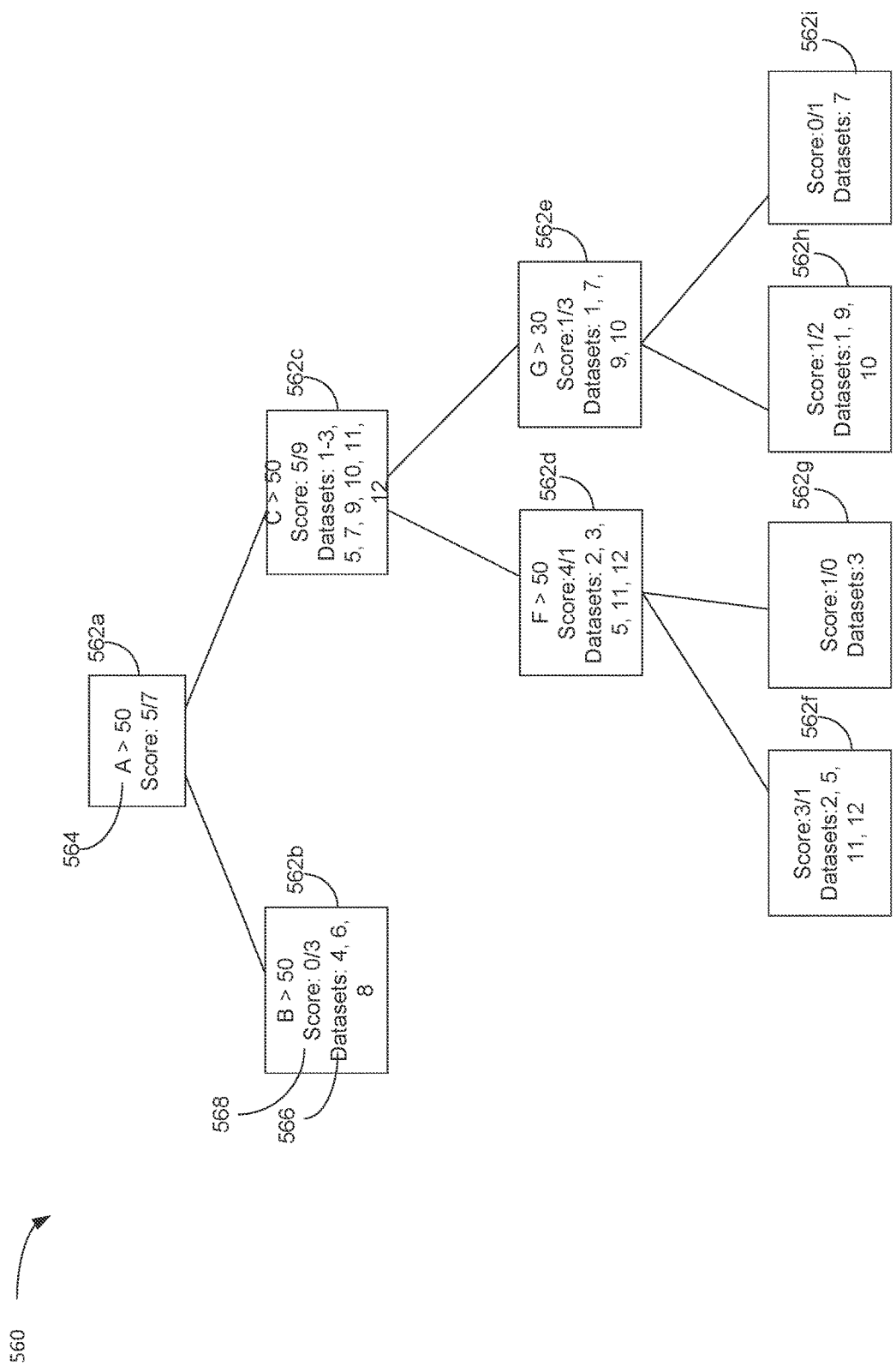
FIG. 5C shows an example decision tree.

FIG. 5C shows an example decision tree 560. The decision tree 560 is generated based on the plurality of datasets 550 illustrated above with respect to FIG. 5A. The decision tree 560 is comprised of a plurality of nodes, with the nodes labeled 562a-i. Each non-leaf node of the decision tree 560 includes a rule. For example, the node 562a includes a rule (or a decision rule) 564. Most of the nodes also indicate which datasets of the plurality of datasets 550, discussed above with respect to FIG. 5A, are represented by the node. For example, node 562b include an indicator 566, indicating that the node 562b represents datasets having an index of 4, 6, and 8. Most of the nodes of the decision tree 560 also indicate a score assigned to the node. The score describes a ratio of datasets represented by the node. The ratio is a ratio between datasets classified as a first class and those classified as a second class. For example, node 562b indicates a score 568 of 0/3, which indicates that node 562b represents no datasets classified as the first class and three datasets classified as the second class (as defined by classification 556).

Figure 6:
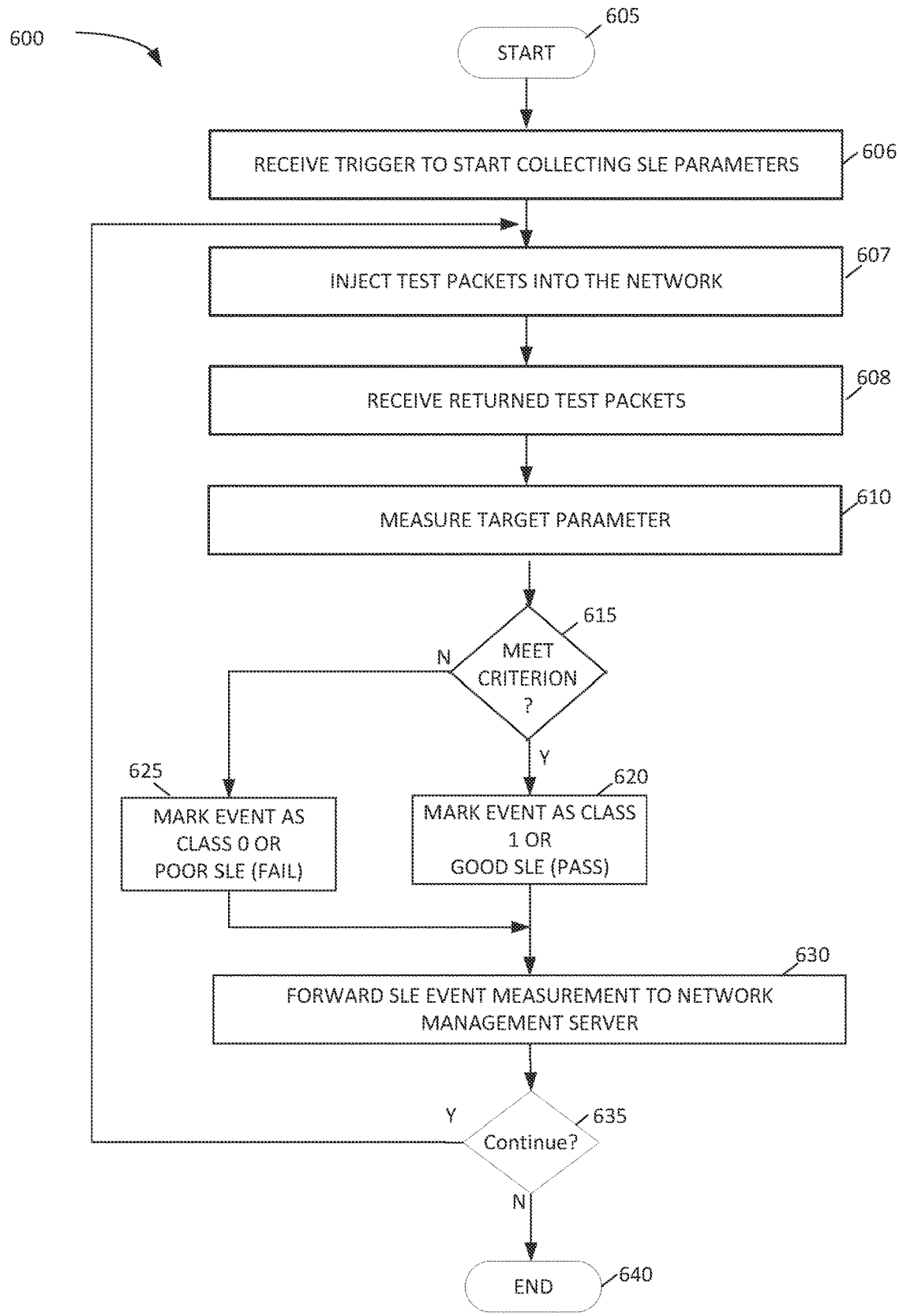
FIG. 6 is a flowchart of an example process for classifying SLE parameters.

FIG. 6 is a flowchart of an example process for classifying SLE parameters. In some embodiments, process 600 discussed below with respect to FIG. 6 is performed by a client or user equipment UE such as UEs (UE 1 138, . . . , UE Z 140), (UE 1' 146, . . . , UE Z' 148), (UE 1" 154, . . . , UE Z" 156 and (UE 1'" 164, . . . , UE Z'" 166), or by a Network testing server 124. A device performing the process 600 collects SLE related parameters such as the feature and/or target parameters described in Table 1. In some embodiments, one or more of the functions discussed below with respect to FIG. 6 and the process 600 are performed by hardware processing circuitry. For example, in some embodiments, any one or more of the processors 206, 306, 406, or 506 are configured by instructions stored in one or more memories (e.g. 212, 312, 412, or 512) to perform one or more of the functions discussed below.

After start operation 605, process 600 moves to operation 606 where a trigger to start collecting SLE parameters is received. The trigger may be activated by the user of a client UE, by an IT technician, invoked automatically when poor SLE is detected by the an automated monitoring process, or be invoked periodically.

Operation 607 injects test packets into the network. In some embodiments, test packets are injected by the client and sent towards the network testing server 124. Alternatively, test packets are sent by the network testing server towards a client which is experiencing SLED. In some embodiments, packets are sent both from the client (UE) to the network testing server and by the network testing server towards the client (UE) experiencing SLED.

In some embodiments, a device receiving a test packet is configured to echo the test packet back to the original sending device.

In operation 608, the original sending deice receives the echoed packet and calculates network parameters such as jitter, throughput, RSSI, round trip time, etc., from the received test packets. Decision operation 610 determines values for target parameters. For example, in some embodiments, a UE or client measures SLE parameters (features and/or target parameters) such as received noise as measured by the HW, received RSSI, calculated SNR, the specific band (e.g., 2.4G/5G), transmission bandwidth, etc.

In some embodiments, one or more of the feature and/or target parameters are measured by each client and sent via an associated access point (AP) to a network management server. In accordance with one embodiment the UE compares the RSSI to a predetermined threshold and determines if the RSSI readout corresponds to a good or failed SLE. In accordance with another embodiment, the UE sends raw RSSI information to the NMS 136, and the comparison against the threshold is performed by the network management server. In either case, the network management server maintains the information whether the RSSI (coverage) is proper or failed.

Decision operation 615 determines whether a SLE measurement meets a criterion. The criterion evaluates whether the specific SLE measurement indicates a good or failed SLE (e.g., class one (1) or class zero (0)). If the operation determines that the measurement corresponds to a good SLE, the process 600 proceeds to operation 620 which marks the event accordingly as corresponding to a good SLE (pass). However, if decision operation 615 determines that the measurement of a target parameter value corresponds to a failed SLE the process proceeds to operation 625, which marks the event accordingly as corresponding to a poor SLE (fail). As explained above the marking of each measured target parameter as fail or pass by the client is optional; in some embodiments, the UE sends the raw measured parameters to the NMS 136 where the labeling of the measured target parameters takes place, at least in some embodiments.

In operation 630, SLE event measurements are forwarded to the NMS 136. Decision operation 635 then determines whether additional SLE parameters should be collected. For example, some embodiments collect a finite number of data points and then stop. Alternatively, in some embodiments, the process 600 terminates when a command is received (e.g. from a user interface) to stop the SLE parameter collection. If the operation determines that the SLE parameter data collection should continue, the process returns to operation 607, which continues to measure and assess its SLE parameters and forward these assessments to the network management server via an AP. However, if there are no additional SLE parameters to measure, the process 600 moves to end operation 640.

Figure 7:
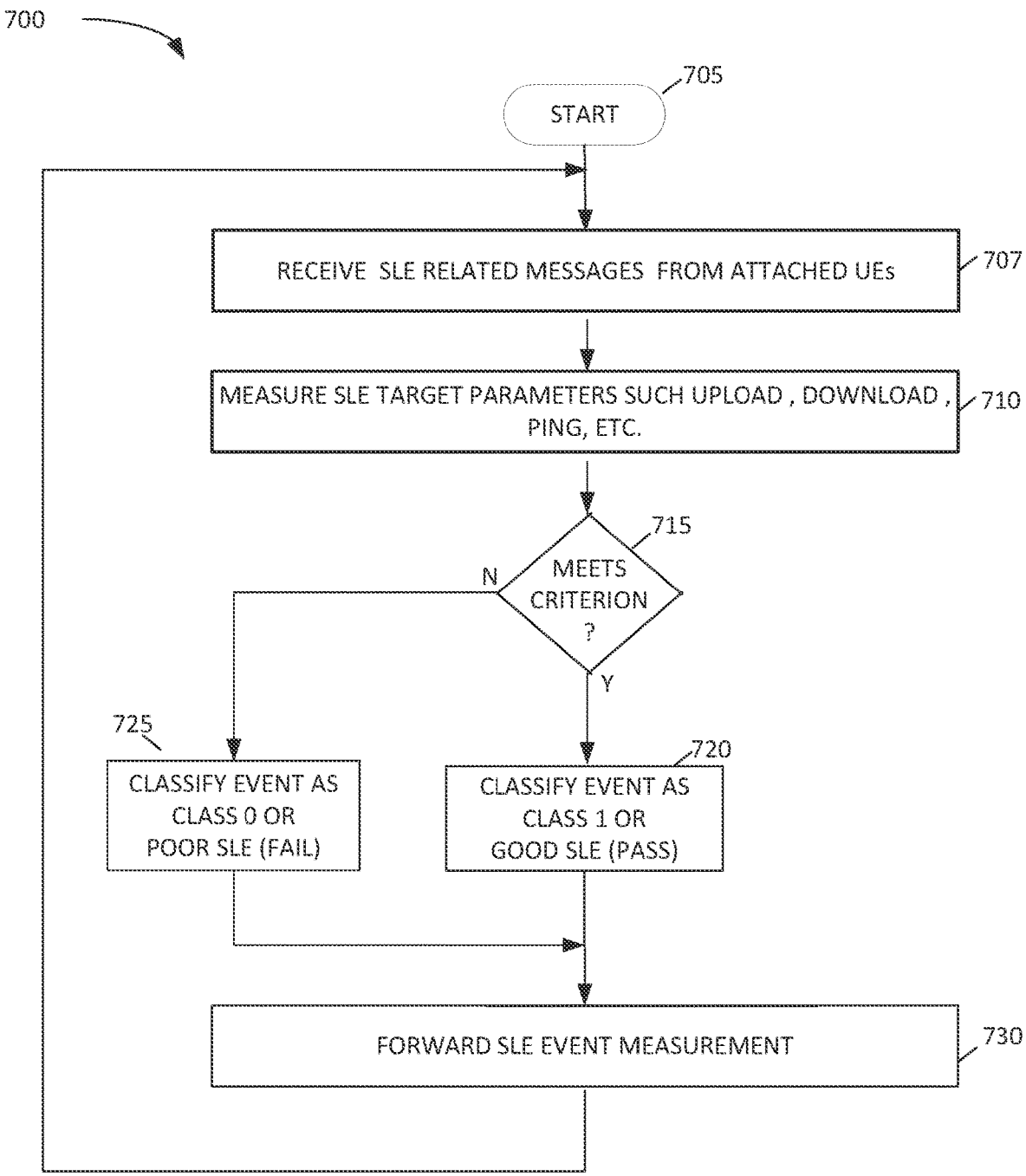
FIG. 7 is a flowchart of an example process of classifying SLE parameters.

FIG. 7 is a flowchart of an example process of classifying SLE parameters. In some embodiments, the process 700 discussed below with respect to FIG. 7 is performed by any one or more of the access points, AP 1 142, . . . , APX 144, AP 1' 150, . . . , APX' 152, AP 1" 1 160, . . . , APX" 162, AP 1''' 170, . . . , APX''' 172. In some embodiments, the device performing the process 700 passes through SLE parameters collected by associated UEs and/or collects SLE related parameters itself and passes these parameters to a network management system (e.g. NMS 136). In some embodiments, one or more of the functions discussed below with respect to FIG. 7 and the process 700 are performed by hardware processing circuitry. For example, in some embodiments, any one or more of the processors 206, 306, 406, or 506 are configured by instructions (e.g. 214, 314, 428, 529) stored in one or more memories (e.g. 212, 312, 412, or 512) to perform one or more of the functions discussed below.

After start operation 705, process 700 moves to operation 707. In operation 707, an AP obtains SLE related messages from UEs associated with the AP. SLE information derived from messages received in operation 707 is forwarded to the NMS 136 in operation 730 described below.

In operation 710, an AP observes and measures SLE parameters (features and/or target) such as one or more of average number of distinct clients attached to the AP, average utilization, average non Wi-Fi utilization, average or utilization in a particular. Those skilled in the art should recognize that some parameters can be measured by either the UE as illustrated in FIG. 6 or by the AP as illustrated by FIG. 7. However, some specific parameters such as a count of failed attempts by a UE to connect via a specific AP can be observed and reported only by an AP (since the UE/client may not be able to send messages over the wireless network).

Decision operation 715 determines whether the SLE measurement corresponds to a good or failed SLE (above or below a corresponding threshold). For example, the AP may compare the average uplink bandwidth of a specific client against a predetermined threshold. If the operation determines that the measurement is higher than the threshold, the process moves to operation 720 where the row is marked as class1 or to a good SLE, e.g., the uplink bandwidth is greater than 300 KB/sec.

However, if it is determined in decision operation 715 that the measurement corresponds to a failed SLE, e.g., the uplink bandwidth is equal or lower than 300 KB/sec, the process proceeds to operation 725 which marks the event accordingly as corresponding to a poor SLE (fail) or class zero (0).

In either case the process continues to operation 730 where the collected statistics from the specific event are forwarded to the NMS 136. As explained above the marking of each measured target parameter as either fail or pass by the AP is optional; In some embodiments, the AP sends the raw measured parameters to the NMS, 136 where the labeling of the measured target parameters takes place, at least in some embodiments.

Process 700 then returns to operation 707. Note that while both FIG. 6 and FIG. 7 describe UE and AP classification of SLE parameters into one of two classes, in some embodiments, this classification is performed by a network management server and not individually by UE's and/or APs. Thus, in these embodiments, the process 600 omits decision operation 615 and operations 620, and 625. Similarly, in these embodiments, process 700 omits decision operation 715, and operations 720 and 725.

Figure 8:
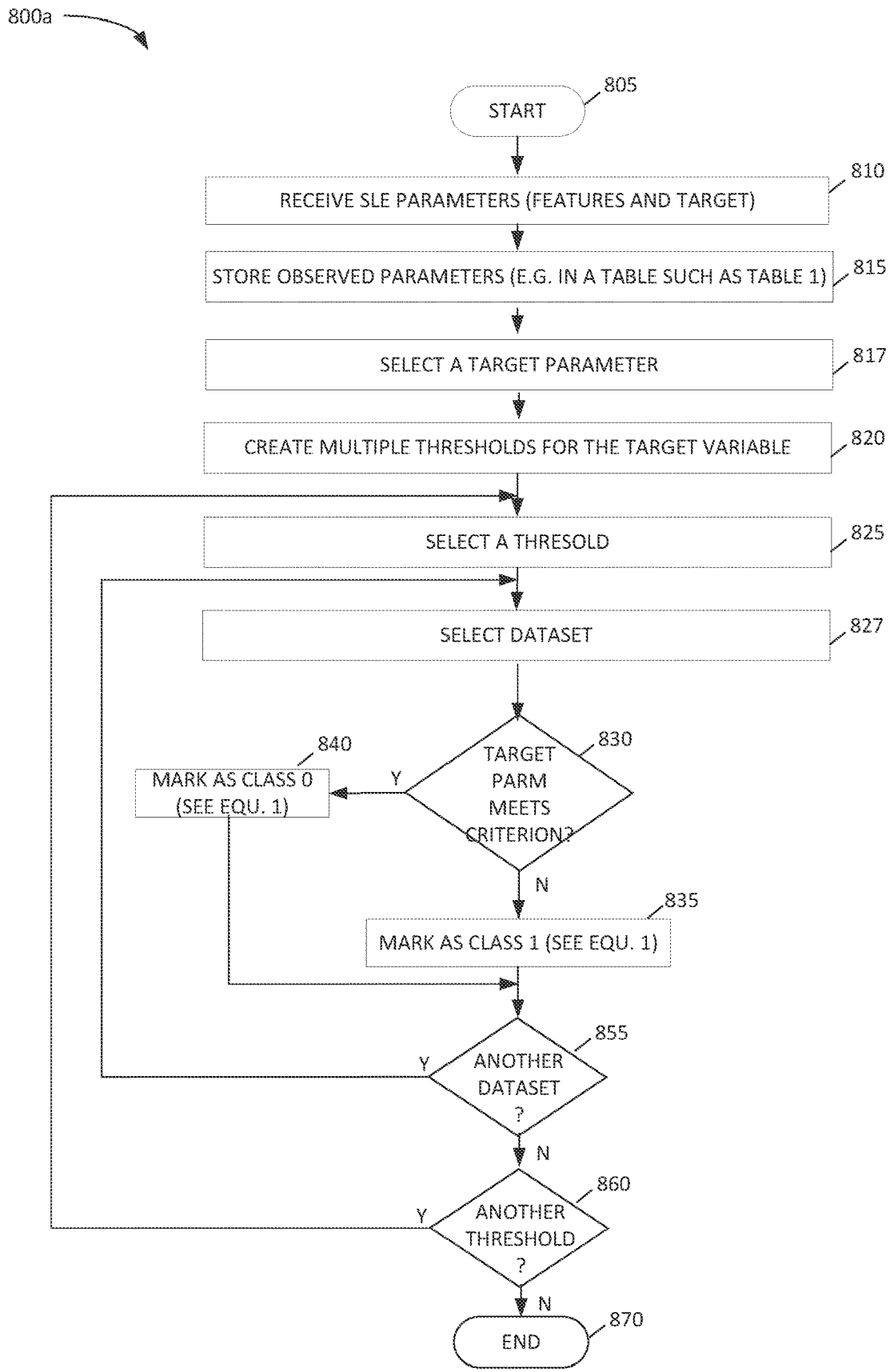
FIG. 8 is a flowchart of an example process for classifying datasets.

FIG. 8 is a flowchart of an example process for classifying datasets, such as illustrated above with respect to Tables 2 and 3. In some embodiments, the method 800a discussed below with respect to FIG. 8 is performed by a network management system (e.g. NMS 136). In some embodiments, one or more of the functions discussed below with respect to FIG. 8 and the method 800a are performed by hardware processing circuitry. For example, in some embodiments, any one or more of the processors 206, 306, 406, or 506 are configured by instructions (e.g. 214, 314, 428, 529) stored in one or more memories (e.g. 212, 312, 412, or 512) to perform one or more of the functions discussed below.

After start operation 805, method 800a moves to operation 810, which receives one or more SLE feature and target parameters such as those described above. In some embodiments, these parameters are received from clients and APs such as those illustrated in FIG. 2. Time correlated groups of parameter values form a dataset as described above.

In operation 815, the received feature and target parameter values are stored as time correlated parameter values or datasets. For example, some embodiments represent the received feature and target parameter values in a data structure similar to the example of table 1 above.

Operation 817 selects a specific target parameter (e.g., Tj of table 1). In operation 820, multiple thresholds (e.g., 5), are determined for the selected target parameter. In some embodiments, the thresholds are selected randomly within a range between a smallest and a largest values of the selected target parameter (e.g., Tj of table 1).

Operation 825 selects a threshold of the multiple thresholds. Operation 827 selects a dataset. As discussed above, a dataset is a plurality of time correlated parameter values, such as values included in a single row of any one of tables 1, 2, or 3, discussed above.

Decision operation 830 determines whether a target parameter value included in the selected dataset meets a classification criterion. In some embodiments, the criterion evaluates the target parameter value against the selected threshold. Depending on whether the target parameter value meets the criterion or not, each of operations 835 and 840 classify the dataset as either a first classification (e.g. operation 835) or a second classification (e.g. operation 840).

After the dataset has been classified, decision operation 855 determines whether there are additional datasets to classify with respect to the selected threshold for the target parameter (of operation 825). If additional datasets do need to be classified, method 800a moves to operation 827, which selects a new dataset.

Processing then returns to decision operation 830. If all datasets have been classified according to the selected threshold, method 800a moves from decision operation 855 to decision operation 860, which determines if another threshold of the multiple thresholds can be selected and used for additional classifications of the datasets. If more thresholds are available, method 800a moves from decision operation 860 to operation 825, which selects a threshold of the multiple thresholds that is different from any thresholds used in a previous iteration of method 800a. Processing then continues from operation 825 as described above. If all thresholds of the multiple thresholds have been used to classify the datasets, method 800a moves from decision operation 860 to end operation 870.

Figure 9:
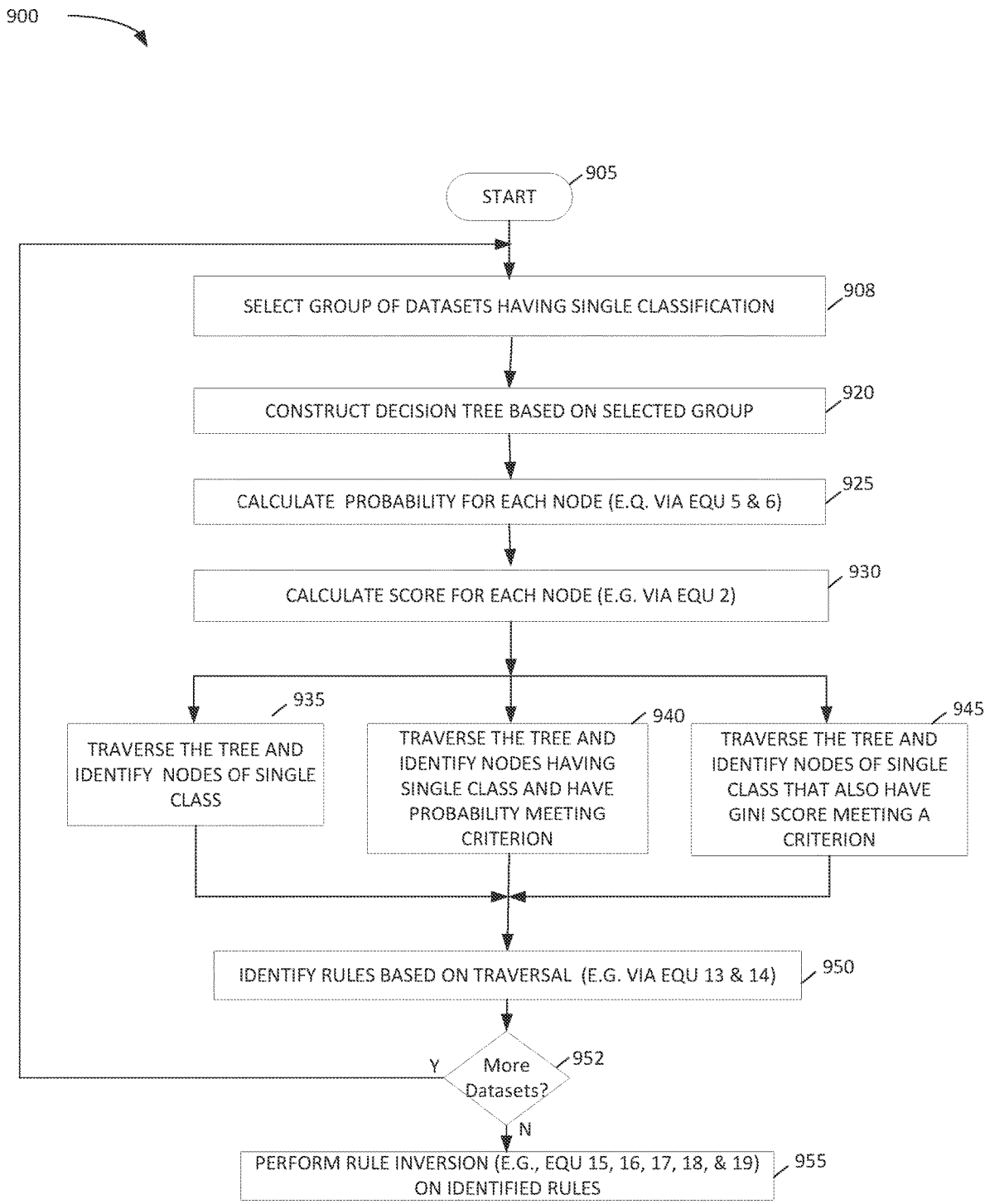
FIG. 9 is a flowchart of an example process for generating a filtered sub-rule set.

FIG. 9 is a flowchart of an example process for generating a filtered sub-rule set. In some embodiments, the filtered sub-rule set is generated based on datasets classified according to method 800a, discussed above with respect to FIG. 8.

One or more of the functions discussed below with respect to FIG. 9 is performed, in some embodiments, by hardware processing circuitry (e.g. any of 206, 306, 406, 506). For example, in some embodiments, instructions (e.g. 214, 314, 428, 529) stored in an electronic memory (e.g. any of 208, 340, 416, 516) configure the hardware processing circuitry to perform one or more of the functions discussed below. In some embodiments, process 900 is performed by the NMS 136.

After start operation 905, process 900 moves to operation 908. Operation 908 selects a first group of datasets having a single classification. For example, as discussed above with respect to Tables 1-3, a group of datasets are classified according to a single target parameter and a criterion applied to that target parameter. This classification partitions the datasets into two groups, each group having a different classification. Operation 908 selects one of these groups of datasets, where each dataset in the group has the same classification. In some embodiments, operation 908 relies on dataset classifications performed by method 800a, discussed above with respect to FIG. 8.

Process 900 continues to operation 920 where a decision tree is constructed from all the datasets based on the selected group of datasets.

Operation 925 computes a probability, for each non-leaf node in the decision tree, that any other node below the node in the decision tree is of the single classification. Some embodiments utilize Equations 5 and/or 6 to compute the probability. In embodiments that do not limit a depth of the decision tree, a probability associated with each leaf node is either zero or one, depending on whether the leaf node represents datasets having either the first single classification or the second classification.

Operation 930 determines a Gini score for each non-leaf node of the decision tree (e.g. via Equation 2).

Operations 935, 940, and 945 describe alternative methods of selecting a list of nodes from the decision tree (ancestor list, as discussed above).

Some embodiments perform operation 935, which traverses the decision tree and identifies nodes of the single class. As discussed above, some embodiments classify a subject node of a decision tree as a particular class if a majority of nodes in the subject node are classified of the particular class. Some embodiments perform operation 940, which identifies nodes of the decision tree classified as the single class but that also have a probability of being of the single class (e.g. as determined by operation 925) that meets a criterion (e.g. above a predetermined threshold) (e.g., a probability greater than 66% of belonging to a class zero (0)).

Some embodiments perform operation 945, which traverses the decision tree and identifies nodes having the single class, and that also have a Gini score lower than a predetermined Gini score threshold. For example, some embodiments identify nodes having a Gini score smaller than 0.25. Thus, these embodiments compare each node's Gini score to a predetermined threshold, and classify a node based on the node's respective comparison.

Process 900 then moves to operation 950 where rules are identified based on the identified nodes (identified via the traversal of the decision tree). Some embodiments of operation 950 are consistent with one or more of Equation 13 or 14 when generating the rules.

Decision operation 952 determines if there are additional grouped datasets (e.g. grouped based on a different threshold for the given target SLE parameter). If there are additional grouped datasets available, process 900 returns to operation 908, where a different group of datasets having the single classification are selected. Processing then continues from operation 908 as described above. Process 900 continues to iterate until the groups of datasets (each group corresponding to a specific threshold of the target parameter) have all been processed and rules extracted from their respective decision trees.

If decision operation 952 determines that there are no additional groups of datasets to be processed, the process continues to operation 955 where rule filtering is performed on the generated rules. Some embodiments perform rule filtering consistent with the explanation provided above, and in some embodiments, including any one or more of Equations 15 through 19 described above.

Figure 10:
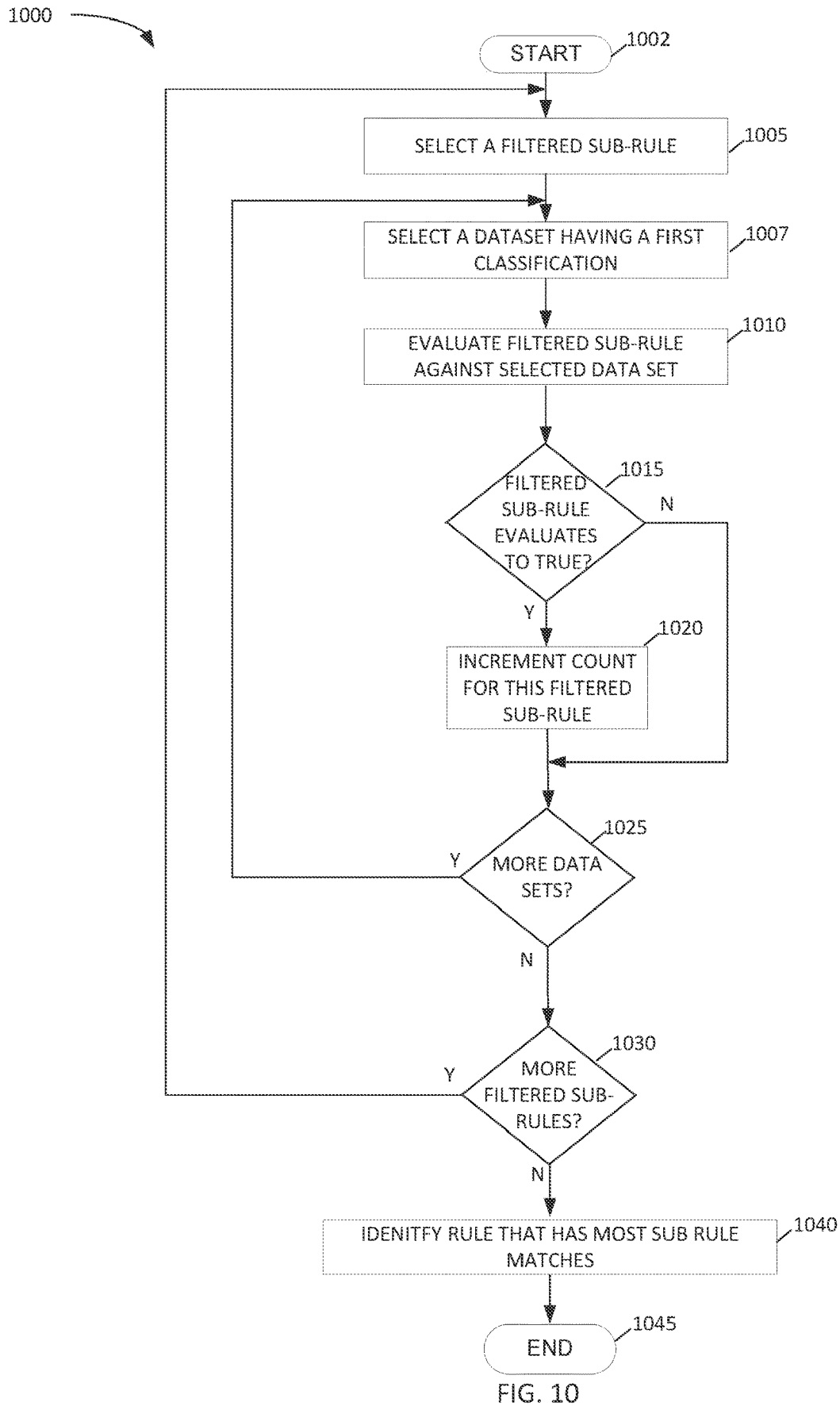
FIG. 10 is a flow chart of an example process for identifying rules that have a largest number of matching filtered sub-rules.

FIG. 10 is a flow chart of an example process for identifying rules that have a largest number of matching filtered sub-rules. In some embodiments, method 1000 operates on a list of filtered rules. The list of filtered rules is generated, in some embodiments, by process 900 discussed above with respect to FIG. 9. One or more of the functions discussed below with respect to FIG. 10 is performed, in some embodiments, by hardware processing circuitry (e.g. any of 206, 306, 406, 506). For example, in some embodiments, instructions (e.g. 214, 314, 428, 529) stored in an electronic memory (e.g. any of 208, 340, 416, 516) that configure the hardware processing circuitry to perform one or more of the functions discussed below. In some embodiments, method 1000 is performed by the NMS 136.

After start operation 1002, method 1000 moves to operation 1005, which selects a filtered sub-rule from a filtered sub-rule set. In some embodiments, operation 1005 selects a filtered sub-rule that has not yet been processed by method 1000. As discussed further below, method 1000 is designed to iterate through filtered sub-rules and evaluate each filtered sub-rules against datasets to determine which rule has the most matching filtered sub-rules.

Operation 1007 selects a dataset having a first classification. For example, as discussed above, some embodiments store a plurality of datasets and then classify the datasets according to criterion. Some embodiments perform multiple classifications on the plurality of datasets using different criterion (e.g. in some embodiments, as discussed above, each criterion compares a target parameter to different predetermined threshold to perform the classification).

In operation 1010, the selected dataset is evaluated against the selected filtered sub-rule. As a filtered sub-rule generally only includes reference to a single feature or target parameter, evaluating the dataset against the filtered sub-rule comprises evaluating the feature value in the dataset that matches the feature referenced in the filtered sub-rule. Parameter values included in the dataset that do not match feature referenced by the selected filtered sub-rule are ignored by the evaluation of operation 1010.

Decision operation 1015 determines if the currently selected filtered sub-rule evaluates to true against the selected dataset. If the filtered sub-rule does not evaluate to true, method 1000 moves from decision operation 1015 to decision operation 1025, discussed below. If the filtered sub-rule does evaluate to a true value, method 1000 moves from decision operation 1015 to operation 1020. Some embodiments of decision operation 1015 further evaluate whether the value evaluated by the rule is an outlier value. In these embodiments, the rule is considered to only evaluate to true if the value is an outlier.

In operation 1020, a count is incremented indicating a number of times the currently selected filtered sub-rule has evaluated as true against one of the datasets or how many times a composite sub-rule evaluates to a true value when evaluated against one of the datasets. Method 1000 then moves from operation 1020 to decision operation 1025.

Decision operation 1025 determines if additional datasets are to be evaluated against the filtered sub-rule. If there are datasets that remain to be evaluated against the currently selected filtered sub-rules, method 1000 moves from decision operation 1025 to operation 1007, which selects a dataset not yet evaluated against the currently selected filtered sub-rule. Otherwise, if all datasets have been evaluated against the currently selected sub-rule, method 1000 moves from decision operation 1025 to decision operation 1030.

Decision operation 1030 determines if there are additional filtered sub-rules to evaluate against the datasets. If there are further filtered sub-rules to evaluate, method 1000 moves from decision operation 1030 to operation 1005, which selects an additional sub-rule that has not yet been evaluated by method 1000. Otherwise, if all sub-rules have been evaluated, method 1000 moves from decision operation 1030 to operation 1040, which identifies a rule having the most sub-rule matches. If two or more feature parameters of a particular dataset satisfy a filtered sub-rule, some embodiments generate a composite rule that includes both filtered sub-rules and joins then with a logical "and" operator. These embodiments then add the newly generated composite rule, and its included filtered sub-rules to the tally of the satisfaction of sub-rules and composite sub-rules. As discussed above, some embodiments generate multiple decision trees, which may result from applying multiple criterion to a single target parameter, and/or from applying criterion to multiple target parameters. In these embodiments, the filtered sub-rule satisfaction counts include the filtered sub-rules deriving from each of these decision trees.

After operation 1040, method 1000 moves to end operation 1045.

Figure 11:
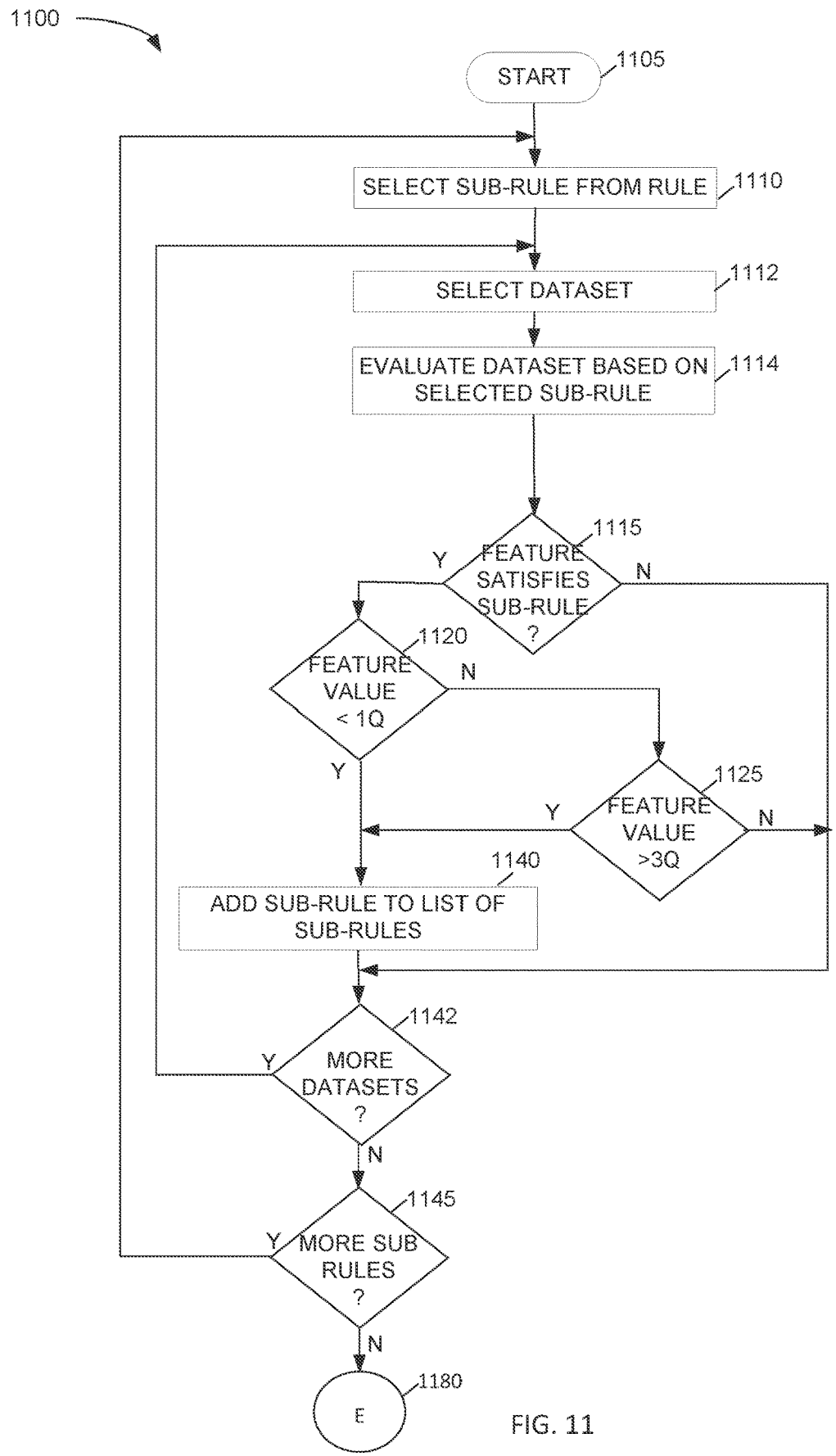
FIG. 11 is a flowchart of an example process to select one or more filtered sub-rules satisfied by outlier values

FIG. 11 is a flowchart of an example process to select one or more filtered sub-rules satisfied by outlier values. One or more of the functions discussed below with respect to FIG. 11 is performed, in some embodiments, by hardware processing circuitry (e.g. any of 206, 306, 406, 506). For example, in some embodiments, instructions (e.g. 214, 314, 428, 529) stored in an electronic memory (e.g. any of 208, 340, 416, 516) configure the hardware processing circuitry to perform one or more of the functions discussed below. In some embodiments, method 1100 is performed by the NMS 136.

After start operation 1105, method 1100 moves to operation 1110, which selects a sub-rule from an identified rule. In some embodiments, the identified rule is identified by method 1000, discussed above. In some embodiments, the identified rule is extracted from a decision tree. In some embodiments, the identified rule is a rule having a largest number of sub-rule matches when compared against datasets having a first classification (e.g. class 0 datasets as discussed above with respect to Tables 1-3).

Operation 1112 selects a dataset from a plurality of datasets. The identified dataset is classified according to a first classification (e.g. evaluated against criterion that compare a target parameter value to a predetermined threshold to determine the classification). Operation 1112 is designed to select a different dataset from the plurality of datasets for each sub-rule evaluated by the iterations of method 1100.

Operation 1114 evaluates the selected sub-rule against the selected dataset. As each dataset defines values of multiple feature and target parameters, and the sub-rule references a single parameter, evaluating the selected sub-rule against the selected dataset includes evaluating a specific parameter value defined by the dataset against criterion defined for that specific parameter that are defined by the sub-rule.

Decision operation 1115 determines if the sub-rule evaluates to a true value. If the sub-rule evaluates to a true value, method 1100 moves from decision operation 1115 to decision operation 1120. If the sub-rule does not evaluate to a true value, method 1100 moves from decision operation 1125 to decision operation 1145, discussed further below.

Decision operation 1120 and decision operation 1125 determine if the value specified by the dataset (that was evaluated by the sub-rule) is an outlier value. As discussed above, some embodiments determine outlier values by determining if the value falls in a first quartile or fourth quartile of values. As discussed above, the quartile boundaries are determined, at least in some embodiments, by relating a medium of the values to a lowest value (for the lowest quartile) and the median value to a highest value (for the highest quartile). As further discussed above, some embodiments define a threshold for outliers that is different than the Q1 and Q3 thresholds. As discussed above, some embodiments of decision operation 1120 and/or decision operation 1125 utilize a relaxation factor that reduces a number of values that are considered outliers when compared to values falling within the Q1 and Q3 quartiles. As discussed above, in some embodiments the thresholds Q1 and Q3 are determined as relaxed quartile boundaries.

If either of the decision operation 1120 or decision operation 1125 determines the value is an outlier, method 1100 moves to operation 1140, which adds the sub-rule to a list of outlier sub-rules. Otherwise, if the value is not an outlier, method 1100 moves from either decision operation 1120 or 1125 to decision operation 1142.

Decision operation 1142 determines if there are additional datasets to evaluate against the selected sub-rule. If there are additional datasets, method 1100 moves to operation 1112, which selects a different dataset for evaluation. Otherwise, method 1100 moves from decision operation 1142 to decision operation 1145. Decision operation 1145 determines if there are additional sub-rules to evaluate. If there are additional sub-rules to evaluate, processing moves from decision operation 1145 to operation 1110, which selects a different sub-rule from the rules for processing by method 1100.

Otherwise, if there are no additional sub-rules that require processing, method 1100 moves from decision operation 1145 reference E 1180.

Figure 12:
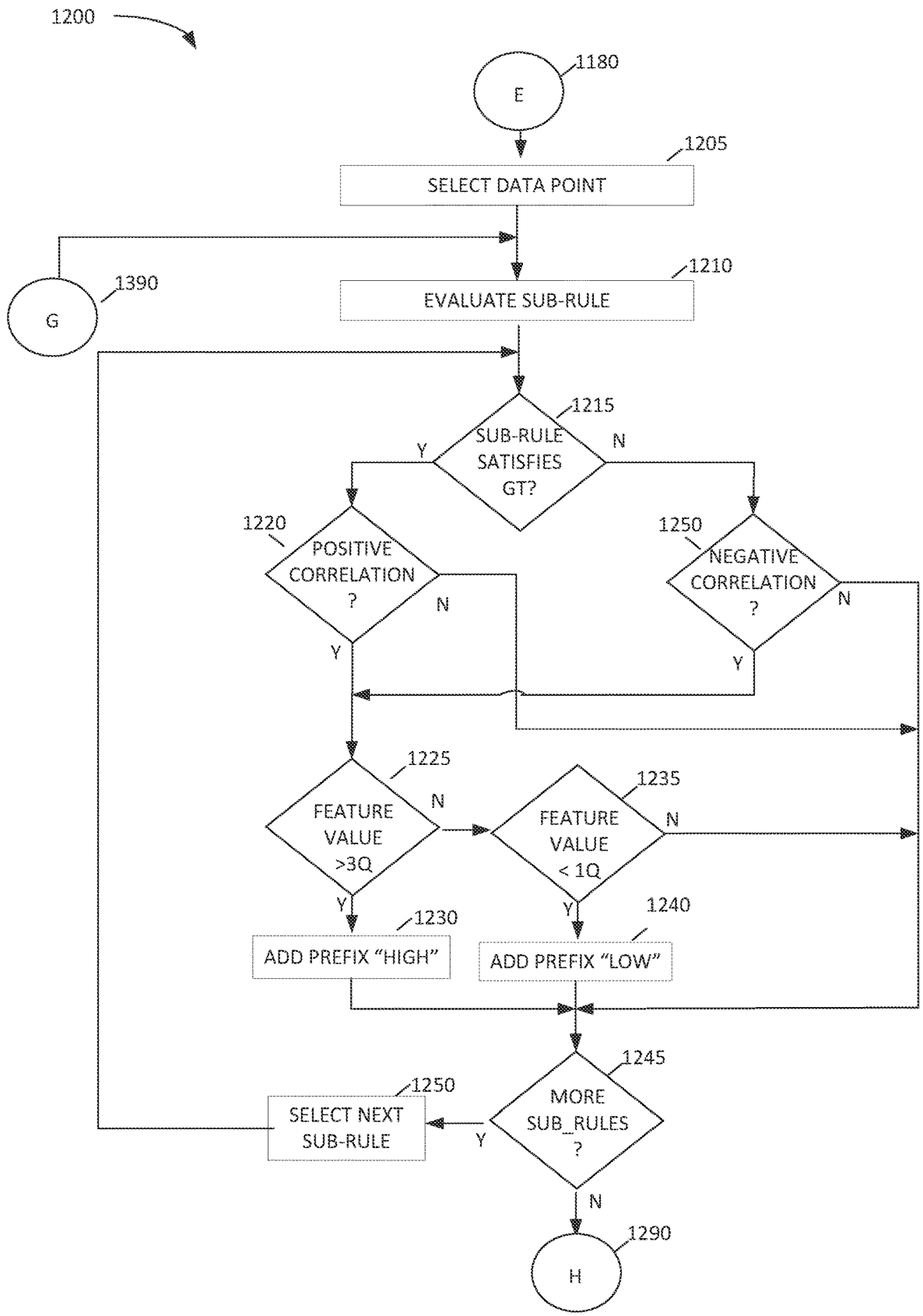
FIG. 12 is a flowchart of an example process that tags features parameter values as "HIGH" or "LOW."

FIG. 12 is a flowchart of an example process that tags features parameter values as "HIGH" or "LOW." One or more of the functions discussed below with respect to FIG. 12 is performed, in some embodiments, by hardware processing circuitry (e.g. any of 206, 306, 406, 506). For example, in some embodiments, instructions (e.g. 214, 314, 428, 529) stored in an electronic memory (e.g. any of 208, 340, 416, 516) configure the hardware processing circuitry to perform one or more of the functions discussed below. In some embodiments, method 1200 is performed by the NMS 136.

Method 1200 continues from reference E 1180. After off-page reference 1180, method 1200 moves to operation 1205. Operation 1205 selects a dataset from a plurality of datasets. Method 1200 continues to operation 1210 which uses the same selected sub-rule that was utilized in operation 1110. Method 1200 then proceeds to decision operation 1215, which determines whether the sub-rule satisfies the "greater than" rule. If it is determined that the "greater than" rule is satisfied the process proceeds to decision operation 1220 which determines whether the correlation between the feature and the target parameter is positive. If the decision operation 1220 determines that the correlation is positive, the process continues to decision operation 1225, which determines if the value of the feature parameter is greater than the third quartile (e.g. falls within the fourth quartile). (In accordance with another embodiment, the operation checks whether the value of the feature is greater than a relaxed third quarter). If the value of the feature parameter is greater than a boundary between the third quartile and a fourth quartile, method 1200 moves from decision operation 1225 to operation 1230, which marks the feature parameter value as a "high" value.

Returning to decision operation 1215, if the operation determines that the sub-rule does not satisfy the "greater than" rule, the process continues to decision operation 1250 which determines whether the correlation between the feature and the target parameter is negative. If the operation determines that the correlation is negative, the process continues to decision operation 1225.

Decision operation 1225 determines if the value of the feature parameter is greater than the third quartile. (In accordance with another embodiment, the operation checks whether the value of the feature is greater than a relaxed third quarter). If decision operation 1225 determines that the value of the feature parameter is greater than a third quartile boundary (or falls within a fourth quartile formed by a related boundary between the third and fourth quartile), method 1200 moves from decision operation 1235 to operation 1240, which marks this sub-rule as "High". The process continues then to decision operation 1245.

However, if decision operation 1225 determines that the feature parameter value is not within the fourth quartile (or within a smaller fourth quartile based on a relaxed third quartile boundary), method 1200 proceeds to decision operation 1235 which determines whether the value of the feature parameter falls within the first quartile. (In accordance with another embodiment, the operation checks whether the value of the feature falls within a reduced size first quartile that relies on a relaxed boundary between the first quartile and the second quartile). If the operation determines that the value falls within the first quartile (or the relaxed first quartile), the process continues to decision operation 1140 which marks the sub-rule as "LOW".

The HIGH and LOW marking can be also viewed as natural language friendly expression value as being good (not contributing to the SLED) or bad (contributing to the SLED). For a given feature value we can express the deviation from (relaxed) quarters as either LOW or HIGH which is understood by an IT person or as GOOD or POOR which is understood by an unskilled person. The mapping between {GOOD, BAD} and {HIGH, LOW} depends on the specific feature. The tag LOW is associated with parameters that indicate a higher probability of poor SLE as they get numerically smaller. Similarly, the tag HIGH is associated with parameters that indicate a higher probability of poor SLE as they get numerically larger.

For example, an interference of 0.9 is considered to be HIGH which maps to Bad or POOR SLE, and the probability of poor SLE increases as interference gets larger. An RSSI measurement of −90 dBm is LOW and is POOR or BAD and indicates a higher probability of poor SLE as RSSI gets smaller. Thus, we see that for some target features higher numerical value than a specific threshold represents a good SLE and for other features a higher numerical value than a specific threshold represents a bad SLE, therefore a feature can be mapped to either GOOD or BAD depending on the specific feature.

For the case wherein a larger target feature is indicative of better performance (e.g., larger throughput is indicative of better SLE), and for a positive correlation between a feature parameter and a target parameter, only LT and LE rules are applicable since only lower feature parameters would translate to lower target parameter (than a threshold) and hence to poor SLE (class 0). Similarly, for negative correlation between a feature parameter and a target parameter only GT and GE rules are applicable since only higher feature parameters would translate to lower target parameter (than a threshold) and hence poor SLE.

The opposite is true for the case wherein a smaller target feature is indicative of better performance (e.g., smaller delay to connect is indicative of better SLE), and for a positive correlation between a feature parameter and a target parameter, only GT and GE rules are applicable since only larger feature parameters would translate to larger target parameter (than a threshold) and hence to poor SLE (class 0). Similarly, for negative correlation between a feature parameter and a target parameter only LT and LE rules are applicable since only lower feature parameters would translate to higher target parameter (than a threshold) and hence poor SLE.

Similarly, if decision operation 1220 determines that the correlation between the feature and the target parameter is not positive, or if decision operation 1250 determines that the correlation between the feature and the target parameter is not negative, or if decision operation 1235 determines that the value of the feature is not smaller than the first quartile. (In accordance with another embodiment, the relaxed first quartile), the process proceeds to decision operation 1245.

Decision operation 1245 checks whether there are more sub-rules that need to be processes. If decision operation 1245 determines that there are additional sub-rules that need to be processed, method 1200 returns to operation 1210, which selects a different sub-rule.

However, if decision operation 1245 determines that there are no additional sub-rules to be processed, method 1200 continues via connector operation H 1290 to method 1300, discussed below with respect to FIG. 13.

Figure 13:
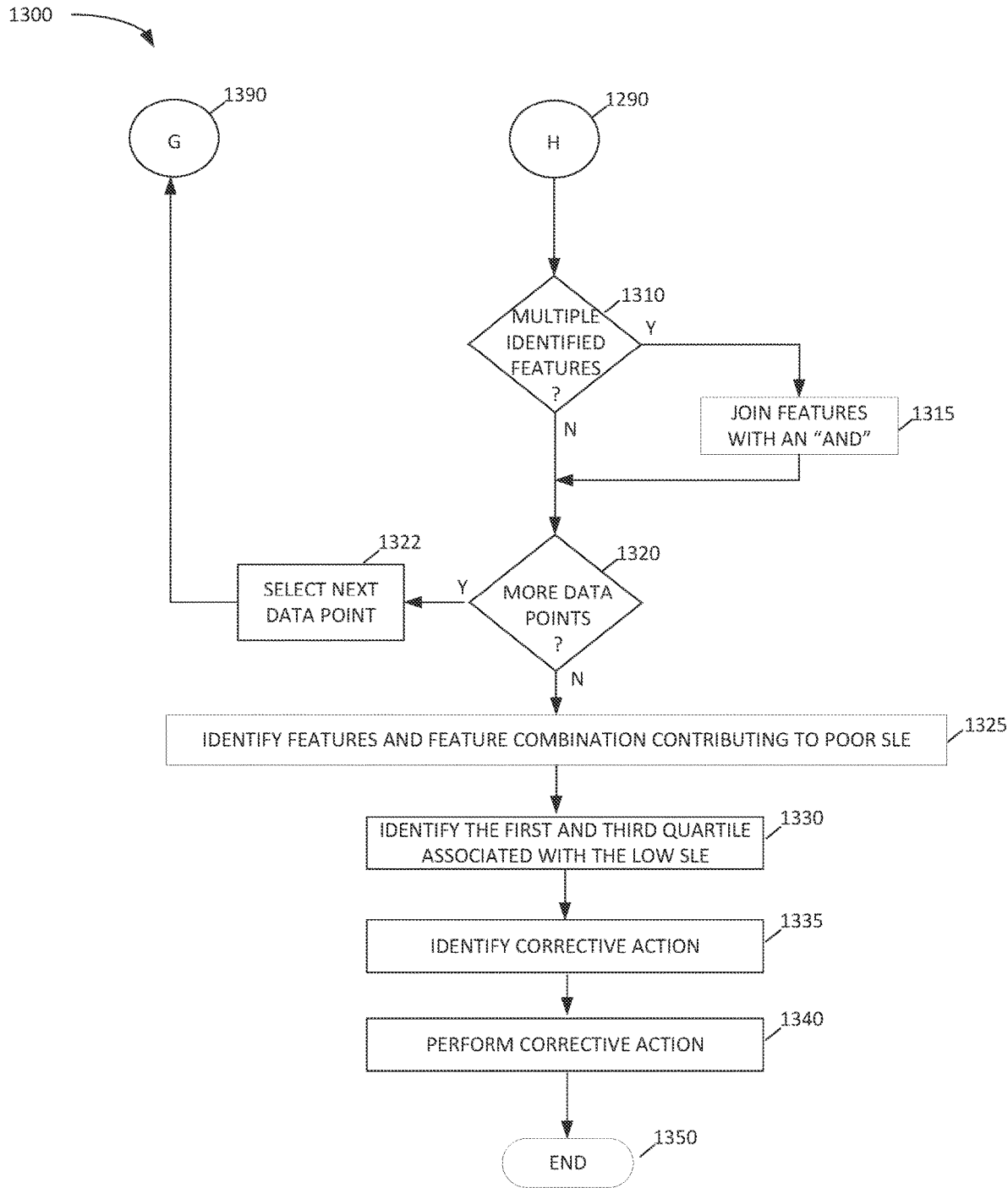
FIG. 13 is a flowchart of an example process for determining a plurality of operational parameters causing a service level experience degradation (SLED).

FIG. 13 is a flowchart of an example process for determining a plurality of operational parameters causing a SLED. In some embodiments, the method 1300 takes corrective action based on the plurality of operational parameters. One or more of the functions discussed below with respect to FIG. 13 is performed, in some embodiments, by hardware processing circuitry (e.g. any of 206, 306, 406, 506). For example, in some embodiments, instructions (e.g. 214, 314, 428, 529) stored in an electronic memory (e.g. any of 208, 340, 416, 516) configure the hardware processing circuitry to perform one or more of the functions discussed below. In some embodiments, method 1300 is performed by the NMS136.

Method 1300 begins at connector operation H 1290 (also referenced with respect to method 1200 and FIG. 12) and proceeds to decision operation 1310 which determines whether there are multiple outlier features (classified as either HIGH or LOW) associated with the selected dataset. If decision operation 1310 determines that there are multiple outlier features, method 1300 moves from decision operation 1310 to operation 1315, which joins the multiple features with a logical "and" operation. Decision operation 1320 evaluates whether there are additional datasets to evaluate. If there are additional datasets, method 1300 moves to operation 1322, where a next data point is selected. Method 1300 then returns via connector 1390, to operation 1205 of method 1200 and FIG. 12, which is discussed above. Operation 1205 is designed so as to select a different dataset each time processes 1200/1300 iterate.

If decision operation 1320 determines that there are no more datasets to evaluate, method 1300 moves to operation 1325, where frequently satisfied sub-rules and/or composite sub-rules contributing to the poor SLE are identified.

Operation 1330 identifies the first and third quartiles associated with the low SLE. (As explained above, in accordance with another embodiment, some embodiments utilize relaxed first and third quartiles).

In operation 1335, a corrective action is determined based on the parameters associated with the first and third quartile classifications (e.g. prefixed low and/or high). In some embodiments, a corrective action is determined from a list of corrective actions stored and/or pre-configured. Such stored and/or pre-configured actions include an increase (or decrease) in radio power, to switch on or off a specific radio channel on a specific AP, etc. In accordance with another embodiment, the system uses the first and third quartiles (Q1 and Q3) and the current value of a parameter to modify the parameter as to remove the root cause of the reduced SLE. For example, if the measured RSSI by the device is −70, and the Q1 threshold is −65, then operation 1335 determines that the coverage parameter for the specific device should be increased by 5 db by either moving the device closer to the AP or increasing the AP transmit power.

Some embodiments of method 1300 generate a message describing how a user of an access point (identified to be problematic) can change their location so as to improve a signal strength experienced by the user's respective device. Alternatively, the message is generated to instruct the user to associate with a different access point, which is expected to provide improved SLE relative to the user's existing access point connection.

Operation 1340 performs a remedial action. In various embodiments, the remedial action includes presenting a proposed corrective action on a display (e.g. to an IT professional) or automatically (without human intervention) taking a remedial action and generating a notification that the action was taken, via, for example, a message to an email, text message, or other messaging technology. In some embodiments, the NMS 136 issues a command to the resource manager to increase the transmission power of a specific radio in a specific AP. Continuing with the previous example where the RSSI detected by the device was −70 DB and the first quartile was determined to be −65 db, the resource manager commands the radio in the associated AP to increase its transmission power by 5 dbs. Possible remedial actions also include changing an operating channel of an access point, or generating human instructions to move towards an access point.

The process continues to operation 1340 where the corrective action is invoked. The process ends in operation 1350.

Those skilled in the art would recognize that although the flowchart of FIGS. 12/13 ends at operation 1350, some embodiments of methods 1200/1300 are performed iteratively, so as to monitor SLE parameters and the parameters on an ongoing basis. By continuously monitoring system performance, a corrective action can be taken soon after an SLE degradation is identified.

Figure 14:
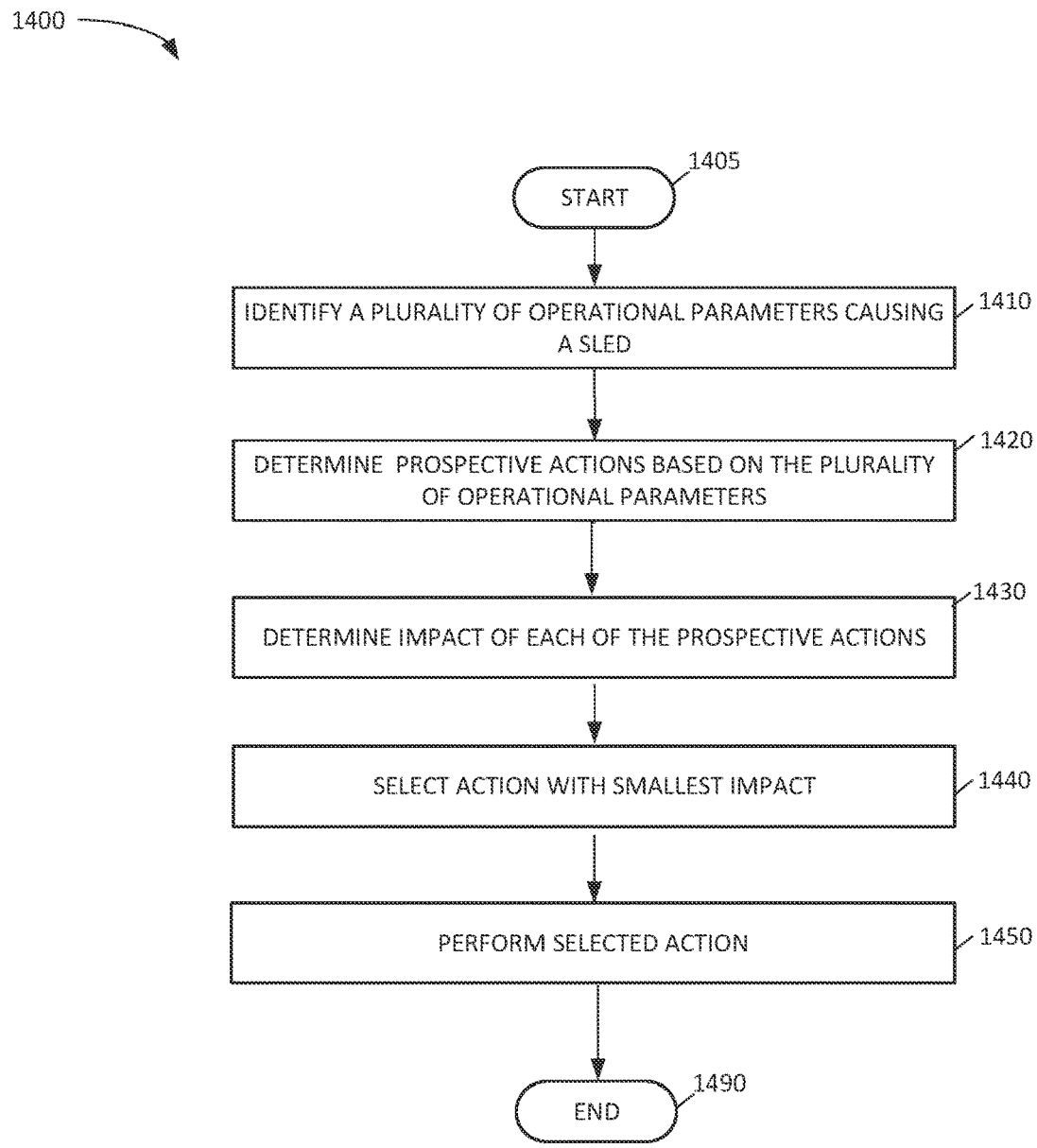
FIG. 14 is a flowchart of an example process for invoking a corrective action when a combination of base-causes is identified.

FIG. 14 is a flowchart of an example process for invoking a corrective action when a combination of base-causes is identified. One or more of the functions discussed below with respect to FIG. 14 is performed, in some embodiments, by hardware processing circuitry (e.g. any of 206, 306, 406, 506). For example, in some embodiments, instructions (e.g. 214, 314, 428, 529) stored in an electronic memory (e.g. any of 208, 340, 416, 516) configure the hardware processing circuitry to perform one or more of the functions discussed below. In some embodiments, method 1400 is performed by the NMS 136.

Method 1400 starts at start operation 1405 and proceeds to operation 1410. Operation 1410 identifies a plurality of operational parameters causing a SLED. In some embodiments, operation 1410 operates according to the methods described above with respect to FIGS. 6-13. In some embodiments, operation 1410 includes one or more of the functions discussed below with respect to FIG. 15.

Operation 1420 identifies prospective actions based on the plurality of operational parameters. For example, if the plurality of operational parameters indicates a root cause of a SLED based on evaluation of a first sub-rule and a second sub-rule, a remedial action may include a first action (e.g., restart first server) and/or second action (e.g., restart a second server).

Operation 1430 determines an impact of each identified action. The impact can include a number of dimensions or components, including a number of devices affected by the action and an estimated magnitude of each effect. In some embodiments, operation 1440 determines the action with a smallest adverse impact. In some embodiments, operation 1430 determines the impact based on a priority of devices affected by the action and/or the priority of network traffic between the devices and the network. In some embodiments, operation 1430 relates the determined impact to a predefined threshold to determine whether an action is performed. In some embodiments, the determined impact is related to a severity of an SLE degradation, with high severity degradations justifying larger impact actions.

In operation 1450 the selected action is performed. As discussed above, an action can include one or more of restarting a specific server, or sending an instruction message (e.g. to a resource manager 132) to change one or more operating parameters (e.g. such as transmit power of a specific radio, etc.). Other remedial actions are also contemplated by the disclosed embodiments. Method 1400 ends at operation 1490.

Figure 15:
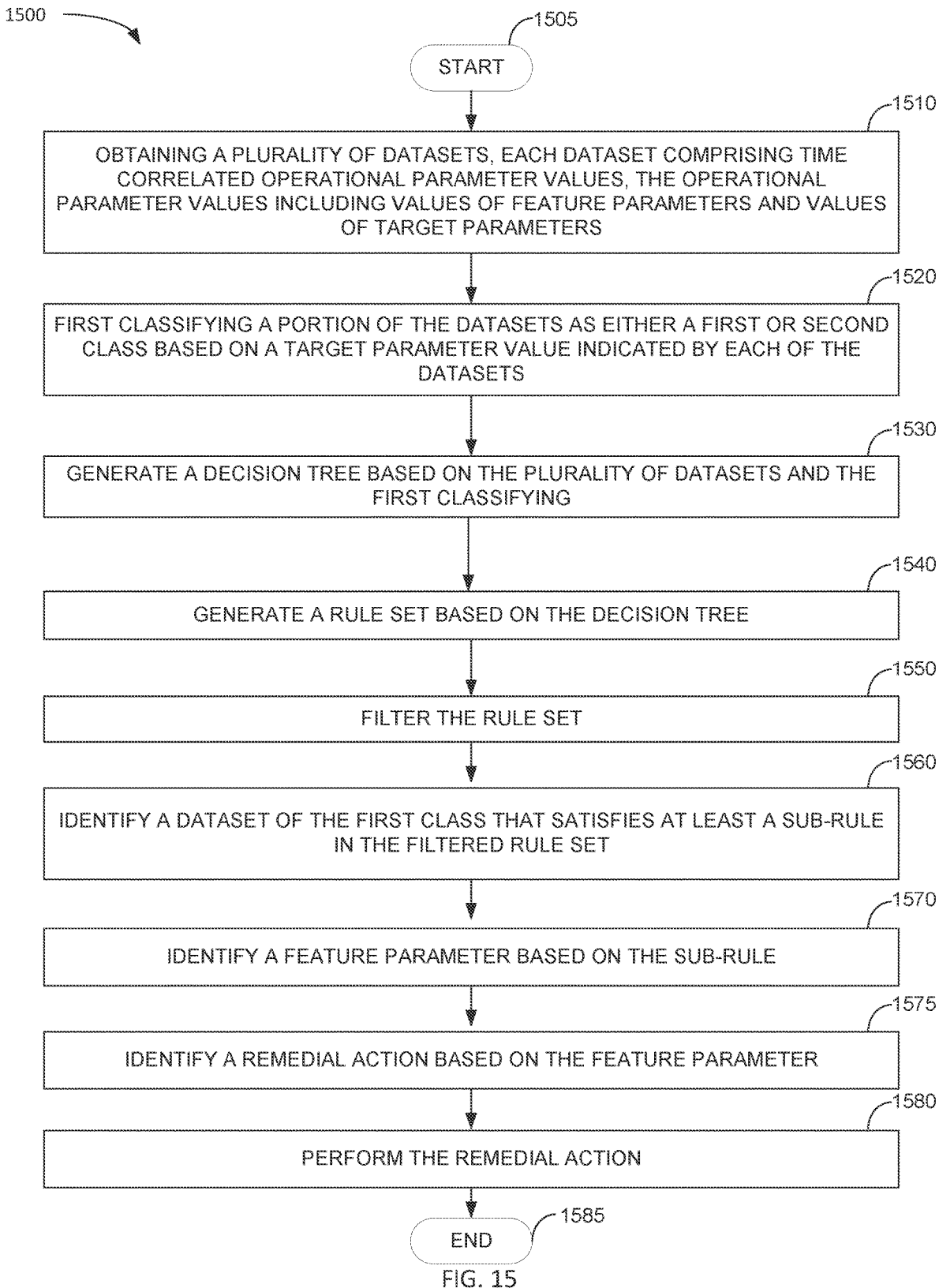
FIG. 15 is a flowchart of a process that is implemented in one or more of the disclosed embodiments.

FIG. 15 is a flowchart of a method that is implemented in one or more of the disclosed embodiments. One or more of the functions discussed below with respect to FIG. 15 is performed, in some embodiments, by hardware processing circuitry (e.g. any of 206, 306, 406, 506). For example, in some embodiments, instructions (e.g. 214, 314, 428, 529) stored in an electronic memory (e.g. any of 208, 340, 416, 516) configure the hardware processing circuitry to perform one or more of the functions discussed below. In some embodiments, method 1500 is performed by the NMS 136.

After start operation 1505, method 1500 moves to operation 1510, where a plurality of datasets is obtained. Each dataset includes a plurality of time correlated operational parameter values. The operational parameter values include feature parameters (e.g. independent variables in some embodiments) and target parameters (e.g. dependent variables in some embodiments).

In operation 1520, the datasets are classified according to a value of a first target parameter. In some embodiments, datasets including a value of the first target parameter that meets a criterion (e.g. greater than a defined threshold or less than a defined threshold) are classified as a first class, while those datasets including a value of the first target parameter that does not meet the criterion are classified as a second class. Some embodiments of operation 1520 perform multiple classifications of the datasets. For example, after the datasets are classified as either the first class or the second class, they may be further classified based on values of a different second target parameter (e.g. based on the different second target parameter value meeting a second criterion) into either a third class or a fourth class. In some embodiments, the second criterion evaluates the second target parameter's value relative to a second threshold). In some embodiments, the datasets are classified based on a third criterion applied to the first target parameter. Thus, the datasets are classified into a fifth or sixth class based on whether the first target parameter satisfies the third criterion (e.g. which evaluates in various embodiments, the first target parameter's value relative to a third threshold). Thus, various embodiments perform multiple classifications of the datasets according to any number of target parameters, and/or any number of multiple criterion applied to a common target parameter.

In some embodiments, one or more of the first, second, and third thresholds, to the extent a particular embodiment implements these thresholds, are randomly generated. Alternatively, a threshold is generated based on a minimum and maximum value of the relevant target parameter within the datasets. For example, the threshold is determined, in some embodiments, to fall between the minimum and maximum value. In some embodiments, the threshold is selected to be a median or average value of the target parameter values.

In operation 1530, a decision tree is generated based on the datasets and the classification of the datasets. Thus, in some embodiments, the decision tree is generated so as to generate a result consistent with the classification. In some embodiments, each node of the decision tree is assigned a classification. The assignment of the classification indicates a number of datasets with each of the first and second classifications that is represented by the node. Thus, for example, if x datasets of the first class and y datasets of the second class are represented by a particular node of the decision tree, the node is assigned the first class if x>y and is assigned the second class if y>x. If x=y, embodiments may either assign the node to the first or the second class. If multiple classifications are performed by operation 1520, multiple corresponding decision trees are generated in operation 1530, one decision tree per classification.

Some embodiments of operation 1530 classify each node of the decision tree (or multiple decision trees). The classification of a particular node is based, in some embodiments, based on a ratio between datasets classified as the first class and datasets classed as the second class that are represented by the particular node. Being represented by the particular node indicates that an evaluation of the dataset against the decision tree would traverse the particular node.

Some embodiments of method 1500 assign a Gini score to each node of the decision tree. Some embodiments assign the Gini score in a manner consistent with known methods of decision tree constructions.

In operation 1540, a rule set is generated based on the decision tree. In some embodiments, the rule set is generated based on only those nodes of the decision tree having a particular one of the two assigned classes. In some embodiments, the rule set is generated based only those nodes of the decision tree having a Gini score that meets a defined criterion (e.g. comparing the Gini score to a predefined threshold for example). In some embodiments, the rule is generated based on only those nodes of the decision tree having at least a defined number of ancestors of a particular class.

The rule set is generated by extracting the rules from each of the nodes. The rules of a node determine whether a path through the tree passes to a first child node of the node or a second child node of the node. In embodiments that generate multiple decision trees, different rule sets are generated based on the multiple decision trees. Nodes from each of the multiple decision trees that are classified as one of two classes are used to determine the rules (e.g. analogous to the first class of the first decision tree).

In operation 1550, a filtered rule set is generated based on the rule set of operation 1540. As discussed above, rule filtering includes one or more processing steps that reduce or modify rules extracted from one or more decision trees. As discussed above, in some embodiments, rule filtering includes elimination of sub-rules extracted from a decision tree that are redundant with other sub-rules extracted from the decision tree. In some embodiments, rule filtering includes elimination of sub-rules that do not test for feature parameter conditions correlated with bad or undesirable SLE (e.g. per the discussion above with reference to any one or more of FIGS. 1B-E. In some embodiments, one or more rules derived from a decision tree are modified so as to only identify feature parameter values classified as outliers (or relaxed outliers as discussed above).

In operation 1560, a dataset of the first class is identified that satisfies at least a sub-rule in a filtered rule of the filtered rule set. For example, as discussed above with respect to FIG. 1, the filtered rules generated in operation 1550 (e.g. analogous to the filtered rule set 11512 are evaluated against the datasets (e.g. the datasets 11502 of FIG. 1). In some embodiments, composite rules that include the filtered rules (e.g. that follow the same structure as rules of the rule set generated in operation 1540) are evaluated to identify composite rules having a defined number of sub-rules (or greater) that are satisfied by the datasets.

In some embodiments, the identification of the dataset is also based on the sub-rule being satisfied by an outlier value. As discussed above, outliers are considered to be values that fall within either a first quartile Q1 (smaller than a boundary between first and second quartile) or third quartile Q3 (larger than a boundary between third and fourth quartile) of values of the feature parameter. Some embodiments implement relaxed quartile boundaries, which move the boundaries between the first and second quartiles away from the mean of the values, and also moves the boundary between the third and fourth quartile away from the mean of the values.

The sub-rules or composite sub-rules are then ranked according to their frequency of being satisfied by the datasets. Sub-rules or composite sub-rules that are most frequently satisfied as selected. Feature parameters referenced by these sub-rules are identified in operation 1560.

Feature parameters referenced by the identified sub-rules of operation 1560 are identified in operation 1570.

In operation 1575, a remedial action is identified based on the identified feature parameters of operation 1570. As discussed above the remedial actions can vary by feature parameters, but can include, for example, resetting a radio in a device, resetting an entire device, adjusting configuration parameters of a particular device, or other actions. Other remedial actions include reducing a transmission power of a radio in an access point, increasing a transmission power of a radio in an access point, changing an operating channel in an access point, and/or generating instructions to move towards an access point. Some remedial actions cause a display of indicators of the identified features. For example, notifying support staff that particular feature parameter values are anomalous (as determined by method 1500) can improve an efficiency of the support staff when they attempt to resolve an issue.

In some aspects, a remedial action is identified based on its potential impact on operation of a system being monitored. For example, some embodiments of operation 1575 determine an impact of the remedial action based on one or more of a number of users affected by the remedial action, a priority of one or more devices affected by the remedial action, or a priority of network communication affected by the remedial action. In some embodiments, impacts of multiple possible remedial actions are determined and then compared to determine which of the remedial actions has the least impact. Some embodiments select the remedial action having the least impact.

In operation 1580, the one or more remedial actions identified in operation 1575 are performed. After operation 1580, method 1500 moves to end operation 1585.

Figure 16:
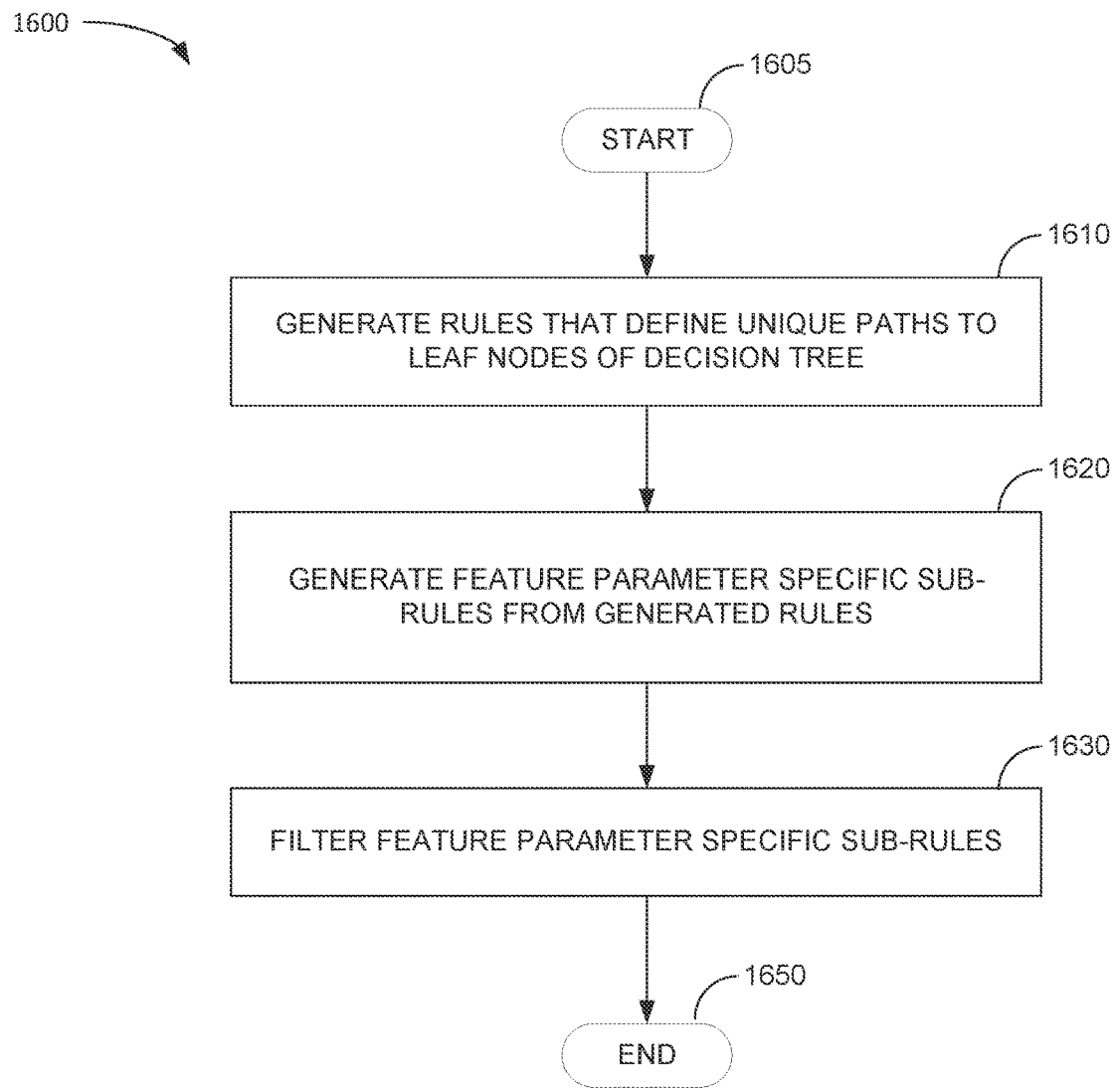
FIG. 16 is a flowchart of a process that is implemented in one or more of the disclosed embodiments.

FIG. 16 is a flowchart of a method that is implemented in one or more of the disclosed embodiments. One or more of the functions discussed below with respect to FIG. 16 is performed, in some embodiments, by hardware processing circuitry (e.g. any of 206, 306, 406, 506). For example, in some embodiments, instructions (e.g. 214, 314, 428, 529) stored in an electronic memory (e.g. any of 208, 340, 416, 516) configure the hardware processing circuitry to perform one or more of the functions discussed below. In some embodiments, method 1600 is performed by the NMS 136. In some embodiments, method 1600 implements operation 1540 and 1550 of method 1500, discussed above with respect to FIG. 15.

After start operation 1605, method 1600 moves to operation 1610. In operation 1610, rules are generated that define unique paths to leaf nodes of a decision tree.

In operation 1620, feature specific sub-rules are generated from the rules generated in operation 1610. In some embodiments, operation 1620 is consistent with the discussion of Equation 15 above.

In operation 1630, the sub-rules are filtered.

The filtering of sub-rules includes, in some embodiments, the elimination of sub-rules according to the examples of FIGS. 1B-1E above. The filtering of sub-rules also includes, in some embodiments, modifying the sub-rules to only be satisfied by feature values that are classified as outliers (or related outliers). Thus, for example, if a sub-rule relates a feature parameter to a constant value Kx, Kx is substituted to instead delineate a quartile boundary (or relaxed quartile boundary). If the relation implemented by the sub-rule is a greater than or greater than or equal to operator, the substitution is for an upper quartile boundary, while if the relation is a less than or less than or equal to operator, the substitution is for a lower quartile boundary (or lower relaxed quartile boundary).

In some embodiments, the filtering of sub-rules includes the elimination of less restrictive sub-rules in favor of maintaining sub-rules that are more restrictive. Thus, for example, two sub-rules apply a greater than operator against a feature F1. In this example, a first sub-rule is F1>K1, and a second sub-rule is F1>K2. In this example, if K1>K2, the second sub-rule is less restrictive, and can be eliminated in operation 1630. Similarly, if two sub-rules apply a less than operator against the feature F1, such as a third sub-rule is F1<K3, and a fourth sub-rule is F1<K4, if K3<K4, then the fourth sub-rule is less restrictive, and is eliminated from the filtered sub-rule set. The elimination of less restrictive sub-rules can also operate for sub-rules including less than or equal to operators, and/or greater than or equal to operators.

After operation 1630, method 1600 moves to end operation 1650.

Figure 17:
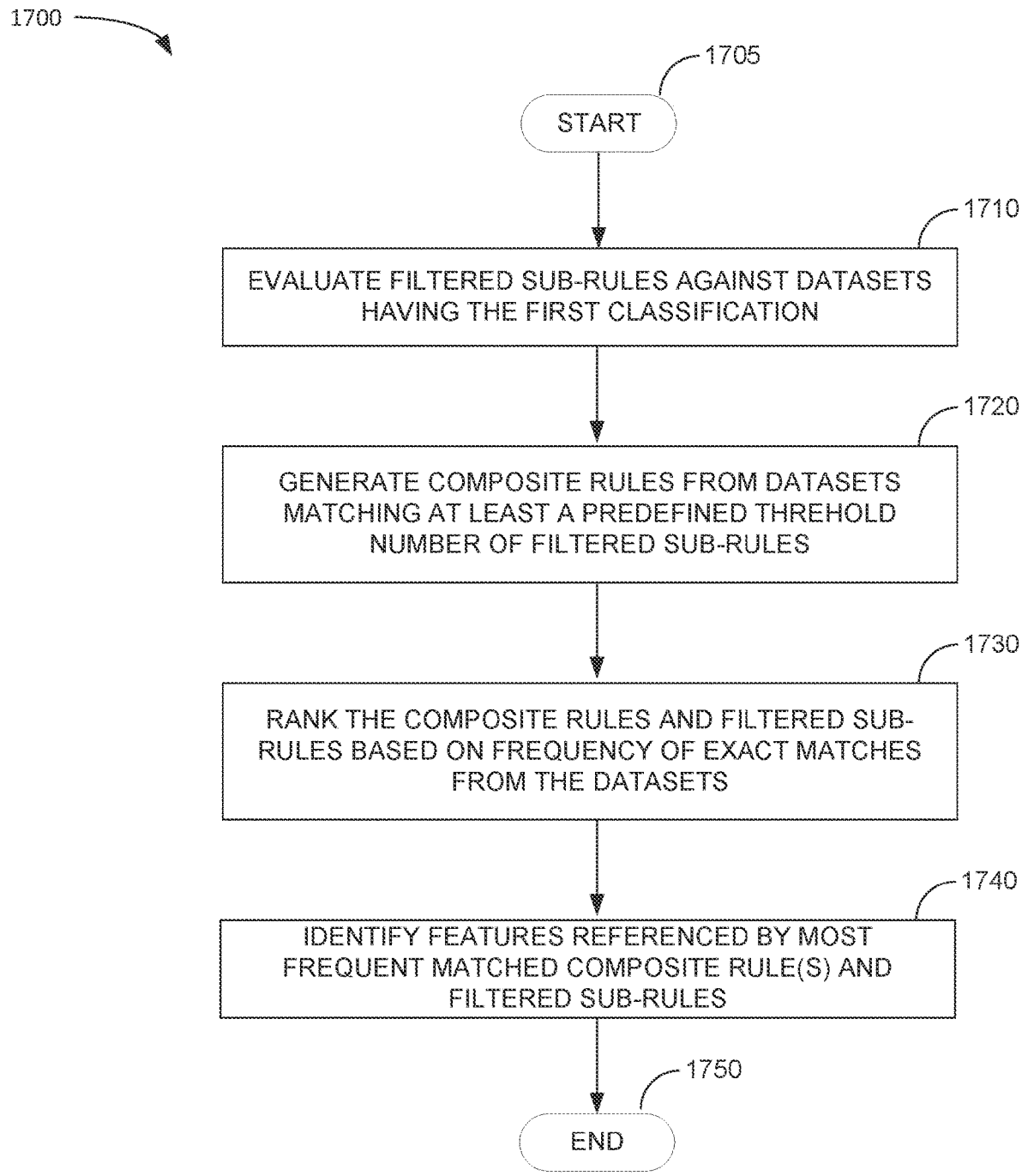
FIG. 17 is a flowchart of a process that is implemented in one or more of the disclosed embodiments.

FIG. 17 is a flowchart of a method that is implemented in one or more of the disclosed embodiments. One or more of the functions discussed below with respect to FIG. 17 is performed, in some embodiments, by hardware processing circuitry (e.g. any of 206, 306, 406, 506). For example, in some embodiments, instructions (e.g. 214, 314, 428, 529) stored in an electronic memory (e.g. any of 208, 340, 416, 516) configure the hardware processing circuitry to perform one or more of the functions discussed below. In some embodiments, method 1700 is performed by the NMS 136. In some embodiments, method 1700 implements operation 1560 and 1570 of method 1500, discussed above with respect to FIG. 15.

After start operation 1705, method 1700 moves to operation 1710. In operation 1710, filtered sub-rules are evaluated against datasets having a first classification. For example, as discussed above with respect to FIG. 1, which of the datasets 11502 are evaluated against the filtered rule set 11512.

In operation 1720, composite rules are generated from datasets matching at least a predefined number of filtered sub-rules. In some embodiments, the predefined number is one, two, three, four, five, six, seven, eight, nine, or ten sub-rules. Any number of sub-rule matches are contemplated by the disclosed embodiments as a composite rule.

In operation 1730, the sub-rules and composite rules are ranked based on their frequency of being satisfied by the datasets.

In operation 1740, features referenced by a highest ranked set of sub-rules or composite rules are identified. Some embodiments then determine remedial actions based on the referenced features. After operation 1740, method 1700 moves to end operation 1750.

Figure 18:
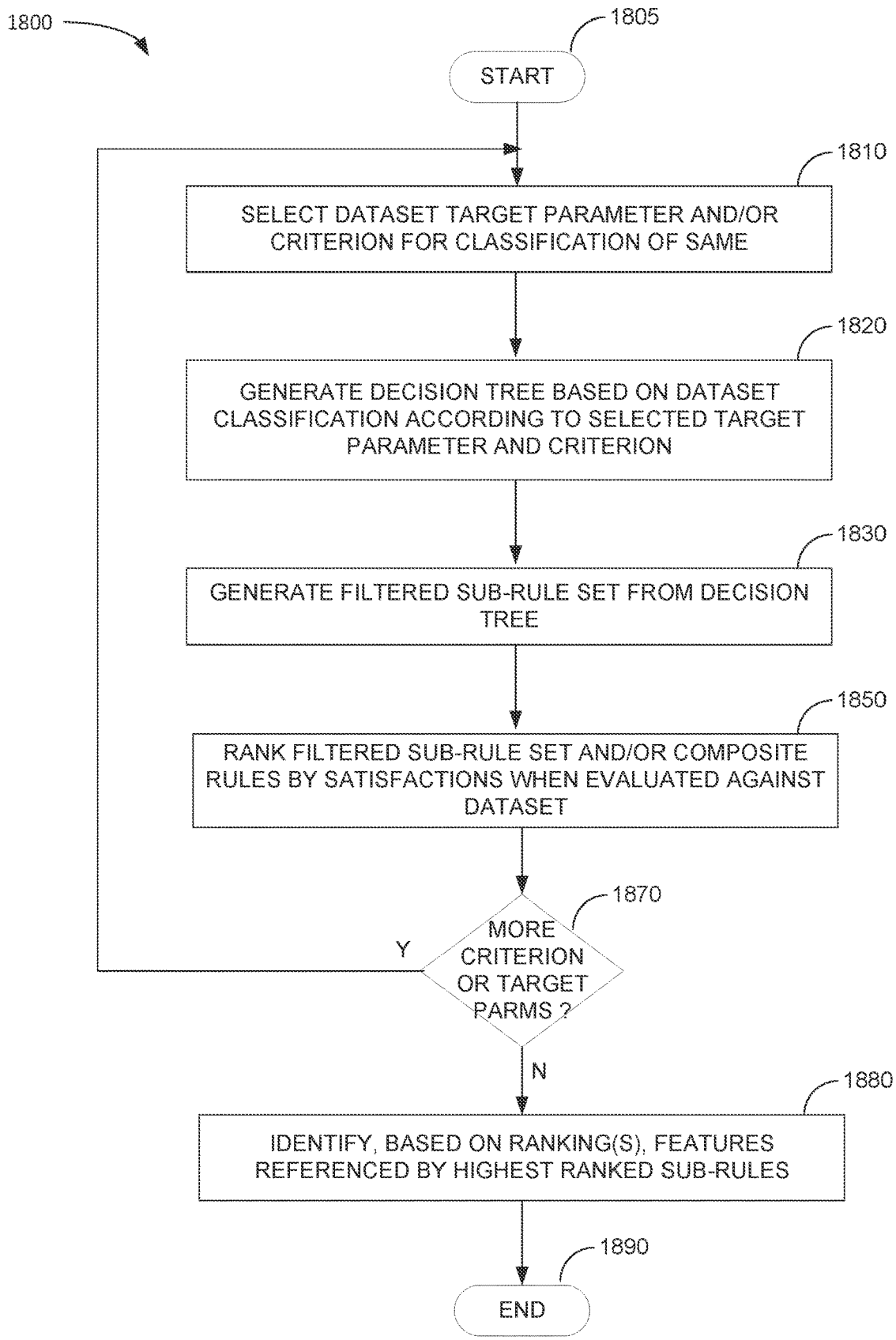
FIG. 18 is a flowchart of a process that is implemented in one or more of the disclosed embodiments.

FIG. 18 is a flowchart 1800 of a method that is implemented in one or more of the disclosed embodiments. One or more of the functions discussed below with respect to FIG. 18 is performed, in some embodiments, by hardware processing circuitry (e.g. any of 206, 306, 406, 506). For example, in some embodiments, instructions (e.g. 214, 314, 428, 529) stored in an electronic memory (e.g. any of 208, 340, 416, 516) configure the hardware processing circuitry to perform one or more of the functions discussed below. In some embodiments, method 1800 is performed by the NMS 136.

After start operation 1805, method 1800 moves to operation 1810, which selects a target parameter from a dataset and/or selects a classification criterion for the target parameter. As discussed above, some of the disclosed embodiments classify datasets based on a target parameter value. The classification applies a criterion to the target parameter value, and classifying the dataset into one of two classes based on whether the criterion evaluates to a true value or a false value. In some embodiments, the criterion compares the target parameter value to a predefined threshold value. In some embodiments, the predefined threshold value is randomly generated. In some embodiments, the predefined threshold value is selected from within a value range of the target parameter. Operation 1810 selects a single target parameter and a single criterion. As method 1800 iterates, as described below, different target parameters and/or different criterion are selected to perform additional classifications on a dataset. Thus, some embodiments classify datasets based on values of a single target parameter and a single criterion applied to those target parameter values. Other embodiments classify datasets based on values of a single parameter and apply multiple different criterion to those parameter values. Each criterion resulting in a separate binary classification of the datasets. Other embodiments classify datasets based on values of multiple target parameters, with each target parameter's values evaluated against a single criterion. Other embodiments classify datasets based on values of multiple target parameters, with one or more of the target parameters' values evaluated against multiple corresponding criterion.

In operation 1820, a decision tree is generated based on a classification of the dataset according to the selected target parameter and criterion of operation 1810. In some embodiments, operation 1820 first classifies the dataset based on the selected target parameter and criterion, and then generates the decision tree based on the classification.

In operation 1830, a filtered sub-rule set is generated based on the decision tree. As discussed above, generating a filtered sub-rule set includes extracting sub-rules from the decision tree, grouping the sub-rules according to feature parameters referenced by the sub-rules, eliminating less restrictive sub-rules, potentially modifying the sub-rules to evaluate to a true value only when evaluating outlier feature parameter values (or related outlier values), and deleting sub-rules according to the techniques described above with respect to any one or more of FIGS. 1B-1E.

In operation 1850, the filtered set of sub-rules is ranked according to their frequency of satisfaction when evaluated against the datasets (e.g. as illustrated in FIG. 1 with respect to evaluation data structure 11514 and rule histogram 11516). Consistent with the discussion above, operation 1850 generates composite rules including two or more sub-rules if a particular dataset (e.g. a row of dataset 11502) satisfies the two or more sub-rules. These composite sub-rules are then ranked along with single sub-rules according to their frequency of satisfaction against the dataset (e.g. dataset 11502). Note that if a particular sub-rule is satisfied and at least a second sub-rule is also satisfied by the same dataset (e.g. row of datasets 11502), the satisfaction of that particular sub-rule is counted against the composite sub-rule, and is not counted with respect to the particular sub-rule independent of the composite sub-rule. If a second dataset (e.g. a second row of dataset 11502) satisfies the particular sub-rule and no other sub-rule, that satisfaction is counted separately. Thus, the ranking separately tracks satisfaction of a sub-rule alone and satisfaction of the sub-rule along with one or more other sub-rules.

Decision operation 1870 evaluates whether additional criterion and/or additional target parameters are to be evaluated by the embodiment represented by method. 1800. If additional target parameters and/or criterion are to be evaluated, method 1800 returns to operation 1810, where a new target parameter and/or criterion are selected. As explained above, in some embodiments, some classify datasets based on values of two or more target parameters. In some embodiments, the datasets are classified by applying multiple different criterion to a single target parameter. If no further evaluation of target parameters or criterion is needed, then the method 1800 moves to operation 1880.

Operation 1880 identifies, based on the one or more rankings of operation 1850, a highest ranked set of sub-rules and/or composite sub-rules. Some embodiments of operation 1880 identify identical sub-rules and/or composite sub-rules referenced by multiple rankings (generated via multiple invocations of operation 1850 as method 1800 iterates), and aggregate their respective satisfaction frequencies. A highest ranked set of sub-rules and/or composite sub-rules across the rankings is then selected. As discussed above, feature parameters referenced based on the selected sub-rules and/or composite sub-rules are then identified, and actions selected according to the identified feature parameters. In some embodiments, operation 1880 includes the functions discussed above with respect to operations 1575 and 1580. After operation 1880 completes, method 1800 moves to end operation 1890.

The techniques of various embodiments may be implemented using software, hardware and/or a combination of software and hardware. Various embodiments are directed to apparatus, e.g., management entities, e.g., a location/zone tracking server, a network monitoring node, routers, gateways, access points, DHCP servers, DNS servers, AAA servers, Resource Manager, user equipment devices, e.g., wireless nodes such as mobile wireless terminals, base stations, communications networks, communications systems. Various embodiments are also directed to methods, e.g., method of controlling and/or operating a communications device or devices, e.g., a location/zone tracking server, a network management node, an access point, wireless terminals (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the disclosed embodiments.

In some embodiments, the processor or processors, e.g., CPUs, of one or more devices, e.g., communications devices such as network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., a network management device such as a server, e.g., a location /zone tracking server, an access point, a user equipment, etc., with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node such as a server, e.g. a location/zone tracking server,, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of a communications system including cellular, Wi-Fi, Bluetooth and BLE, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), Wi-Fi, Bluetooth, BLE, and/or various other types of communications techniques which may be used to provide wireless communications links between access nodes and wireless nodes. In some embodiments the access nodes are implemented as base stations which establish communications links with user equipment devices, e.g., mobile nodes, using Wi-Fi, Bluetooth, BLE, OFDM and/or CDMA. In various embodiments the wireless nodes are implemented as notebook computers, personal data assistants (PDAs), or other portable devices including receiver/transmitter circuits and logic and/or routines, for implementing the methods.

Example 1 is a method, comprising: obtaining a plurality of datasets, each dataset comprising time correlated operational parameter values, the operational parameter values including values of feature parameters and values of target parameters; first classifying a portion of the datasets as either a first or second class of datasets based on a target parameter value indicated by each of the datasets; generating a decision tree based on the plurality of datasets and the first classifying; generating a rule set from the decision tree; filtering the rule set; identifying a dataset of the first class that satisfies at least a sub-rule included in the filtered rule set;

identifying a first feature parameter based on the sub-rule; identifying a remedial action based on the first feature parameter; and performing the remedial action.

In Example 2, the subject matter of Example 1 optionally includes identifying a value of the first feature parameter is an outlier, wherein the identifying of the first feature parameter is based on the identifying of the value.

In Example 3, the subject matter of Example 2 optionally includes determining quartile boundaries for values of the feature parameters, wherein the identifying of the first feature parameter is based on the quartile boundaries.

In Example 4, the subject matter of any one or more of Examples 1-3 optionally include determining that at least two sub-rules are satisfied by the dataset, wherein the identifying of the first feature parameter is based on a first of the at least two sub-rules; and identifying a second feature parameter based on a second sub-rule of the at least two sub-rules.

In Example 5, the subject matter of Example 4 optionally includes identifying a second remedial action based on the second feature parameter; determining a first impact of the first remedial action; determining a second impact of the second remedial action; conditionally performing one or more of the first remedial action or the second remedial action based on the first impact and the second impact.

In Example 6, the subject matter of Example 5 optionally includes wherein determining the first impact is based on one or more of a number of users affected by the first remedial action, a priority of a device affected by the first remedial action, or a priority of network communication affected by the first remedial action.

In Example 7, the subject matter of any one or more of Examples 1-6 optionally include wherein the classifying of the portion as the first class evaluates the target parameter against a first predefined threshold, the method further comprising: classifying the plurality of datasets as either a third or fourth class of datasets based on a second threshold; and generating a second decision tree based on the plurality of datasets and the second classifying, wherein the rule set is further generated based on the second decision tree.

In Example 8, the subject matter of any one or more of Examples 1-7 optionally include wherein the generation of the decision tree comprises generating nodes of the decision tree, and assigning each node of the decision tree to the first class or the second class.

In Example 9, the subject matter of Example 8 optionally includes wherein the assigning of each node is based on a ratio of first class datasets to second class datasets that are represented by the node.

In Example 10, the subject matter of any one or more of Examples 8-9 optionally include wherein generating the rules from the decision tree excludes nodes of the decision tree assigned a classification different than the first class.

In Example 11, the subject matter of any one or more of Examples 8-10 optionally include wherein the generation of the decision tree comprises assigning a Gini score to each node, and wherein the generating of the rule set from the decision tree excludes nodes having a Gini score meeting a criterion.

In Example 12, the subject matter of any one or more of Examples 8-11 optionally include wherein the generating of the rule set from the decision tree is based only on nodes of the decision tree having at least a predefined number of ancestor nodes assigned to the first class.

In Example 13, the subject matter of Example 12 optionally includes wherein the generating of the rule set from the decision tree further excludes consideration of nodes having a number of ancestor nodes assigned to the first class that meets a second criterion.

In Example 14, the subject matter of any one or more of Examples 1-13 optionally include ranking the filtered sub-rules rules and composite rules in the filtered rule set by frequency of satisfaction by the plurality of datasets, wherein the identifying of the dataset is based on each of the rankings.

In Example 15, the subject matter of Example 14 optionally includes selecting a filtered rule based on the ranking; determining a feature parameter referenced by the selected filtered rule; and displaying indicators of the determined feature parameter on an electronic display.

In Example 16, the subject matter of any one or more of Examples 14-15 optionally include selecting a filtered rule based on the ranking; and determining a feature parameter referenced by the selected filtered rule, wherein the identifying of the remedial action is based on the determined feature parameter.

In Example 17, the subject matter of any one or more of Examples 10-16 optionally include wherein the remedial action comprises one or more of: reducing a transmission power of a radio in an access point, increasing a transmission power of a radio in an access point, changing an operating channel in an access point, generating instructions to move towards an access point.

In Example 18, the subject matter of any one or more of Examples 1-17 optionally include second classifying a second portion of the datasets as the first class of datasets based on a second target parameter value indicated by each of the datasets; generating a second decision tree based on the plurality of datasets and the second classifying; and generating the rule set based on the second decision tree.

In Example 19, the subject matter of any one or more of Examples 1-18 optionally include wherein the classifying of the portion of datasets of the first class is based on a first criterion, the method further comprising: second classifying a second portion of the datasets as the first class of datasets based on a second criterion; generating a second decision tree based on the second classifying; and generating the rule set based on the second decision tree.

In Example 20, the subject matter of Example 19 optionally includes wherein the first criterion and second criterion reference a first predefined threshold and a second predefined threshold respectively, the method further comprising randomly determining the first predefined threshold and randomly determining the second predefined threshold.

In Example 21, the subject matter of any one or more of Examples 19-20 optionally include wherein the first criterion and second criterion reference a first predefined threshold and a second predefined threshold respectively, the method further comprising selecting the first predefined threshold and the second predefined threshold based on a minimum and a maximum value of the target parameter in the datasets.

In Example 22, the subject matter of any one or more of Examples 1-21 optionally include determining a correlation of each feature parameter to the target parameter values of the first class; and selecting a set of sub-rules based on the determined correlations, wherein the identifying of the dataset of the first class that satisfies at least the sub-rule identifies a dataset satisfying a sub-rule included in the set of sub-rules.

Example 23 is a system, comprising: hardware processing circuitry; one or more memories storing instructions that when executed configure hardware processing circuitry to perform operations comprising: obtaining a plurality of datasets, each dataset comprising time correlated operational parameter values, the operational parameter values including values of feature parameters and values of target parameters; first classifying a portion of the datasets as either a first or second class of datasets based on a target parameter value indicated by each of the datasets; generating a decision tree based on the plurality of datasets and the first classifying; generating a rule set from the decision tree; filtering the rule set; identifying a dataset of the first class that satisfies at least a sub-rule included in the filtered rule set; identifying a first feature parameter based on the sub-rule; identifying a remedial action based on the first feature parameter; and performing the remedial action.

In Example 24, the subject matter of Example 23 optionally includes the operations further comprising identifying a value of the first feature parameter is an outlier, wherein the identifying of the first feature parameter is based on the identifying of the value.

In Example 25, the subject matter of Example 24 optionally includes the operations further comprising determining quartile boundaries for values of the feature parameters, wherein the identifying of the first feature parameter is based on the quartile boundaries.

In Example 26, the subject matter of any one or more of Examples 23-25 optionally include the operations further comprising: determining that at least two sub-rules are satisfied by the dataset, wherein the identifying of the first feature parameter is based on a first of the at least two sub-rules; and identifying a second feature parameter based on a second sub-rule of the at least two sub-rules.

In Example 27, the subject matter of Example 26 optionally includes the operations further comprising: identifying a second remedial action based on the second feature parameter; determining a first impact of the first remedial action; determining a second impact of the second remedial action; conditionally performing one or more of the first remedial action or the second remedial action based on the first impact and the second impact.

In Example 28, the subject matter of Example 27 optionally includes wherein determining the first impact is based on one or more of a number of users affected by the first remedial action, a priority of a device affected by the first remedial action, or a priority of network communication affected by the first remedial action.

In Example 29, the subject matter of any one or more of Examples 23-28 optionally include wherein the classifying of the portion as the first class evaluates the target parameter against a first predefined threshold, the operations further comprising: classifying the plurality of datasets as either a third or fourth class of datasets based on a second threshold; and generating a second decision tree based on the plurality of datasets and the second classifying, wherein the rule set is further generated based on the second decision tree.

In Example 30, the subject matter of any one or more of Examples 23-29 optionally include wherein the generation of the decision tree comprises generating nodes of the decision tree, and assigning each node of the decision tree to the first class or the second class.

In Example 31, the subject matter of Example 30 optionally includes wherein the assigning of each node is based on a ratio of first class datasets to second class datasets that are represented by the node.

In Example 32, the subject matter of any one or more of Examples 30-31 optionally include wherein generating the rules from the decision tree excludes nodes of the decision tree assigned a classification different than the first class.

In Example 33, the subject matter of any one or more of Examples 30-32 optionally include wherein the generation of the decision tree comprises assigning a Gini score to each node, and wherein the generating of the rule set from the decision tree excludes nodes having a Gini score meeting a criterion.

In Example 34, the subject matter of any one or more of Examples 30-33 optionally include wherein the generating of the rule set from the decision tree is based only on nodes of the decision tree having at least a predefined number of ancestor nodes assigned to the first class.

In Example 35, the subject matter of Example 34 optionally includes wherein the generating of the rule set from the decision tree further excludes consideration of nodes having a number of ancestor nodes assigned to the first class that meets a second criterion.

In Example 36, the subject matter of any one or more of Examples 23-35 optionally include the operations further comprising ranking the filtered sub-rules rules and composite rules in the filtered rule set by frequency of satisfaction by the plurality of datasets, wherein the identifying of the dataset is based on each of the rankings.

In Example 37, the subject matter of Example 36 optionally includes the operations further comprising: selecting a filtered rule based on the ranking; determining a feature parameter referenced by the selected filtered rule; and displaying indicators of the determined feature parameter on an electronic display.

In Example 38, the subject matter of any one or more of Examples 36-37 optionally include the operations further comprising: selecting a filtered rule based on the ranking; and determining a feature parameter referenced by the selected filtered rule, wherein the identifying of the remedial action is based on the determined feature parameter.

In Example 39, the subject matter of any one or more of Examples 33-38 optionally include wherein the remedial action comprises one or more of: reducing a transmission power of a radio in an access point, increasing a transmission power of a radio in an access point, changing an operating channel in an access point, generating instructions to move towards an access point.

In Example 40, the subject matter of any one or more of Examples 23-39 optionally include the operations further comprising: second classifying a second portion of the datasets as the first class of datasets based on a second target parameter value indicated by each of the datasets; generating a second decision tree based on the plurality of datasets and the second classifying; and generating the rule set based on the second decision tree.

In Example 41, the subject matter of any one or more of Examples 23-40 optionally include wherein the classifying of the portion of datasets of the first class is based on a first criterion, the operations further comprising: second classifying a second portion of the datasets as the first class of datasets based on a second criterion; generating a second decision tree based on the second classifying; and generating the rule set based on the second decision tree.

In Example 42, the subject matter of Example 41 optionally includes wherein the first criterion and second criterion reference a first predefined threshold and a second predefined threshold respectively, the operations further comprising randomly determining the first predefined threshold and randomly determining the second predefined threshold.

In Example 43, the subject matter of any one or more of Examples 41-42 optionally include wherein the first criterion and second criterion reference a first predefined threshold and a second predefined threshold respectively, the operations further comprising selecting the first predefined threshold and the second predefined threshold based on a minimum and a maximum value of the target parameter in the datasets.

In Example 44, the subject matter of any one or more of Examples 23-43 optionally include the operations further comprising: determining a correlation of each feature parameter to the target parameter values of the first class; and selecting a set of sub-rules based on the determined correlations, wherein the identifying of the dataset of the first class that satisfies at least the sub-rule identifies a dataset satisfying a sub-rule included in the set of sub-rules.

Example 45 is a non-transitory computer readable medium comprising instructions that when executed configure hardware processing circuitry to perform operations comprising: obtaining a plurality of datasets, each dataset comprising time correlated operational parameter values, the operational parameter values including values of feature parameters and values of target parameters; first classifying a portion of the datasets as either a first or second class of datasets based on a target parameter value indicated by each of the datasets; generating a decision tree based on the plurality of datasets and the first classifying; generating a rule set from the decision tree; filtering the rule set; identifying a dataset of the first class that satisfies at least a sub-rule included in the filtered rule set; identifying a first feature parameter based on the sub-rule; identifying a remedial action based on the first feature parameter; and performing the remedial action.

In Example 46, the subject matter of Example 45 optionally includes the operations further comprising identifying a value of the first feature parameter is an outlier, wherein the identifying of the first feature parameter is based on the identifying of the value.

In Example 47, the subject matter of Example 46 optionally includes the operations further comprising determining quartile boundaries for values of the feature parameters, wherein the identifying of the first feature parameter is based on the quartile boundaries.

In Example 48, the subject matter of any one or more of Examples 45-47 optionally include the operations further comprising: determining that at least two sub-rules are satisfied by the dataset, wherein the identifying of the first feature parameter is based on a first of the at least two sub-rules; and identifying a second feature parameter based on a second sub-rule of the at least two sub-rules.

In Example 49, the subject matter of Example 48 optionally includes the operations further comprising: identifying a second remedial action based on the second feature parameter; determining a first impact of the first remedial action; determining a second impact of the second remedial action; conditionally performing one or more of the first remedial action or the second remedial action based on the first impact and the second impact.

In Example 50, the subject matter of Example 49 optionally includes wherein determining the first impact is based on one or more of a number of users affected by the first remedial action, a priority of a device affected by the first remedial action, or a priority of network communication affected by the first remedial action.

In Example 51, the subject matter of any one or more of Examples 45-50 optionally include wherein the classifying of the portion as the first class evaluates the target parameter against a first predefined threshold, the operations further comprising: classifying the plurality of datasets as either a third or fourth class of datasets based on a second threshold; and generating a second decision tree based on the plurality of datasets and the second classifying, wherein the rule set is further generated based on the second decision tree.

In Example 52, the subject matter of any one or more of Examples 45-51 optionally include wherein the generation of the decision tree comprises generating nodes of the decision tree, and assigning each node of the decision tree to the first class or the second class.

In Example 53, the subject matter of Example 52 optionally includes wherein the assigning of each node is based on a ratio of first class datasets to second class datasets that are represented by the node.

In Example 54, the subject matter of any one or more of Examples 52-53 optionally include wherein generating the rules from the decision tree excludes nodes of the decision tree assigned a classification different than the first class.

In Example 55, the subject matter of any one or more of Examples 52-54 optionally include wherein the generation of the decision tree comprises assigning a Gini score to each node, and wherein the generating of the rule set from the decision tree excludes nodes having a Gini score meeting a criterion.

In Example 56, the subject matter of Example 55 optionally includes wherein the generating of the rule set from the decision tree is based only on nodes of the decision tree having at least a predefined number of ancestor nodes assigned to the first class.

In Example 57, the subject matter of Example 56 optionally includes wherein the generating of the rule set from the decision tree further excludes consideration of nodes having a number of ancestor nodes that meets a second criterion.

In Example 58, the subject matter of any one or more of Examples 45-57 optionally include the operations further comprising ranking the filtered sub-rules rules and composite rules in the filtered rule set by frequency of satisfaction by the plurality of datasets, wherein the identifying of the dataset is based on each of the rankings.

In Example 59, the subject matter of any one or more of Examples 56-58 optionally include the operations further comprising: selecting a filtered rule based on the ranking; determining a feature parameter referenced by the selected filtered rule; and displaying indicators of the determined feature parameter on an electronic display.

In Example 60, the subject matter of any one or more of Examples 56-59 optionally include the operations further comprising: selecting a filtered rule based on the ranking; and determining a feature parameter referenced by the selected filtered rule, wherein the identifying of the remedial action is based on the determined feature parameter.

In Example 61, the subject matter of any one or more of Examples 45-60 optionally include wherein the remedial action comprises one or more of: reducing a transmission power of a radio in an access point, increasing a transmission power of a radio in an access point, changing an operating channel in an access point, generating instructions to move towards an access point.

In Example 62, the subject matter of any one or more of Examples 45-61 optionally include the operations further comprising: second classifying a second portion of the datasets as the first class of datasets based on a second target parameter value indicated by each of the datasets; generating a second decision tree based on the plurality of datasets and the second classifying; and generating the rule set based on the second decision tree.

In Example 63, the subject matter of any one or more of Examples 45-62 optionally include wherein the classifying of the portion of datasets of the first class is based on a first criterion, the operations further comprising: second classifying a second portion of the datasets as the first class of datasets based on a second criterion; generating a second decision tree based on the second classifying; and generating the rule set based on the second decision tree.

In Example 64, the subject matter of Example 63 optionally includes wherein the first criterion and second criterion reference a first predefined threshold and a second predefined threshold respectively, the operations further comprising randomly determining the first predefined threshold and randomly determining the second predefined threshold.

In Example 65, the subject matter of any one or more of Examples 63-64 optionally include wherein the first criterion and second criterion reference a first predefined threshold and a second predefined threshold respectively, the operations further comprising selecting the first predefined threshold and the second predefined threshold based on a minimum and a maximum value of the target parameter in the datasets.

In Example 66, the subject matter of Example 65 optionally includes the operations further comprising: determining a correlation of each feature parameter to the target parameter values of the first class; and selecting a set of sub-rules based on the determined correlations, wherein the identifying of the dataset of the first class that satisfies at least the sub-rule identifies a dataset satisfying a sub-rule included in the set of sub-rules.

What is claimed is:

1. A system comprising:
hardware processing circuitry;
one or more memories storing instructions that when executed cause the hardware processing circuitry to:
obtain a plurality of datasets, each dataset of the plurality of datasets comprising one or more operational parameters that each include a feature parameter and a target parameter;
classify each dataset of the plurality of datasets based on a corresponding target parameter of a corresponding dataset;
generate, based on the classification of each dataset of the plurality of datasets, a rule set including one or more sub-rules;
determine, based on identifying one or more datasets of the plurality of datasets that satisfy at least one of the one or more sub-rules, one or more feature parameters of the one or more datasets that satisfy the one or more sub-rules; and
perform a remedial action determined from the one or more feature parameters of the one or more datasets that satisfy at least one of the one or more sub-rules.

2. The system of claim 1, wherein to classify each dataset of the one or more datasets, the instructions cause the processing circuitry to:
evaluate the corresponding target parameter of the corresponding dataset with a criterion; and
classify, based on evaluating the corresponding target parameter with the criterion, the corresponding dataset as a first class indicating a degradation in service level experience (SLE) or a second class indicating a nominal SLE.

3. The system of claim 2, wherein to classify the corresponding dataset as the first class or the second class, the instructions cause the processing circuitry to:
determine a probability that the corresponding target parameter is associated with the first class or the second class.

4. The system of claim 1, wherein to generate the rule set, the instructions cause the processing circuitry to:
generate, based on the classification of each dataset of the one or more datasets, a decision tree.

5. The system of claim 4, wherein the decision tree comprises one or more nodes that each indicate a classification of the corresponding dataset and is associated with one or more rules of the rule set.

6. The system of claim 1, wherein to determine the one or more feature parameters of the one or more datasets that satisfy the one or more sub-rules, the instructions cause the processing circuitry to:
determine a frequency of the one or more feature parameters that satisfy the one or more sub-rules.

7. The system of claim 6, wherein to determine the one or more feature parameters of the one or more datasets that satisfy the one or more sub-rules, the instructions cause the processing circuitry to:
identify, based on the frequency of the one or more feature parameters that satisfy the one or more sub-rules, a subset of one or more sub-rules.

8. The system of claim 1, wherein to determine the one or more feature parameters of the one or more datasets that satisfy the one or more sub-rules, the instructions cause the processing circuitry to:
determine a probability that the one or more feature parameters of the one or more datasets that satisfy the one or more sub-rules is a root cause of a degradation in service level experience (SLE).

9. The system of claim 1, wherein to determine the one or more feature parameters of the one or more datasets that satisfy the one or more sub-rules, the instructions cause the processing circuitry to:
determine whether each of the one or more feature parameters that satisfy the one or more sub-rules is an outlier value.

10. A method comprising:
obtaining, by processing circuitry, one or more datasets of operational parameters associated with one or more devices of a network, each operational parameter comprising a feature parameter and a target parameter;
classifying, by the processing circuitry, each dataset of the one or more datasets based on a corresponding target parameter of a corresponding dataset;
generating, based on classifying each dataset of the one or more datasets, a rule set including one or more sub-rules;
determining one or more feature parameters of the one or more datasets that satisfy at least one of the one or more sub-rules; and
performing a remedial action determined based on the one or more feature parameters of the one or more datasets that satisfy at least one of the one or more sub-rules.

11. The method of claim 10, wherein classifying each dataset of the one or more datasets comprises:
evaluating the corresponding target parameter of the corresponding dataset with a criterion; and
classifying, based on evaluating the corresponding target parameter with the criterion, the corresponding dataset as a first class indicating a degradation in service level experience (SLE) or a second class indicating a nominal SLE.

12. The method of claim 11, wherein classifying the corresponding dataset as the first class or the second class comprises:
determining a probability that the corresponding target parameter is associated with the first class or the second class.

13. The method of claim 10, wherein generating the rule set comprises:
generating, based on the classifying of each dataset of the one or more datasets, a decision tree.

14. The method of claim 13, wherein the decision tree comprises one or more nodes that each indicate a classification of the corresponding dataset and is associated with one or more rules of the rule set.

15. The method of claim 10, wherein determining the one or more feature parameters of the one or more datasets that satisfy the one or more sub-rules comprises:
determining a frequency of the one or more feature parameters that satisfy the one or more sub-rules.

16. The method of claim 15, wherein determining the one or more feature parameters of the one or more datasets that satisfy the one or more sub-rules comprises:
identifying, based on the frequency of the one or more feature parameters that satisfy the one or more sub-rules, a subset of one or more sub-rules.

17. The method of claim 10, wherein determining the one or more feature parameters of the one or more datasets that satisfy the one or more sub-rules comprises:
determining a probability that the one or more feature parameters of the one or more datasets that satisfy the one or more sub-rules is a root cause of a degradation in service level experience (SLE).

18. The method of claim 10, wherein determining the one or more feature parameters of the one or more datasets that satisfy the one or more sub-rules comprises:

determining whether each of the one or more feature parameters that satisfy the one or more sub-rules is an outlier value.

19. Non-transitory computer-readable storage media comprising instructions that when executed by processing circuitry, cause the processing circuitry to:

obtain one or more datasets of operational parameters associated with one or more devices of a network, each operational parameter comprising a feature parameter and a target parameter;

classify each dataset of the one or more datasets based on a corresponding target parameter of a corresponding dataset;

generate, based on the classification of each dataset of the one or more datasets, a rule set including one or more sub-rules;

determine one or more feature parameters of the one or more datasets that satisfy at least one of the one or more sub-rules; and perform a remedial action determined based on the one or more feature parameters of the one or more datasets that satisfy at least one of the one or more sub-rules.

\* \* \* \* \*